United States Patent [19]
Yagi et al.

[11] Patent Number: 5,699,342
[45] Date of Patent: Dec. 16, 1997

[54] METHOD OF AND DEVICE FOR RECORDING AND PLAYING BACK AN OPTICAL DISK HAVING A TEST PLAYBACK REGION UTILIZING PITS OF MINIMUM SIZE FOR CONTROLLING THE POWER OF THE LASER

[75] Inventors: Kosuke Yagi; Naoyuki Egusa; Masato Nagasawa, all of Nagaokakyo, Japan

[73] Assignee: Mitsubishi Denki Kabushiki Kaisha, Tokyo, Japan

[21] Appl. No.: 385,310

[22] Filed: Feb. 7, 1995

[30] Foreign Application Priority Data

| Feb. 7, 1994 | [JP] | Japan | 6-013366 |
| Apr. 20, 1994 | [JP] | Japan | 6-081601 |
| Aug. 5, 1994 | [JP] | Japan | 6-184824 |

[51] Int. Cl.$^6$ ............... G11B 7/00; G11B 11/00
[52] U.S. Cl. ............... 369/116; 369/54; 369/13
[58] Field of Search ............... 369/116, 47–48, 369/13, 54

[56] References Cited

U.S. PATENT DOCUMENTS

| 5,155,722 | 10/1992 | Yoshida | 369/116 |
| 5,281,797 | 1/1994 | Tatsuno et al. | 369/117 |
| 5,398,227 | 3/1995 | Miyaoka et al. | 369/116 |
| 5,410,527 | 4/1995 | Ashinuma | 369/116 |

FOREIGN PATENT DOCUMENTS

| 0 498455 | 2/1991 | European Pat. Off. |
| 0 498459 | 8/1992 | European Pat. Off. |
| 3 214447 | 1/1990 | Japan |
| 5 12673 | 3/1991 | Japan |
| 5 101472 | 9/1991 | Japan |
| 5 73977 | 9/1991 | Japan |

*Primary Examiner*—Frank G. Font
*Assistant Examiner*—Jason D. DiVierra Eisenberg

[57] ABSTRACT

In a method of reproducing information from an optical disk, the disk is scanned with a laser beam forming a light spot on the disk, at least some of the recording pits being smaller in size than the light spot, the laser beam heating the disk so that effective detection area being formed at only part of the light spot, a sequence of preformatted pits of a minimum size are formed, playback signals are produced in accordance with a reflected light from the disk, and a power of the laser beam is so controlled so as to maximize the level of the playback signals produced from the reflected light from the sequence of pits of the minimum size. In another method using a magneto-optical disk, information is recorded by scanning the disk with a laser beam, each of the recording pits being substantially crescent-shaped, the direction of rotation during playback is opposite to the direction of rotation during playback, and the order of bits forming the information is reversed either during the playback or recording.

20 Claims, 47 Drawing Sheets

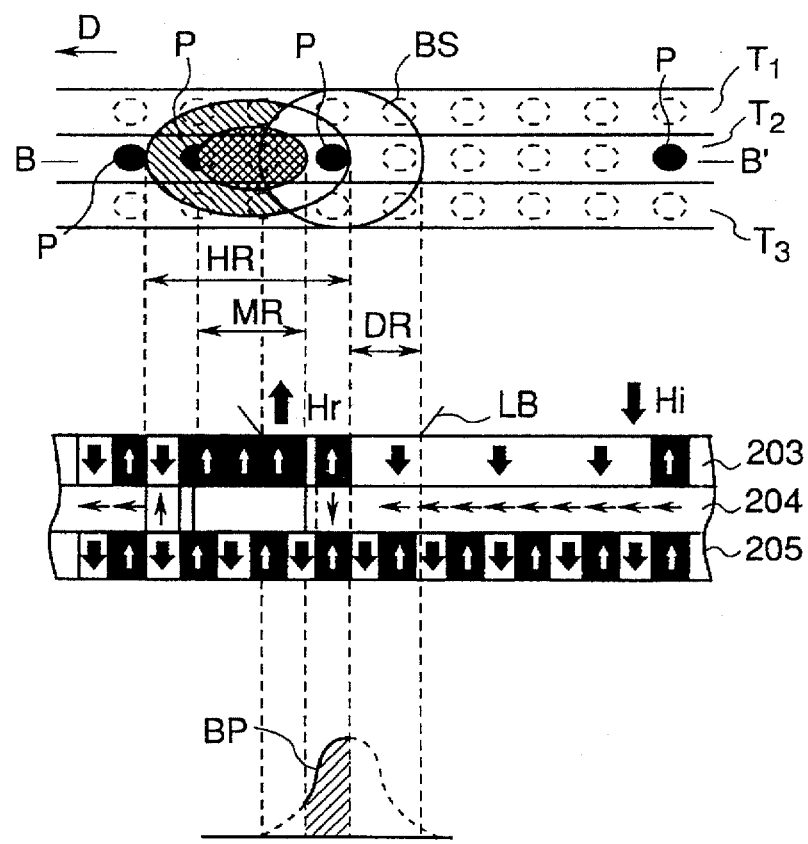
FIG.11A PRIOR ART
FIG.11B PRIOR ART
FIG.11C PRIOR ART
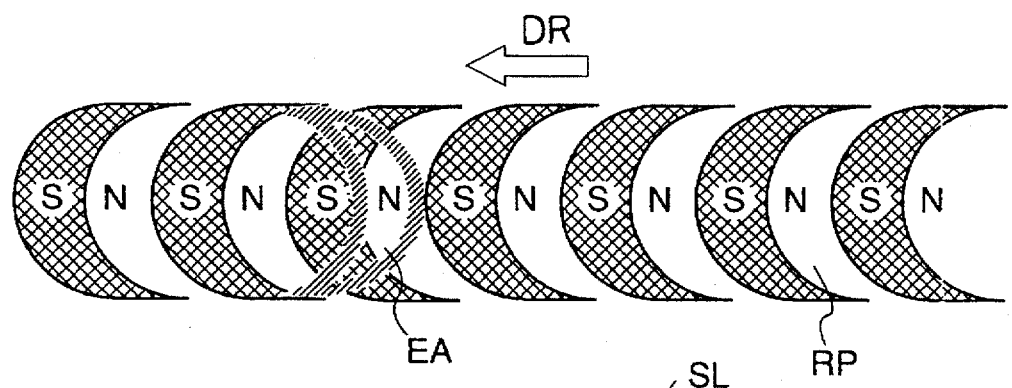
FIG.12A PRIOR ART
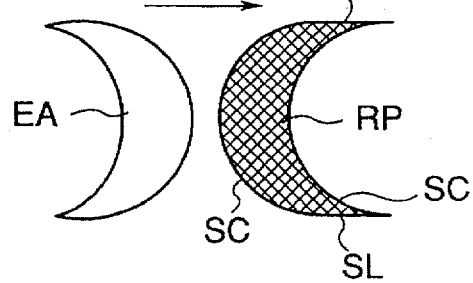
FIG.12B PRIOR ART

METHOD OF AND DEVICE FOR RECORDING AND PLAYING BACK AN OPTICAL DISK HAVING A TEST PLAYBACK REGION UTILIZING PITS OF MINIMUM SIZE FOR CONTROLLING THE POWER OF THE LASER

BACKGROUND OF THE INVENTION

The present invention relates to a method of and a device for optical disk recording and playback.

Optical disk devices generally have a small total storage capacity compared with the magnetic tape devices or the like, and have not been considered suitable for digital motion picture signals. However, by utilizing techniques for compression of image signals, such as those under the standards of JPEG (Joint Photography Expert Group) and MPEG (Motion Picture Expert Group) of ISO, H261 (recommendation by ITVR), and the like, recording motion picture signals by using optical disk devices is becoming feasible.

However, in the optical disk devices which are now widely utilized, such as CD (compact disk) and $OD^3$ (optical digital data disk), the total recording capacity of each disk is still insufficient, and it is still difficult to record digital motion picture information for a reasonably long time. It has therefore been desired to increase the density of recording.

FIG. 1 to FIG. 7 shows a conventional system for achieving high-density recording and playback using a phase-change type recording medium.

FIG. 1 shows how the recording marks which are smaller than the light spot 6 are produced. Illustrated in the lower part of this drawing is a temperature distribution 13 against the position with respect to the light spot 6. Inside the high temperature area 8, the temperature is above a certain threshold temperature 12, at which the recording layer undergoes phase change. During recording utilizing the phase change, a light spot of a high power is applied for a short time to rapidly heats the medium above its melting point, and then rapidly cool the medium to thereby fix the medium in a state in which the atomic arrangement is disordered, i.e., in an amorphous state. During erasure, the medium is heated slowly and is cooled slowly to resume the crystalline state.

FIG. 2 and FIG. 3 show the principle of playback of such high-density recorded information.

As illustrated in FIG. 2, a laser beam 1 for recording and playback is converged by an objective lens 2 onto an optical disk 10 having a variable transmittance medium layer 3 whose transmittance varies depending on its temperature, and an optical recording/playback layer 4 for recording and playing back information.

The transmittance of the variable transmittance medium layer 3 varies as shown in FIG. 3. As illustrated, the transmittance is increased with temperature, but above a certain temperature the transmittance is unchanged, or saturated. The change in the transmittance causes change in the effective reflectivity from the disk (the power of the reflected light from the disk divided by the power of the incident laser beam).

FIG. 4 illustrates how the information is played back from the optical disk of FIG. 2. The disk is rotated in the direction of arrow DR. The laser beam 1 (FIG. 2) illuminates the area 6, which is called a light spot area. The recording/playback layer 4 has recording marks 7, written in it. Illumination of the optical disk with the laser beam 1 produces an area 8 within which the temperature is above a certain threshold value, the area 8 being called a high-temperature area. Part 9 of the high-temperature area 8 is also within in the light spot area 6, and this part 9 is called an effective detection area. The remaining part of the high temperature area 8 is ahead of the light spot area 6.

It is therefore possible to play back recording marks which are so small that from the viewpoint of spatial resolution they cannot be played back. This method is called a super-resolution method.

FIG. 5 shows a conventional optical disk drive device for high-density recording and playback. As illustrated, it comprises a disk motor 16 for rotating a disk 10, an actuator 17 for driving the objective lens 2, an optical head 18 for emitting a laser beam and having an optical detector detecting or reproducing a signal from the reflected light, an amplifier 20 for receiving and amplifying a minute signal 19 from the optical detector to produce a playback signal, an equalizing and demodulating circuit 21 for producing playback data 22 from the playback signal from the amplifier 20, a tracking controller 23 controlling the actuator 17 to keep the light spot on the track center, a focusing controller 24 for controlling the actuator 17 so that the light spot is kept focused on the surface of the disk 10, a system controller 25 for control over the entire optical disk drive device, an auto laser power controller 27 for controlling the power of the laser beam emitted from the optical head 18, and a spot diameter adjusting circuit 28 for varying the target value of the auto laser power controller 27 to thereby control the recording/playback light spot diameter. Actuator drive signals 26 produced from the tracking controller 23 and the focusing controller 24 are applied to the actuator 17 for control over the actuator 17 for the purpose of tracking and focusing.

FIG. 6 shows part of the disk drive of FIG. 5, which relates to the laser power control. A polarization prism 29a splits the laser beam from a laser 30 driven by a laser driver 42. Part of the laser beam that is reflected at the polarization prism 29a is received by an optical detector 32, which conducts photo-electric conversion to produce an electric current indicating the received light amount. The rest of the laser beam that is not reflected at the polarization prism is passed through another polarization prism 29b and is converged by the objective lens 2 onto the disk 10. The reflected light beam from the disk 10 is partially reflected by the polarization prism 29b and is received by another optical detector 31, which conducts photo-electric conversion to produce an electric current indicating the received light amount.

I-V converters 33 and 34 respectively convert electric currents from the optical detectors 31 and 32 into voltage signals. Integrators 35 and 36 respectively integrate the outputs of the I-V converters 33 and 34. A subtractor 37 compares the output of the integrator 35 with a signal representing a reflected light target value 38. The output of the integrator 36 is supplied through a phase compensation circuit 39 to a subtractor 40, which combines the auto laser power control loop and the light spot diameter adjusting loop, and its output is supplied through an amplifier 41 for compensating the loop gain, to the laser driver 42.

FIG. 7 shows a system for performing control to maximize the playback signal amplitude. For this purpose, a waveform equalizer 21, a signal amplitude detector 43, an A/D converter 44 and a microcomputer 46 are added. That is, the output 22 of the equalizing circuit 21 is supplied to the playback signal amplitude detecting circuit 43, and its output is digitized at the A/D converter 44 and supplied to the microcomputer 46. Data value from the microcomputer 45 indicating the optimum light spot diameter is D/A converted into an analog signal at a D/A converter 45, and the analog signal is applied to the subtractor 37 as a target value.

It is thus possible to realize super-resolution method in cases where the phase-change recording method is used. A problem associated with the super-resolution method is that since data is played back from the area which is within an effective detection area defined by the high temperature area, and also within the light spot area, the playback is affected by variation in the temperature of the medium and the distribution of temperature, which in turn are affected by variation in the thickness of the medium, or the temperature of the device, the variation in the laser power, variation in the linear speed, and the like. Moreover, during recording, the temperature at which the recording is achieved is confined to the area 8, which is only part of the beam spot, much smaller than the light spot. However, recording and playback of the minute pits may be made impossible even by a slight temperature variation of the medium.

Accordingly, in the prior-art high-density playback, the signal from the optical detector of the optical head 18 in FIG. 5 is amplified by an amplifier 20, and the amplified signal is used for control over the recording/playback spot diameter adjusting circuit 28, which in turn controls the auto laser power controller 27. In this way, the light spot diameter 28 is controlled.

According to the system shown in FIG. 5, the effective reflectivity of the medium is detected and used for real time control over the light spot diameter. FIG. 6 is a block diagram showing the part of the system relating to the laser power control. The output of the optical detector 13 is compared with the reflected light target value 38, at the comparator 37, and is used as a reference for the auto laser power control loop. In an ordinary auto laser power control, the emitting power of the laser 30 is controlled in accordance with the output of the optical detector 32. FIG. 6 adds a correction loop for maintaining the medium reflectivity constant.

In the system shown in FIG. 7, the light spot diameter is so controlled as to maximize the playback signal amplitude. That is, the output of the playback signal amplitude detector 43 is input, through the A/D converter 44, to the microcomputer 46, which performs climbing-method control, and produces an optimum light spot diameter command value, which is applied through the D/A converter 45, to the comparator 37, as a reference for the auto laser power control loop.

In this way, the light spot is so adjusted that the medium reflectivity is maintained at a predetermined value, or the playback signal amplitude is maximized.

In the method in which the playback signal amplitude is maximized as shown in FIG. 7, the optimum laser power is dependent on the pit length, so that the laser power may not be suitable for the minimum pit length. Moreover, where the signal pit is so long as not to require the super-solution, a greater laser power results in a greater playback signal.

In the method in which the reflectivity is maintained constant as shown in FIG. 6, it is not possible to find at which reflectivity the super-resolution method works best.

Moreover, in an optical disk drive device for recording, it is necessary for the disk to rotate at a constant linear velocity (rather than a constant angular velocity), so that the rotation reference signal must be derived from the disk. Such a rotation reference signal cannot be derived from a disk which has not been preformatted.

Other prior art methods and systems will next be described.

An example of direct-overwritable magneto-optical disk of a magnetic field modulation type is shown in Japanese Patent Kokai Publication No. 214,447/1991. The disk is kept illuminated by a laser beam of a constant intensity, while the direction of magnetic field applied to the disk is altered according to the content of the information to be recorded.

More specifically, as illustrated in FIG. 8, the recording area (area in which information is to be recorded) of a magneto optical disk 221 is illuminated by a laser beam 222 of a constant intensity so that its recording magnetic layer in the recording area is heated above its Curie temperature. As the disk 221 is rotated as indicated by arrow DR in FIG. 8, the recording area is sequentially illuminated. In other words, each part of the disk enters, passes through and then leaves the beam spot or illuminated location (location where the disk is illuminated by the laser beam 222). As each part of the disk passes through the illuminated location, the recording layer of the disk is heated. As each part of the disk leaves the illuminated location, the recording layer is cooled. The direction of the magnetic field generated by a magnetic field modulation head 223, including an electromagnet, is altered according to the content of information to be recorded, by altering the direction of the electric current flowing through the modulation head 223, so that the direction of the magnetization (or the sublattice magnetization) of the recording layer is altered according to the content of the information to be recorded.

The direction of magnetization is either one of two directions, so that it represents a value "0" or "1". To increase the recording density, the pit length or the pit interval must be shortened. However, these are dependent on the laser beam spot diameter, and there is therefore a limit to the increase in the recording density.

This is explained with reference to FIG. 9, showing the modulation transfer function (MTF) against spatial frequency in an optical system without aberration. The frequency characteristic of recording and playback is generally expressed by an MTF, which is a transfer function of an optical system. The spatial frequency at which MTF=0 is given by $2NA/\lambda$, where $\lambda$ denotes the wave length and NA denotes the numerical aperture of the objective lens. The spatial frequency $2NA/\lambda$ is called a cutoff frequency.

The pit length corresponding to the cutoff frequency is the limit value below which playback is not possible. For the sake of stable operation, half the cutoff frequency is normally selected, and the pit length corresponding to half the cutoff frequency is set as the minimum pit length.

Although increase in the frequency of the magnetic field increases the density of recording, the maximum recording density is limited by the minimum pit length as defined by the MTF characteristic. A scheme for playing back information at a density higher than that restricted by the MTF for playback, is called a super-resolution playback method.

FIG. 10 is a sectional view of a magneto-optical recording medium, shown in Japanese Patent Kokai Publication No. 73977/1993. As illustrated, a first magnetic layer 203 having a relatively low coercivity, and a second magnetic layer 205 having a coercivity higher than the coercivity of the first magnetic layer 203 and exchange coupled with the first magnetic layer 203 are provided on a transparent substrate 201, and a third magnetic layer 204 is provided between the first and second magnetic layers 203 and 205 having a Curie temperature lower than the Curie temperatures of the first and second magnetic layers 203 and 205.

FIG. 11A to FIG. 11C show states of the medium during playback. FIG. 11A is a schematic view of the medium at and around the beam spot, as seen from the optical head. The beam spot and the temperature distribution of the part heated by the beam spot are shown. FIG. 11B is a schematic sectional view showing the states of the respective magnetic layers in the region at and around the beam spot, in section in parallel with the direction of scanning by the beam spot. FIG. 11C is a schematic view showing the light intensity distribution of the beam spot and its effective range.

The recording pits are substantially crescent-shaped as shown in FIG. 12A and FIG. 12B. (To be accurate, the recording pits have of a shape defined by two semi-circles SC connected by a pair of straight lines SL, as shown in FIG. 12B.) This is because the disk is moved relative to the circular beam spot in the direction of arrow DR in FIG. 12A, and as each part of the disk moves out of the beam spot, and is thereby cooled, its direction of magnetization is determined, depending on the direction of the magnetic field being applied.

During playback of information, the magnetization of the third magnetic layer 204 is lost in the high temperature area at a part of the region illuminated by the light beam, and the third magnetic layer 204 having lost its magnetization acts as a mask, so that with the magnetization of the first magnetic layer 203 being oriented in one direction, the information (stored in the second magnetic layer 205) in the masked region MR is not detected by the light beam. In this way, by masking part of the beam spot, undesired information is prevented from being mixed in, and information in the effective detection area outside of the heated area HR and inside of the beam spot area BS information alone is read. Accordingly, information of a spatial frequency higher than the cutoff frequency of the optical system can be reproduced. The system is therefore called a super-resolution playback system, and the mask layer is also called a super-resolution layer. Since the heated area HR, which is formed at the back of the beam spot, forms a mask region, and the effective detection is formed in the front part of the light spot, the method is called a front aperture detection method. Moreover, since the heated area forming a mask region is shifted backward (with reference to the direction of beam spot movement), the effective area or opening of the beam spot is crescent-shaped.

According to another prior-art example shown in Japanese Patent Kokai Publication No. 101472/1993, information to be recorded in a magneto-optical information medium 115 having a playback layer 211, a memory layer 212 and a recording layer 213 shown in FIG. 13 is transferred, and the playback layer 211, the memory layer 212 and the recording layer 213 are magnetized by an external magnetic layer, by application of a high-intensity light beam. During playback, the information is transferred from the memory layer 212 to the playback layer 211, within the high temperature area, as shown in FIG. 14, and is detected by the laser beam. The playback layer 211 acts as a super-resolution layer. Contrary to the case in Japanese Patent Kokai Publication No. 73977/1993, the super-resolution layer acts as a mask except at the high-temperature area. The high-temperature area is formed at the back of the beam spot, so that the effective opening or area which also formed at the rear part of the beam spot, is spool-shaped. This method is called a rear aperture detection method.

A problem associated with the rear aperture detection method is that the effective area is small. A problem associated with the front aperture detection method is that the effective area is crescent-shaped, so that, as schematically shown in FIG. 12A and FIG. 12B, the shape of the effective area (EA) during playback and the shape of the pits are both (substantially) crescent-shaped but convex toward opposite directions, so that the effective area overlaps only partially with the area of the recording pit RP, and the adjacent pits are also partially covered by the effective area (EA).

FIG. 15A shows the occupation ratio, within the effective area, of the area occupied by the pit in question (from which it is intended to read the information). It is assumed that the pit width and the reading beam width are both ⅙ of the laser beam diameter. The horizontal axis represents the detection position (with respect to a reference position) normalized by the laser beam diameter. The detection position is zero when the crescent shaped recording pit and the crescent shaped effective area are in contact as illustrated in FIG. 15B, and is increased as the effective area EA is moved rightward as seen in FIG. 15C. The vertical axis of FIG. 15A represents the occupation ratio which is the proportion of area TA which is within the recording pit RP in question and also within the effective area EA with respect to the overall effective area EA, as shown in FIG. 15C. In this example, the occupation ratio is 50% at most at a position of 0.2× diameter, and at other positions, information mixed in from adjacent pits constitutes more than 50%, so that the information of the pit in question cannot be read properly. Conversely stated, the information of each pit is read while it is intended to read information from adjacent information. Because of interference from adjacent pits, the S/N ratio of the playback signal is lowered, and unwanted jitter is introduced.

SUMMARY OF THE INVENTION

An object of the invention is to improve playback performance in a method and a system utilizing super-resolution.

Another object of the invention is to ensure playback from pits of minimum length.

Another object of the invention is to optimize the spot diameter, the laser power, the linear speed, and the super-resolution external magnetic field.

Another object of the invention is to facilitate tracking during recording and data search during playback.

A further object of the invention is to increase the recording density, and enable playback of information recorded with a high density.

According to one aspect of the invention, there is provided a method of reproducing information from an optical disk, in which information is recorded in the form of recording pits along a track on the disk, comprising the step of:

scanning the disk with a laser beam forming a light spot on the disk, at least some of the recording pits being smaller in size than said light spot, the laser beam heating the disk so that effective detection area being formed at only part of the light spot;

providing along said track, a minimum pit sequence area where a sequence of preformatted pits having a minimum size are formed, it being required to read pits having a size equal to or greater than said minimum size;

producing playback signals in accordance with a reflected light from the disk; and controlling a power of the laser beam so as to maximize a level of the playback signals produced from the reflected light from said minimum pit sequence area.

According to another aspect of the invention, there is provided a method of reproducing information from an optical disk, in which information is recorded in the form of recording pits along a track on the disk, comprising the step of:

scanning the disk with a laser beam forming a light spot on the disk, at least some of the recording pits being smaller in size than said light spot, the laser beam heating the disk so that effective detection area being formed at only part of the light spot;

providing, along said track, a no-pit area where no pits are formed;

producing playback signals in accordance with a reflected light from the disk; and controlling a power of said laser beam so that the reflectivity of the laser beam from said no-pit area is at a predetermined level.

According to another aspect of the invention, there is provided a method of reproducing information from an optical disk, in which information is recorded in the form of recording pits along a track on the disk, comprising the step of:

scanning the disk with a laser beam forming a light spot on the disk, at least some of the recording pits being smaller in size than said light spot,the disk s beam heating the disk so that effective detection area being formed at only part of the light spot;

providing, along said track, a preformatted area where embossed pits having a width larger than a length are formed;

producing playback signals in accordance with a reflected light from the disk; and producing playback signals in accordance with a reflected light beam from the disk.

According to another aspect of the invention, there is provided a method of reproducing information from an optical disk, in which information is recorded in the form of recording pits along a track on the disk, comprising the step of:

scanning the disk with a laser beam forming a light spot on the disk, at least some of the recording pits being smaller in size than said light spot, the laser beam heating the disk so that effective detection area being formed at only part of the light spot;

providing, along said track, a preformatted area where embossed pits are formed, said embossed pits including a pair of wobble pits which are shifted from each other in the longitudinal direction of the track and shifted from the center of the track in opposite lateral directions from each other, said wobble pits having a size which are substantially equal to the size of the light spot; and producing playback signals in accordance with a reflected light beam from the disk.

According to another aspect of the invention, there is provided a method of reproducing information from an optical disk, comprising the steps of:

providing optical disks with a printed code on the surface of the disk, between its central part which is clamped by a disk holding device of an optical disk, and data area where information to be reproduced is recorded, said printed code indicating whether the disk is a playback-only disk in which the data are recorded by means of embossed pits only, or the disk is of a super-resolution type capable of playing back information from recording pits at least some of which are smaller in size than a laser beam spot used for playback;

reading the printed code to identify the type of the disk;

setting a parameter according to the result of said identification, said parameter being used for processing the playback signals;

scanning the disk with a laser beam forming said beam spot on said disk; and producing playback signals in accordance with a reflected light beam from the disk.

According to another aspect of the invention, there is provided a method of reproducing information from an optical disk, in which information is recorded in the form of recording pits along a track on the disk, comprising the step of:

scanning the disk with a laser beam forming a light spot on the disk, at least some of the recording pits being smaller in size than said light spot, the laser beam heating the disk so that effective detection area being formed at only part of the light spot;

providing, along said track and for each sector, a preformatted area where embossed pits are formed, said ebmossed pits including sector address pits representing an address of said each sector, said sector address pits for at least some of the sectors having a size which are substantially equal to the size of the beam spot; and producing playback signals in accordance with a reflected light beam from the disk.

According to another aspect of the invention, there is provided a method of playing back information from an optical disk, in which information is recorded by scanning the disk with a laser beam, said information being recorded in the form of recording pits along a track on the disk, each of said recording pits being a substantially crescent-shaped, comprising the step of:

scanning the disk with a laser beam forming a light spot on the disk, at least some of the recording pits being smaller in the dimension in the longitudinal direction of the track than said light spot, the laser beam heating the disk so that effective detection area being formed at only part of the light spot substantially crescent-shaped;

the direction of scanning during playback being opposite to the direction of scanning during recording, so that the direction toward which said substantially crescent-shaped effective detection area is convex is identical to the direction toward which said crescent-shaped recording pits;

processing a playback signal responsive to a reflected light from the disk scanned by the laser beam to produce a sequence of bits corresponding to the recording pits; and reversing the order of said sequence of bits.

According to another aspect of the invention, there is provided an optical disk drive device for playing back information from an optical disk, in which the information is recorded by scanning the disk with a laser beam, said information being recorded in the form of recording pits along a track on the disk, each of said recording pits being a substantially crescent-shaped, comprising:

means for scanning, for playback, the disk with a laser beam forming a light spot on the disk, at least some of the recording pits being smaller in the dimension in the longitudinal direction of the track than said light spot, the laser beam heating the disk so that effective detection area being formed at only part of the light spot substantially crescent-shaped;

the direction of scanning during the playback being opposite to the direction of scanning for the recording, so that the direction toward which said substantially crescent-shaped effective detection area is convex is identical to the direction toward which said crescent-shaped recording pits;

means for processing a playback signal responsive to a reflected light from the disk scanned by the laser beam to produce a sequence of bits corresponding to the recording pits; and means for reversing the order of said sequence of bits.

According to another aspect of the invention there is provided a method of recording information on an optical disk, by scanning the disk with a laser beam, said information being recorded in the form of recording pits along a track on the disk, each of said recording pits being a substantially crescent-shaped, comprising the step of:

reversing the order of a sequence of bits forming the information to be recorded on the disk; and scanning the disk with said laser beam in the direction opposite to the direction in which the disk is scanned during playback.

According to another aspect of the invention, there is provided an optical disk drive device for recording information on an optical disk, by scanning the disk with a laser beam, said information being recorded in the form of recording pits along a track on the disk, each of said recording pits being a substantially crescent-shaped, comprising:

means for reversing the order of a sequence of bits forming the information to be recorded on the disk;

means for scanning, for recording, the disk with said laser beam in the direction opposite to the direction in which the disk is scanned during playback; and means for applying a modulated magnetic field to the disk at a part which is illuminated with the laser beam, said modulated magnetic field being modulated in accordance with the information to be recorded.

According to another aspect of the invention, there is provided an optical disk drive device for playing back information from an optical disk, in which the information is recorded by scanning the disk with a laser beam, said information being recorded in the form of recording pits along a track on the disk, comprising:

means for rotating the disk in a first direction for recording, and rotating the disk in a second direction for playback, said second direction being opposite to said first direction; and a slider with a magnetic field modulating head mounted thereon, said slider having a bottom portion, from which a magnetic field by said magnetic filed generating head is emanated, a first tapered portion at which an air flow strikes when said disk is rotated in said first direction, and a second tapered portion at which an air flow strikes when said disk is rotated in said second direction, so that said slider is made to float regardless of whether the disk is rotated in said first direction or said second direction.

According to another aspect of the invention, there is provided an optical disk drive device for playing back information from an optical disk, in which the information is recorded by scanning the disk with a laser beam, said information being recorded in the form of recording pits along a track on the disk, comprising:

means for rotating the disk in a first direction for recording, and rotating the disk in a second direction for playback, said second direction being opposite to said first direction; and a slider with a magnetic field modulating head mounted thereon, said slider having an arcuate bottom portion, from which a magnetic field by said magnetic field generating head is emanated, so that said slider is made to float regardless of whether the disk is rotated in said first direction or said second direction.

According to another aspect of the invention, there is provided a method of playing back information from an optical disk, in which information is recorded in the form of recording pits along a track on the disk, comprising the step of:

scanning the disk with a laser beam forming a light spot on the disk, at least some of the recording pits being smaller in size than said light spot, the laser beam heating the disk so that effective detection area being formed at only part of the light spot;

providing along said track, a test playback region;

producing playback signals in accordance with a reflected light from the disk; and controlling a power of the laser beam so as to maximize a level of the playback signals produced from the reflected light from said test playback region:

wherein said disk is of a magneto-optical disk;

recording pits are crescent-shaped;

direction of rotation during playback is opposite to direction of rotation during recording.

According to another aspect of the invention, there is provided a method of playing back information from an optical disk, in which information is recorded in the form of recording pits along a track on the disk, comprising the step of:

scanning the disk with a laser beam forming a light spot on the disk, at least some of the recording pits being smaller in size than said light spot, the laser beam heating the disk so that effective detection area being formed at only part of the light spot;

providing along said track, a test playback region;

producing playback signals in accordance with a reflected light from the disk; and controlling a linear scanning speed so as to maximize a level of the playback signals produced from the reflected light from said test playback region.

According to another aspect of the invention, there is provided a method of playing back information from an optical disk, in which information is recorded in the form of recording pits along a track on the disk, comprising the step of:

scanning the disk with a laser beam forming a light spot on the disk, at least some of the recording pits being smaller in size than said light spot, the laser beam heating the disk so that effective detection area being formed at only part of the light spot;

providing along said track, a test playback region;

producing playback signals in accordance with a reflected light from the disk; and controlling a super-resolution external magnetic field so as to maximize a level of the playback signals produced from the reflected light from said test playback region.

According to another aspect of the invention, there is provided a method of playing back information from an optical disk, in which information is recorded by scanning the disk with a laser beam, said information being recorded in the form of recording pits along a track on the disk, comprising the step of:

scanning the disk with a playback laser beam forming a playback light spot on the disk, at least some of the recording pits being smaller in the dimension in the longitudinal direction of the track than said light spot;

scanning the disk with a preheating laser beam forming a preheating light spot on the disk, said preheating laser beam forming a heated area at least partially in part of the playback light spot, and an effective detection area being thereby formed at only part of the playback light spot; and converting a reflected light from the disk scanned by the playback laser beam into a playback signal.

According to another aspect of the invention, there is provided an optical disk drive device for playing back information from an optical disk, in which information is recorded by scanning the disk with a laser beam, said information being recorded in the form of recording pits along a track on the disk, said device comprising:

means for scanning the disk with a playback laser beam forming a playback light spot on the disk, at least some of the recording pits being smaller in the dimension in the longitudinal direction of the track than said light spot;

means for scanning the disk with a preheating laser beam forming a preheating light spot on the disk, said preheating laser beam forming a heated area at least partially in part of the playback light spot, and an effective detection area being thereby formed at only part of the playback light spot; and means for converting a reflected light from the disk scanned by the playback laser beam into a playback signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 11A to FIG. 11C are schematic diagrams showing states of the medium during playback;

FIG. 12A and FIG. 12B show the shapes of the recording pits and the effective detection area;

FIG. 20B is scanned;

DETAILED DESCRIPTION OF THE PREFERRED EMBODIMENTS

Figure 1:
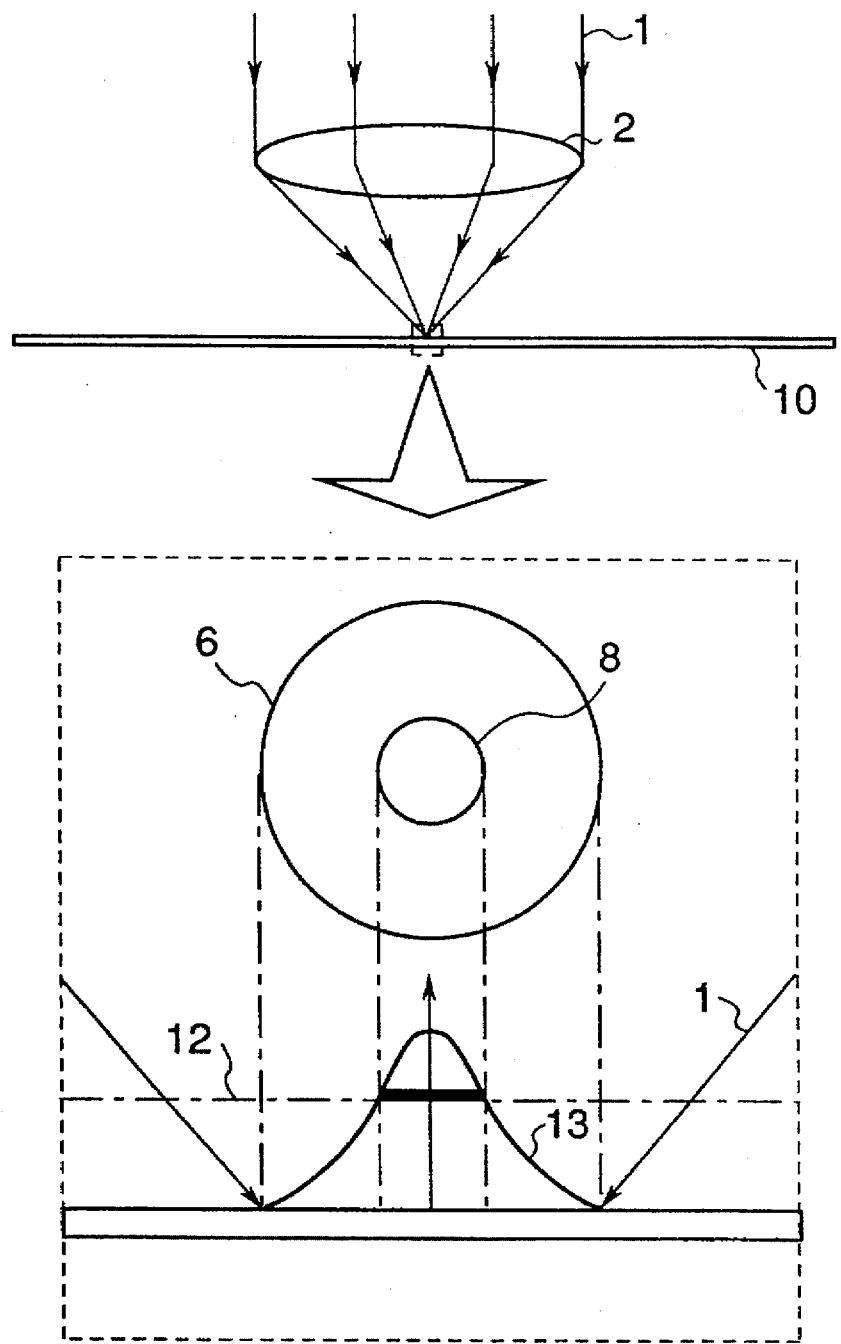
FIG. 1 is a schematic diagram showing how the recording marks which are smaller than the light spot are produced.
Figure 2:
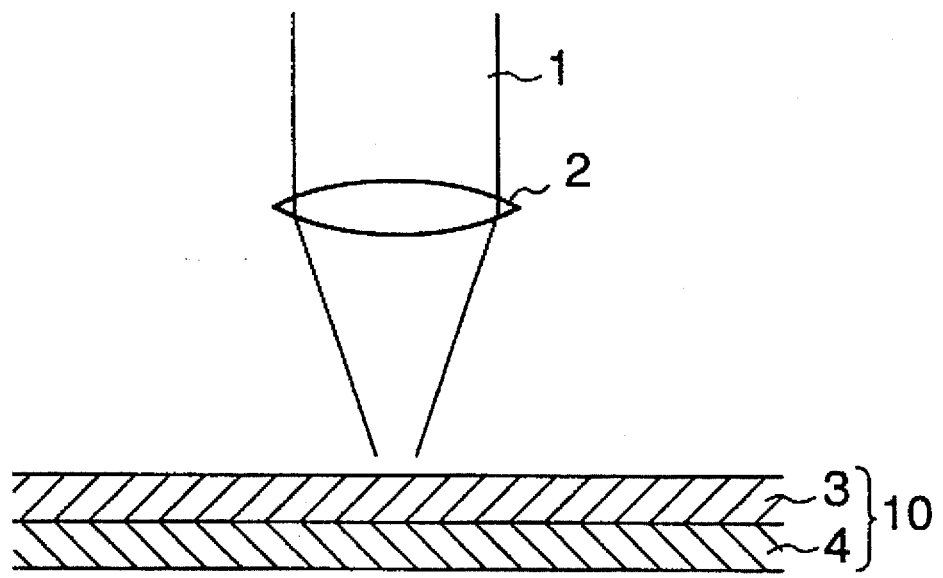
FIG. 2 is a schematic diagram showing how the laser beam is applied for playback.
Figure 3:
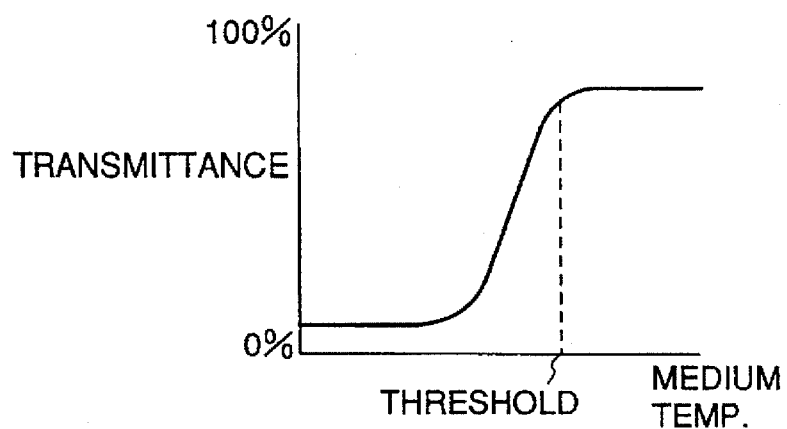
FIG. 3 is a diagram showing the transmittance of the variable transmittance medium layer.
Figure 4:
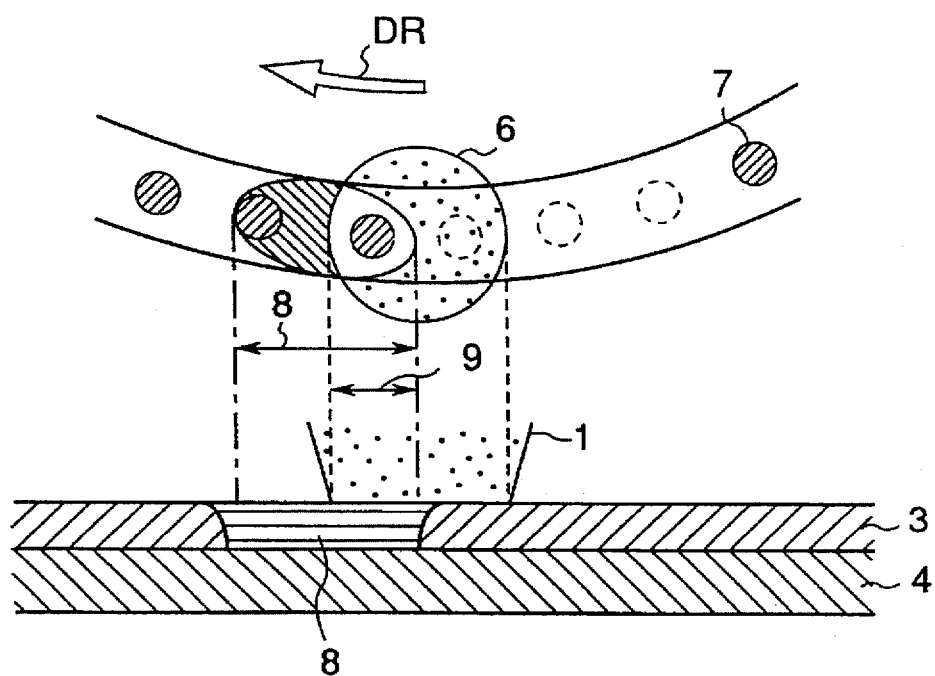
FIG. 4 is a schematic diagram showing how the effective detection area is defined in accordance with the super-resolution playback method.
Figure 5:
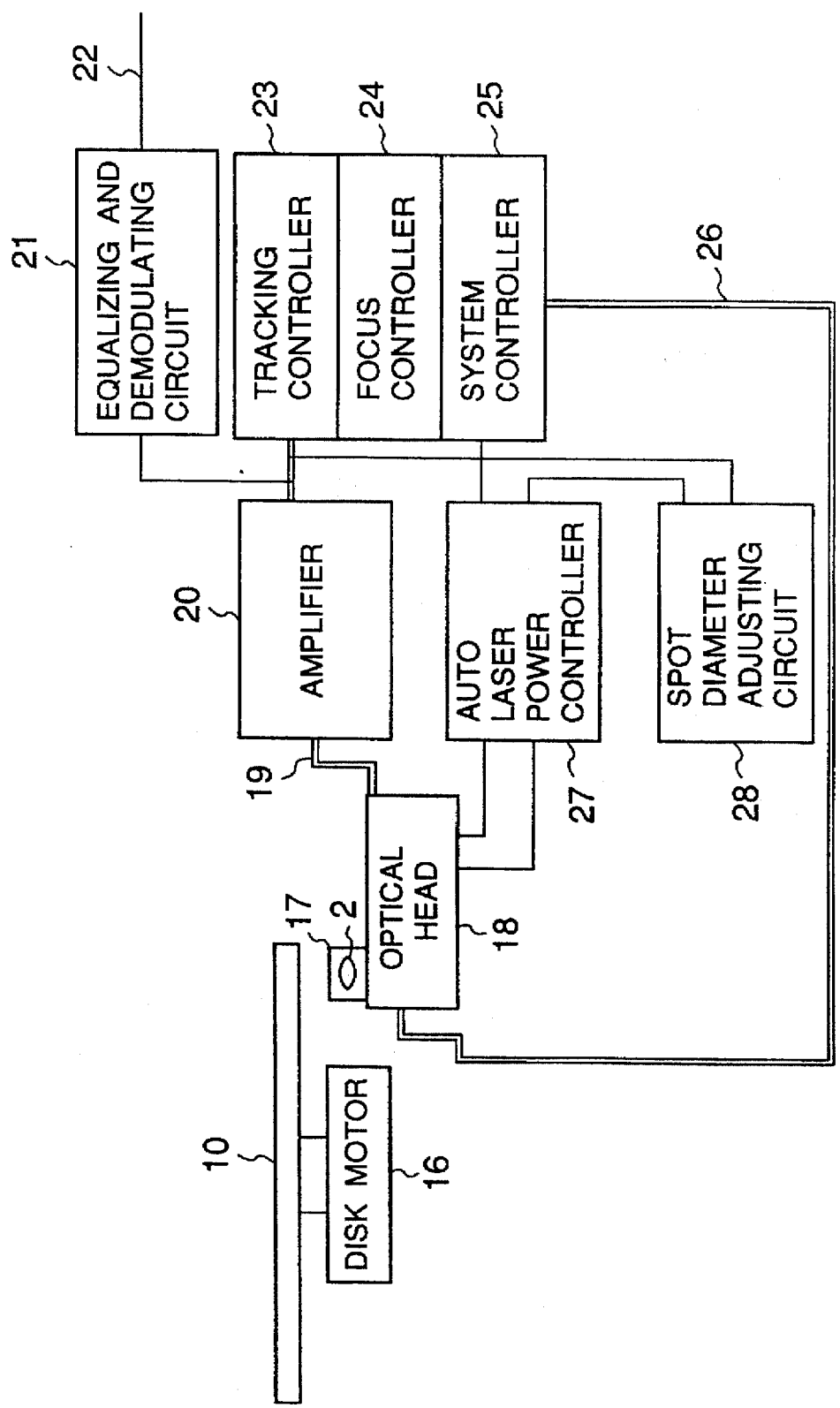
FIG. 5 is a block diagram showing a conventional optical disk drive device for super-resolution playback.
Figure 6:
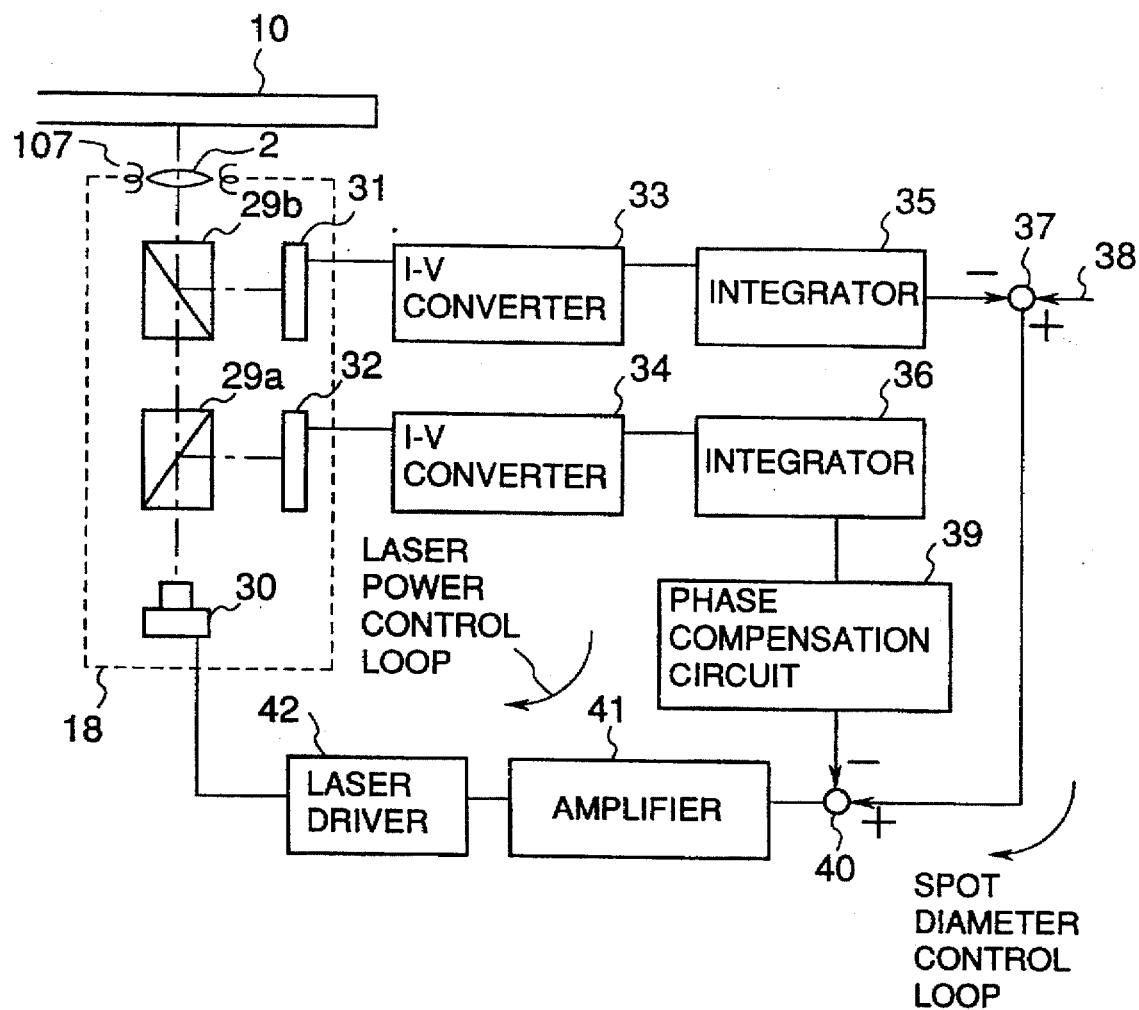
FIG. 6 is a block diagram showing part of the disk drive device of FIG. 5 which relates to the laser power control.
Figure 7:
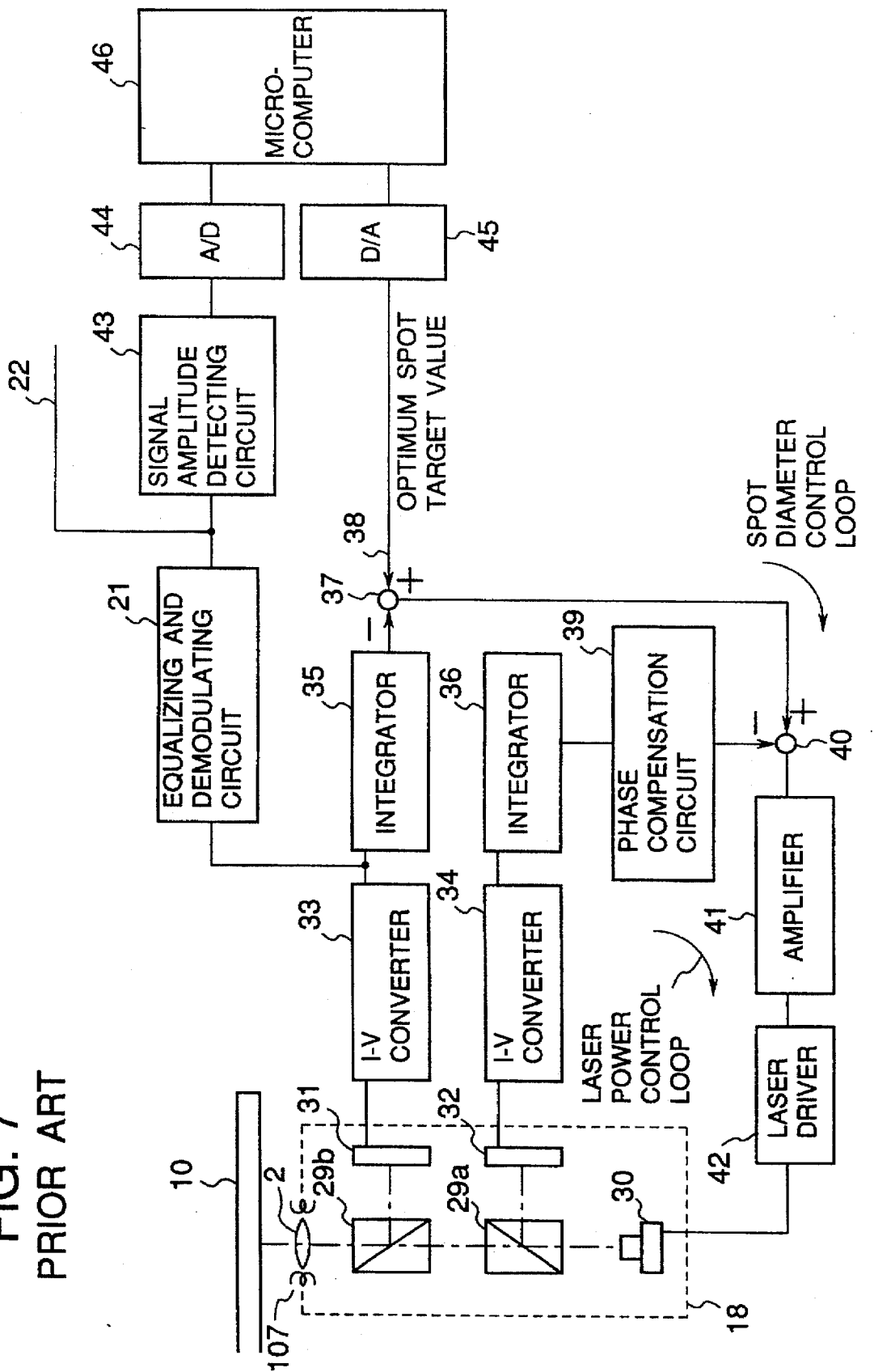
FIG. 7 is a block diagram showing a conventional system for performing control to maximize the playback signal amplitude.
Figure 8:
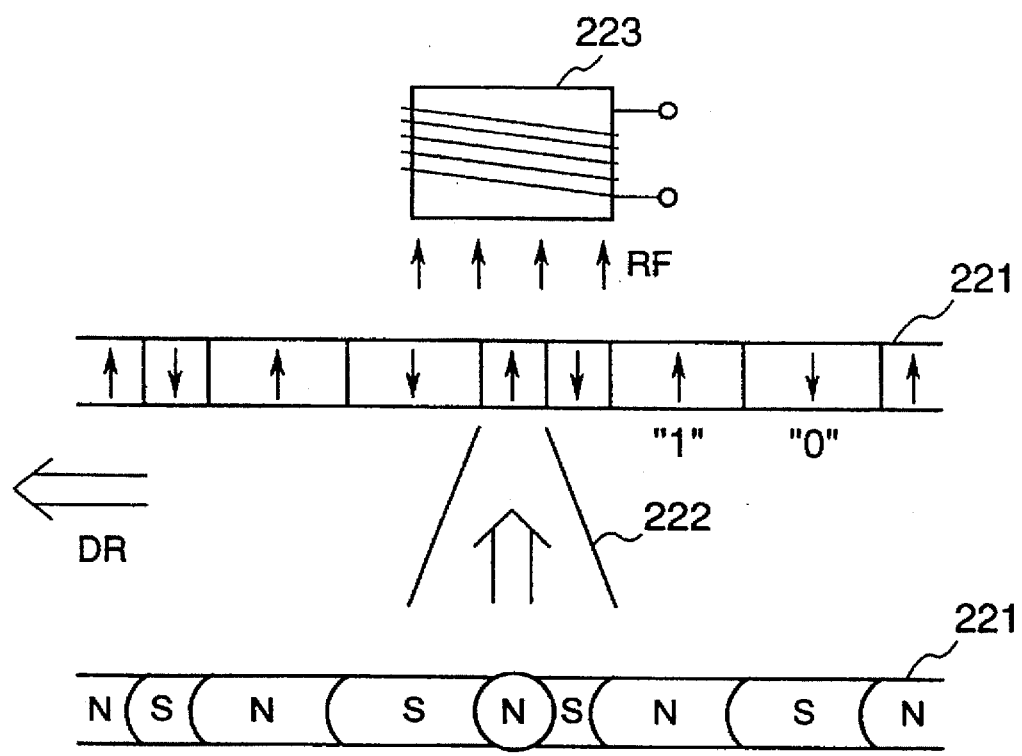
FIG. 8 is a schematic diagram showing the manner of playback from a magneto-optical disk.
Figure 9:
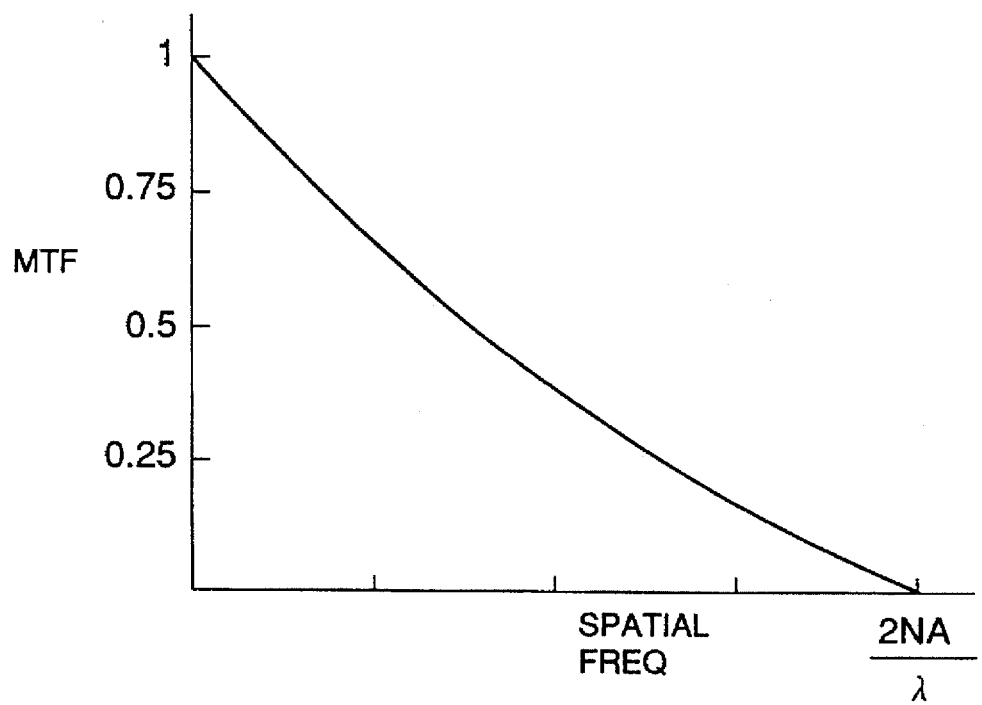
FIG. 9 is a diagram showing a modulation transfer function (MTF)
Figure 10:
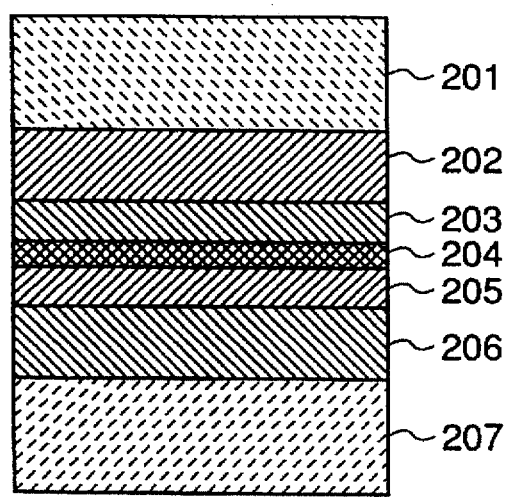
FIG. 10 is a schematic sectional view showing the layer configuration of a magneto-optical recording medium.
Figure 13:
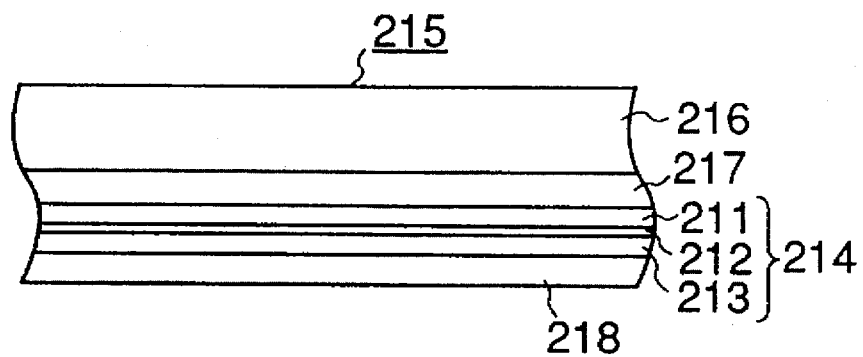
FIG. 13 is a schematic sectional view showing another example of magneto-optical disk.
Figure 14:
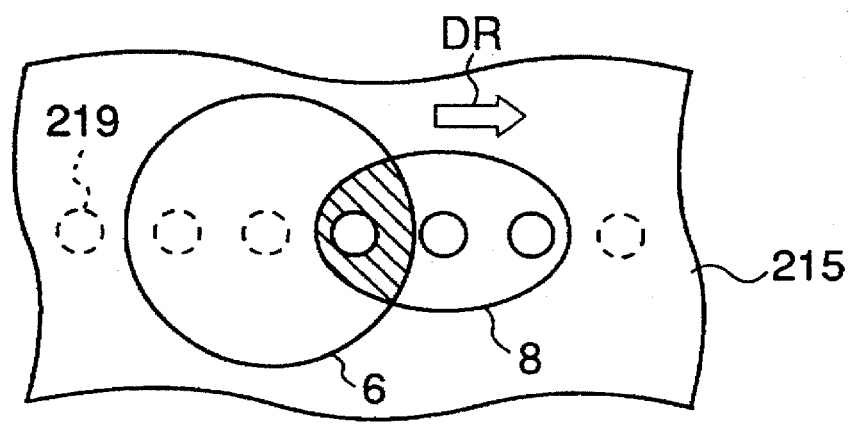
FIG. 14 is a schematic diagram showing how the effective detection area is defined.

Embodiments of the invention will now be described with reference to the drawings. Identical reference numerals in various figures denote identical or corresponding elements or members.

Figure 16:
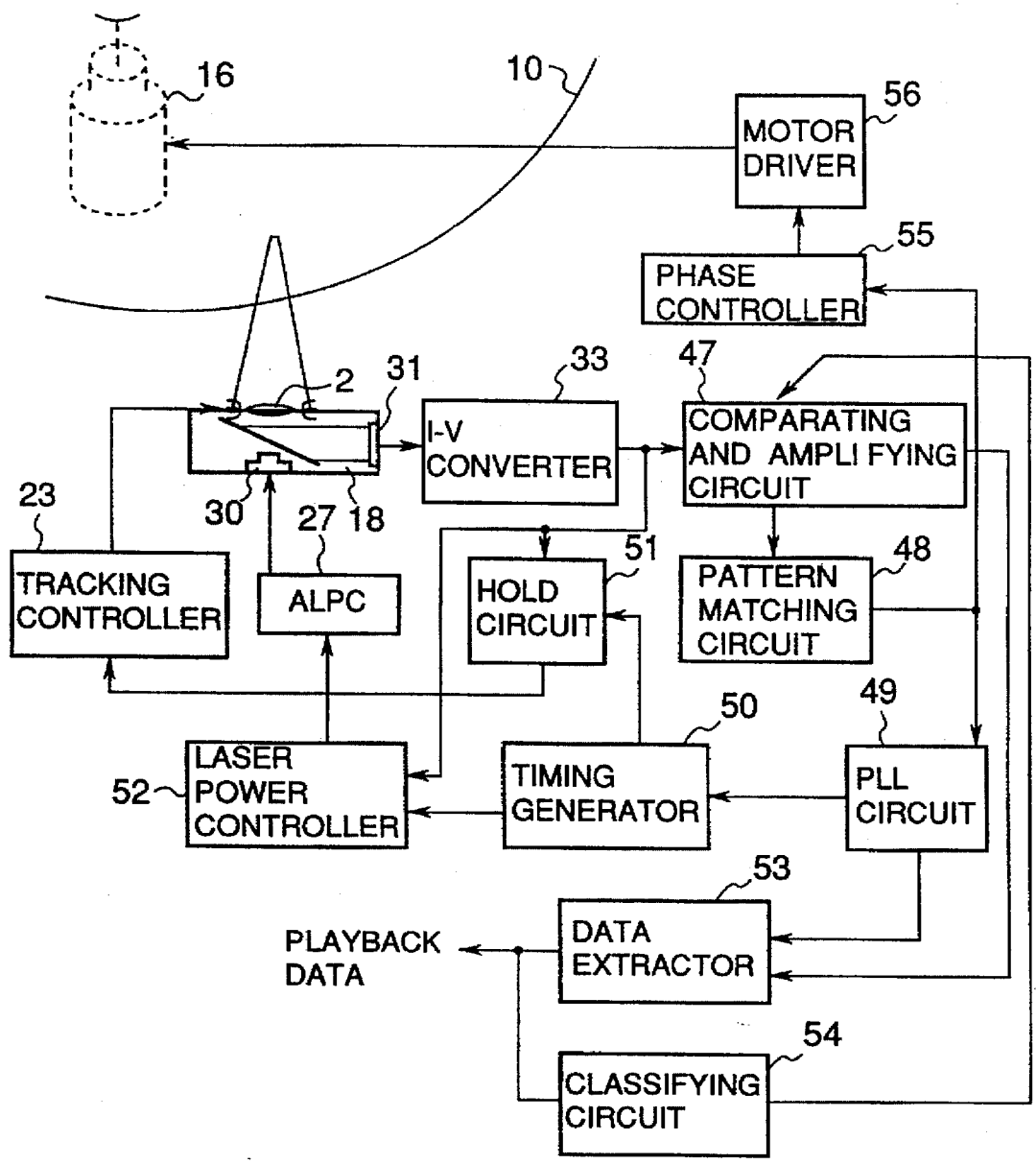
FIG. 16 is a block diagram showing a high-density optical disk recording/playback system of an embodiment of the invention.

FIG. 16 is a block diagram showing a high-density optical disk recording/playback system of an embodiment of the invention. Reference numerals identical to those in FIG. 1 to FIG. 7 denote identical or corresponding elements. The illustrated system comprises a comparing and amplifying circuit 47 for amplifying and binarizing the output of the I-V converter 33 to produce binary playback data, and a pattern matching circuit 48 for determining whether the binary playback data has any of predetermined patterns stored in a pattern memory, not shown, connected to the pattern matching circuit 48. The predetermined patterns include one used for identifying wobble pits, and one used for identifying a super-resolution reference signal (power setting area).

A PLL circuit 49 generates a reference clock in accordance with the output of the pattern matching circuit 48. Specifically, the playback data that is identified as the data from the wobble pits are used to control the frequency and phase of the PLL circuit 49, and the output of the PLL circuit 49 is used as the reference clock. A timing generator 50 is responsive to the reference clock from the PLL circuit 49 for producing various timing signals. The timing signals include those used for recording and playback of data signals, and an optimum power finding operation initiation timing signal used for initializing the optimum power finding operation, to be described later, and a latch timing signal for determining the timing at which the output of the I-V converter 33 is latched during the optimum power finding operation, as will be also described.

A hold circuit 51 is responsive to the output of the I-V converter 44 and the timing signal (indicating the timing at which a wobble pit area, to be described later, is scanned) from the timing signal generator 50, for detecting a tracking deviation or tracking error in accordance with the wobble signals as output from the I-V converter 33. A laser power controller 52 is responsive to the output of the I-V converter 33 and the timing signal (indicating the timing at which a power setting area, to be described later, is scanned) from the timing signal generator 50, for determining the optimum laser power in accordance with the preformatted super-resolution pattern signals as output from the I-V converter 33, and controlling the laser power to be maintained at the optimum value.

A data extractor 53 extracts the playback data from the output of the comparing and amplifying circuit 47. That is, it removes the preformat signals, or control signals used for identifying the playback data signal and/or for control over playback.

A classifying circuit 54 reads a bar code on the surface of the disk 10, between the part of the disk that is clamped and the part of the disk where data is recorded, to identify whether the disk is of a high-density recording type using a super-resolution medium, or of a write-once type, or of a playback-only type, formed only of the indent or embossed pits.

A phase controller 55 controls the rotation phase of the motor 16 in accordance with the output of the pattern matching circuit 48. A motor driver 56 drives the disk motor 16 under control by the phase controller 55.

Figure 17A:
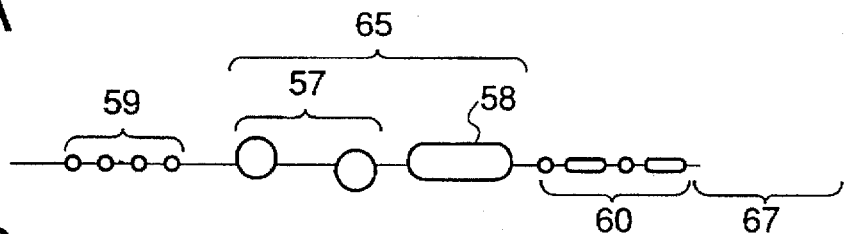
FIG. 17A is a schematically diagram showing embossed pits formed along a track in a preformatted area at the beginning of each sector.

FIG. 17A schematically show embossed pits formed along a track in a preformatted area at the beginning of each sector. The preformatted area includes a power setting area, in the form of a minimum pit sequence area 59, a wobble pit area 57, a wobble pit identifier area 58, and a sector address area 60. Formed in the minimum pit sequence area 59 are a sequence of preformatted pits, also denoted by reference numeral 59, having a minimum size. Only four pits 59 are shown to be formed, but in an actual example, several tens of pits are formed. Formed in the wobble pit area 57 are a pair of wobble pits, also denoted by 57, which are shifted from each other in the longitudinal direction of the track and shifted from the center of the track in opposite lateral directions from each other. Formed in the wobble pit identifier area 58 is a certain pattern of pit or pits representing binary signals to be identified by the pattern matching circuit 48 to indicate that the pits preceding it are the wobble pits. In the illustrated example, the pattern in the wobble pit identifier area 58 is an elongated pit, at a predetermined distance from the wobble pits. Formed in the sector address area 60 are a sequence of pits, also denoted by 60, representing the address of the sector. The sector address area 60 is followed by a data area 67, whose details are not shown.

Figure 17B:
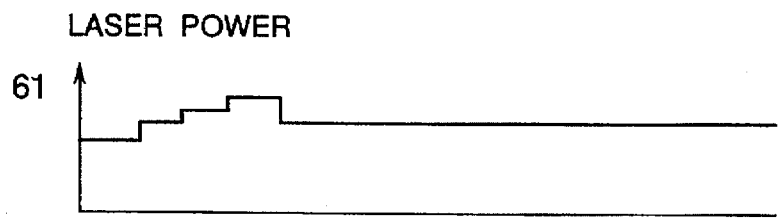
FIG. 17B to FIG. 17E are time charts showing a laser power, a playback signal, a binary playback data and a PLL reference clock, which are produced when the pits shown in FIG. 17A are scanned.

During playback of the disk, the power of the laser beam used for illuminating the disk, is controlled in accordance with the playback signal obtained from reflected beam from the minimum pit sequence area 59. That is, the laser power controller 52 finds an optimum value of a power of the laser beam which maximizes the level of the playback signal produced from the reflected light beam from the minimum pit sequence area, and maintains the power of the laser beam at the thus-found optimum value while the rest of the sector is scanned, or until the next minimum pit sequence area is scanned. The manner of finding the optimum value is described with reference to FIG. 18, as well as FIG. 17B and FIG. 17C.

Figure 17C:
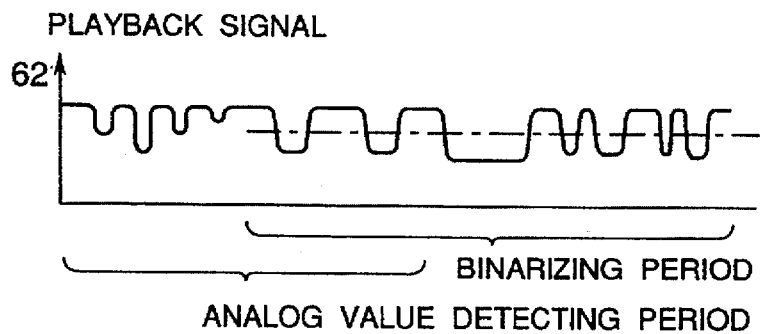
Figure 18:
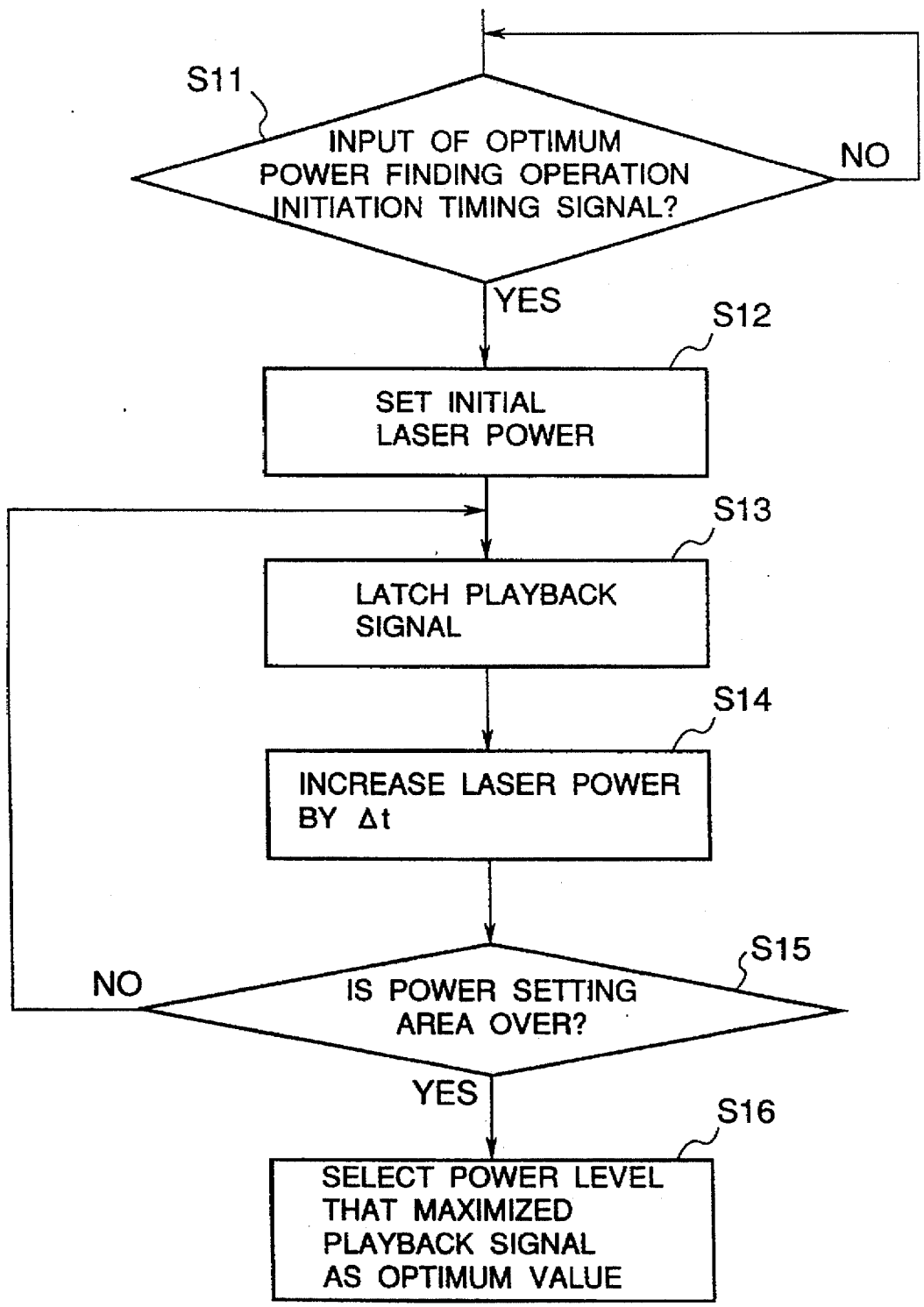
FIG. 18 is a flowchart showing the operation of the device shown in FIG. 16.

When the timing signal generator produces an optimum power finding operation initiation timing signal (S11), the laser power controller 52 commences the optimum power finding operation. That is, it sets the power at a certain initial value (S12), and then latches the playback signal at the output of the I-V converter 33 at a latch timing indicated by the latch timing signal from the timing signal generator 50 (S13). The laser power controller 52 then sets power to a next value increased from the preceding power by a predetermined amount Δt (S14), and then latches the playback signal at the next latch timing (S13). The same process is subsequently repeated. The setting of the power and the latching of the playback signal is conducted for each pit in the minimum pit sequence area, and is repeated until all the pits in the power setting area (minimum pit sequence area) 59 have been scanned (S15). In the example shown in FIG. 17A and FIG. 17B, four pits are provided in the minimum pit sequence area 59, and the laser power is set at four different values, with stepwise increase between them. The playback signal at the output of the I-V converter 33 is shown in FIG. 17C. In the example shown, the playback signal has the maximum amplitude (downward swing) when the second pit is scanned, i.e., when the laser power is at the value used for scanning the second pit. This laser power having produced the maximum playback signal is found to be the optimum value (S16), and stored and used during playback of the rest of the sector, until the next minimum pit sequence area is scanned (S11).

Because the pits used for finding the optimum value of the laser power are of the minimum size within the range it is desired to read (in other words, it is required to read pits having a size equal to or greater than the minimum size), the power thus found is optimum at least for the pits of the minimum size, which are most difficult to read. Stated conversely, the power may not be optimum for the pits of larger size, but since they are relatively easy to read, the power need not be optimum for them. But it has been found that if the power is optimum for the pits of the minimum size, the power is suitable for the pits of other sizes.

The playback signals obtained from the reflected beam from the wobble pits 57 are used for detecting tracking errors, and for producing timing signals. For detecting the tracking error, the hold circuit 51 temporarily holds the playback signal at the output of the I-V converter 33, and determines the difference in magnitude between the playback signals obtained from the reflected light from the wobble pits.

When the laser beam spot is on the center of the track, the playback signals obtained from the two wobble pits are identical, so that the difference is zero. When the laser beam spot is deviated from the center of the track, toward either side, there will be a difference in the magnitude of the playback signals, as indicated by broken lines TE in FIG. 17C. Accordingly, the difference will indicates the tracking error. The tracking error signal is supplied to the tracking controller 23, which performs control over the objective lens 2 so as to minimize the tracking error.

The wobble pit areas are provided at a spatial frequency sufficient to ensure tracking. For example. more than 2000 wobble pit areas are provided per revolution.

Moreover, the wobble pits have the dimension which are substantially equal to the laser beam spot so that greater playback signals are produced when they are detected.

Figure 17D:
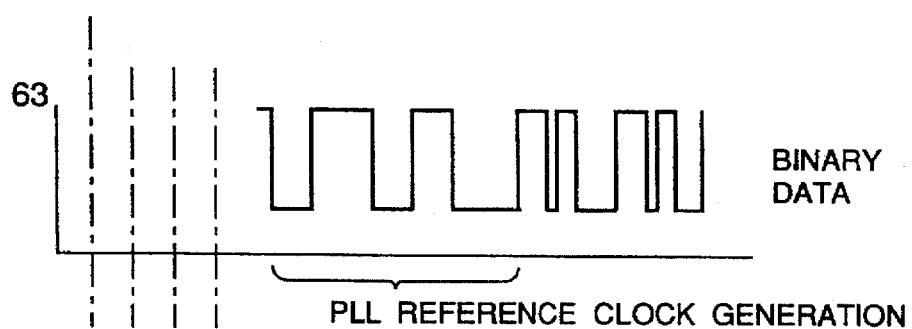
Figure 17E:
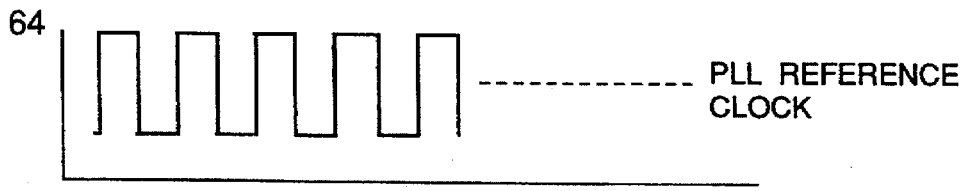

The playback signal obtained from the wobble pits is used as a reference for the PLL circuit 49. That is, the PLL circuit 49 produces clock pulses, also called PLL reference clock, shown in FIG. 17E, which have intervals identical to the interval between the pulsative signals (FIG. 17D) from the two wobble pits, and are in phase with the pulsative signals from the two wobble pits.

The PLL reference clock from the PLL circuit 49 is used for producing the timing signals by the timing generator 50.

The playback data obtained from the reflected beam from the wobble pit identifier area 58 is used for confirming that the data preceding such playback data are those of the wobble pits. For this purpose, the pattern matching circuit 48 receives the playback data from the comparing and amplifying circuit 47, and compares it with the stored wobble pit identifier reference pattern, and if it finds a match, it recognizes that the playback data is from the wobble pit identifier area.

Figure 19:
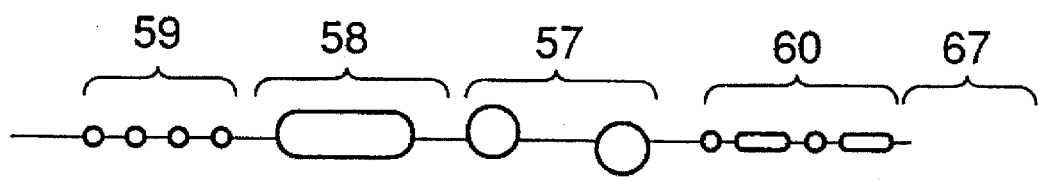
FIG. 19 is a schematic diagram showing another example of a sequence of pits in the preformatted area.

The order of the wobble pit identifier area and the wobble pit area may be reverse to that shown in FIG. 17A, that is it may be as shown in FIG. 19.

The reference pattern may be that for the combination of the wobble pits and the wobble pit identifier, rather than just the latter.

In the embodiment described with reference to FIG. 17A to FIG. 17E and FIG. 18, the power setting area is formed of a minimum pit sequence area, and the optimum value of the laser power is determined such that the playback signal is of a maximum amplitude when the pits of minimum size are read, and for this purpose, the disk is provided with minimum pit sequence areas.

Figure 20A:
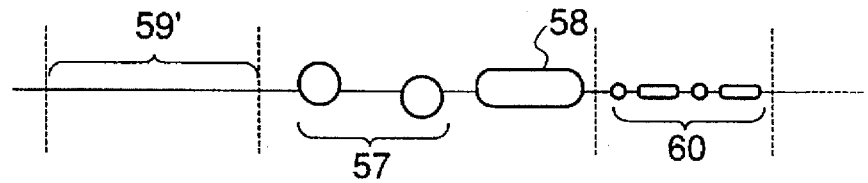
FIG. 20A and FIG. 20B are schematic diagrams showing another example of configuration of the preformatted area.
Figure 20B:
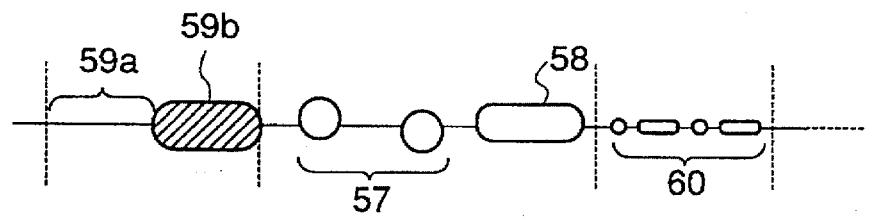

As an alternative, the power setting area may be formed of a no-pit area, as shown in FIG. 20A and FIG. 20B, where no pits are formed, and the power of the laser beam may be so controlled that the reflectivity of the light beam from the no-pit area is at a predetermined value or within a predefined range.

This can be implemented in the following manner. As shown in FIG. 20B, the no-pit area 59' is subdivided into a first sub-area 59a and a second sub-area 59b. In the first sub-area 59a, the phase-change type recording layer 4 is crystalline, and has a relatively high reflectivity. In the second sub-area 59b, the recording layer 4 is amorphous, and has a relatively low reflectivity. In the illustrated example, the lengths of the first and second sub-areas 59a and 59b are equal to each other.

Figure 20C:
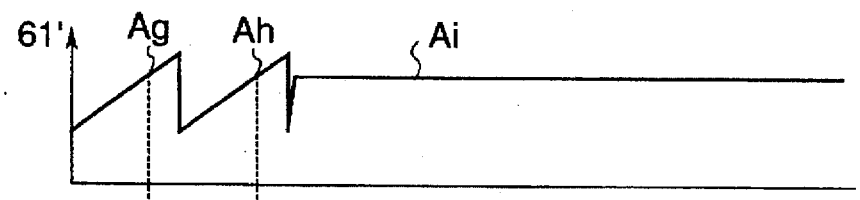
FIG. 20C and FIG. 20D are time charts showing the laser power and the playback signal that are produced when the preformatted area shown in FIG. 20A

When the laser beam begins to scan the no-pit area 59, the timing signal generator produces an optimum power finding operation initiation timing signal, the laser power controller 52 commences the optimum power finding operation. That is, it sets the power at a certain initial value, and then gradually increases it, until the scanning by the laser beam over the first sub-area 59a is over, as shown in FIG. 20C. Then, the laser power is lowered to the initial value, and is again gradually increased until the scanning over the second sub-area 59b is over, as shown in FIG. 20C. The rate of increase of the laser power during the scanning of the first sub-area 59a and the rate of increase of the laser power during the scanning of the second sub-area 59b are identical with each other, so that the final values at the end of the scanning over the first and second sub-areas 59a and 59b are equal to each other. The initial value (minimum value) and the final value (maximum value) of the laser power are so set that the former is close to zero, and the latter is close to a value where saturation of the playback signal occurs.

Figure 20D:
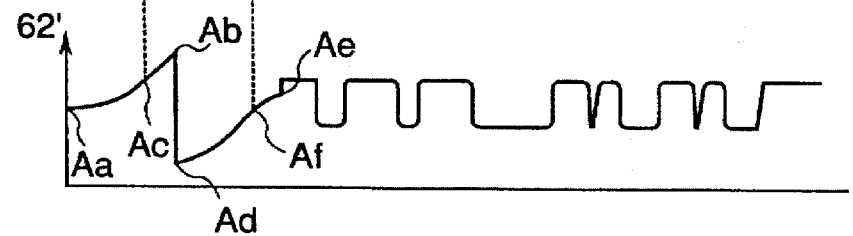

The variation of the laser power with respect to time is stored in the memory within the laser power controller 52. The variation of the playback signals with respect to time is also stored in the memory within the laser power controller 52. The levels of the playback signals obtained during the scanning over the first sub-area 59a and during the scanning over the second sub-area 59b differ from each other because of the difference in the reflectivity of the first and second sub-areas 59a and 59b. In FIG. 20D, the minimum value and the maximum value and an intermediate value of the playback signal level during the scanning over the first area 59a are denoted by Aa and Ab. Similarly, the minimum value and the maximum value of the playback signal during the scanning over the second area 59b are denoted by Ad and Ae.

Then, intermediate values Ac and Af given by:

$$Ac = Aa + \alpha(Ab - Aa)$$

$$Af = Ad + \alpha(Ae - Ad)$$

(where $\alpha$ represents a predetermined constant, and may for example be 0.3) are obtained, and the laser powers Ag and Ah that have respectively resulted in the intermediate values Ac and Af are found.

If the delay between the illumination by the laser beam and the playback signal corresponding to the reflection of the laser beam is negligible, the laser power that has resulted in a certain playback signal is the laser power that is being applied when the playback signal appears. If the delay must be taken account of, the laser power that was applied such a delay time before the playback signal appears is the laser power that has resulted in the playback signal. In FIG. 20C and FIG. 20D, the delay is assumed to be negligible.

When the laser powers Ag and Ah are found, then the average value Ai of the laser powers Ag and Ah is found. This average value Ai is then used as the optimum laser power during the scanning of the rest of the sector, i.e., until the next no-pit area 59 is scanned.

Using the intermediate values Ac and Af by internally dividing the minimum and maximum values Aa and Ad, and Ab and Ae, by $\alpha$: $(1-\alpha)$ as described above means that the desired reflectivity is set to be $\alpha$, and the size of the effective detection area is set to be $\alpha$ times the beam spot size. In other words, it means that the level of the playback signal is set to be $\alpha$ times the level of the playback signal that would be obtained if the recording pit were of the same size as the beam spot size and no variable transmittance medium layer were provided, i.e., the super-resolution technique were not used.

The coefficient $\alpha$ may be set to be 0.5, then the calculation for determining Ac and Af by means of a microcomputer or a digital signal processing circuit is facilitated.

Figure 21:
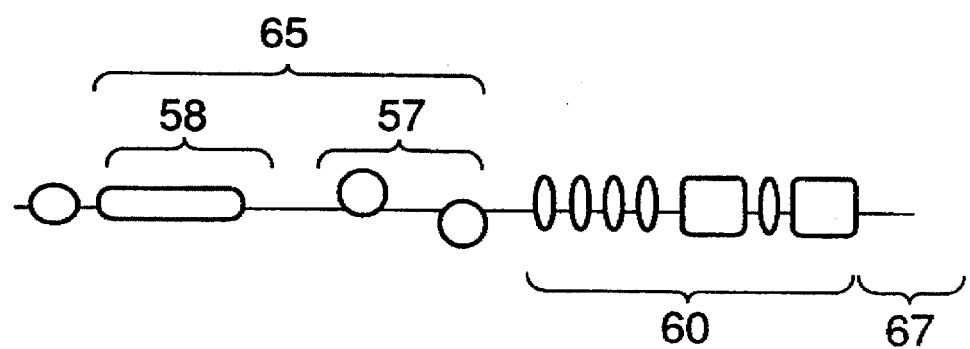
FIG. 21 is a schematic diagram showing another example of configuration of the preformatted area.

In the embodiments shown in FIG. 17A and FIG. 20A, the pits in the address area 60 are shown to be circular. However, as shown in FIG. 21, the pits in the preformatted area, in particular, the address area 60, may have a width (dimension in the lateral direction of the track) larger than the length (dimension in the longitudinal direction of the track). This is advantages, where the effective detection area 9 has a larger dimension in the lateral direction of the track, as shown in FIG. 21, as it is the area where the playback light spot 6 and the high-temperature area 8 overlap each other.

This shape of the pits may be used not only for the address area, but also other areas in the preformatted section, except the minimum-pit sequence area and the wobble pit area.

Also, some of the addresses, e.g., those indicating a field or frame of a motion picture, may be formed of preformatted pits having a size substantially identical to the beam spot size. This will facilitates high speed search.

Figure 22A:
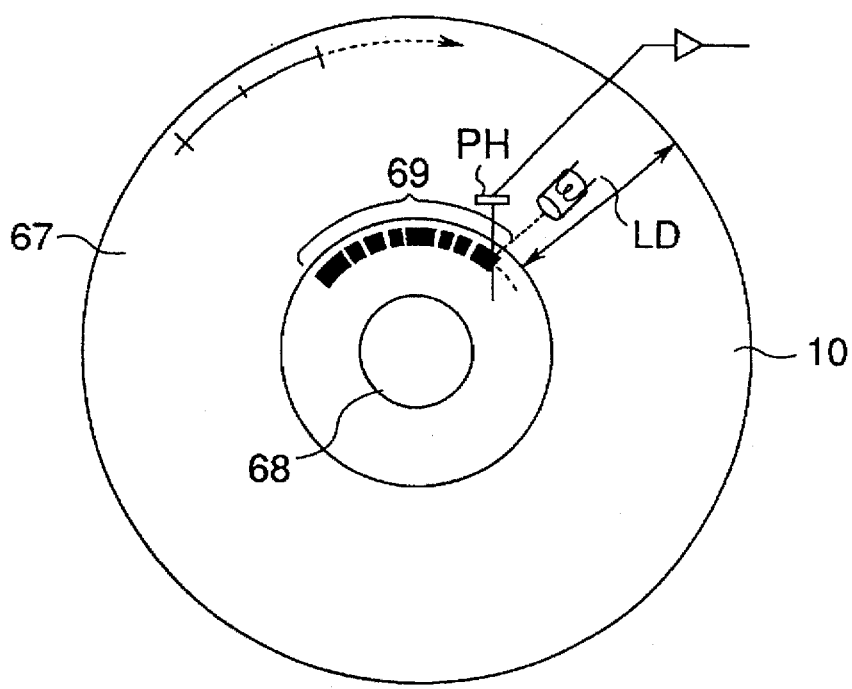
FIG. 22A is a schematic diagram showing an example of a disk having a printed code.

As illustrated in FIG. 22A, a printed code, such as a bar code, 69 may be provided on the surface of the disk, e.g., between its central part 68 which is clamped by a disk holding device of an optical disk drive device, and data area 67 where information to be reproduced is recorded. The printed code indicates whether the disk is a playback-only disk in which the data are recorded by means of embossed pits only, or the disk is of a super-resolution type, or a write-once disk.

Figure 22B:
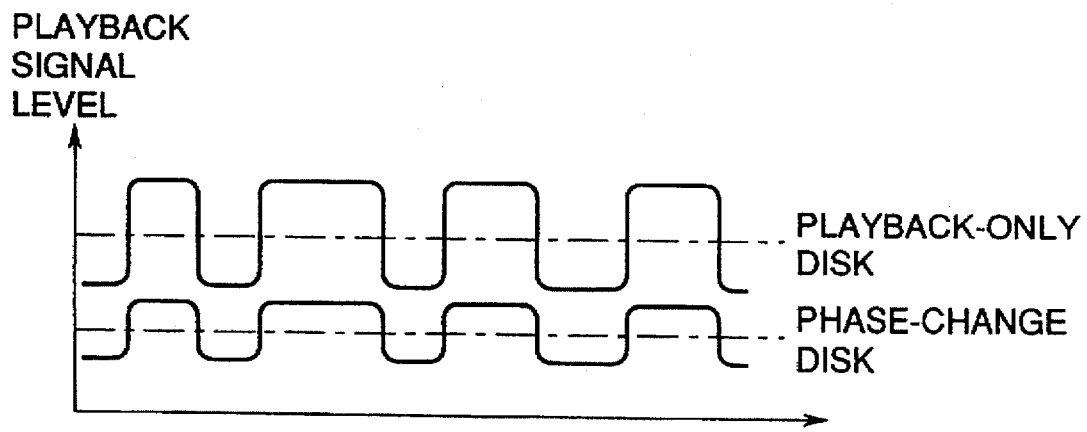
FIG. 22B is a time chart showing examples of waveforms which are obtained when a playback-only disk and a phase-change disk are scanned, respectively.

When such a printed code is provided, it is possible to identify the type of the disk by reading the printed code, and, according to the result of the identification, set one or more parameters, such as a threshold value or an amplification factor, used for processing the playback signals. The setting of the threshold or amplification factor according to the type of the disk is advantages because, the level of the playback signal differ depending on the type of the disk. For instance, the playback signal (the upper part of FIG. 22B) obtained from a playback-only disk is larger than the playback signal (the lower part of FIG. 22B) obtained from the phase-change type disk.

The printed code may be read by illuminating the printed code with a light-emitting diode LD and detecting the reflected light from the printed code by means of a photodiode PH. and processing the signal obtained from the photodiode PH in a well-known manner.

Figure 23A:
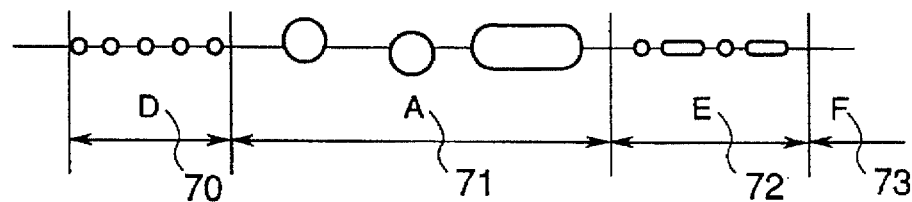
FIG. 23A to FIG. 23C are schematic diagrams showing an example of configuration of a preformatted area, a sector, and an assembly of sectors.
Figure 23B:
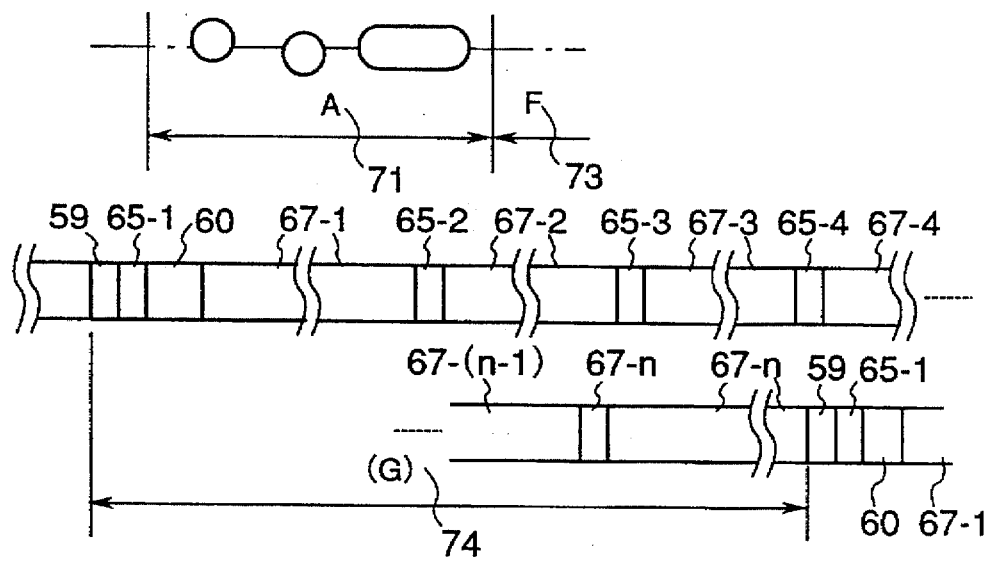
Figure 23C:
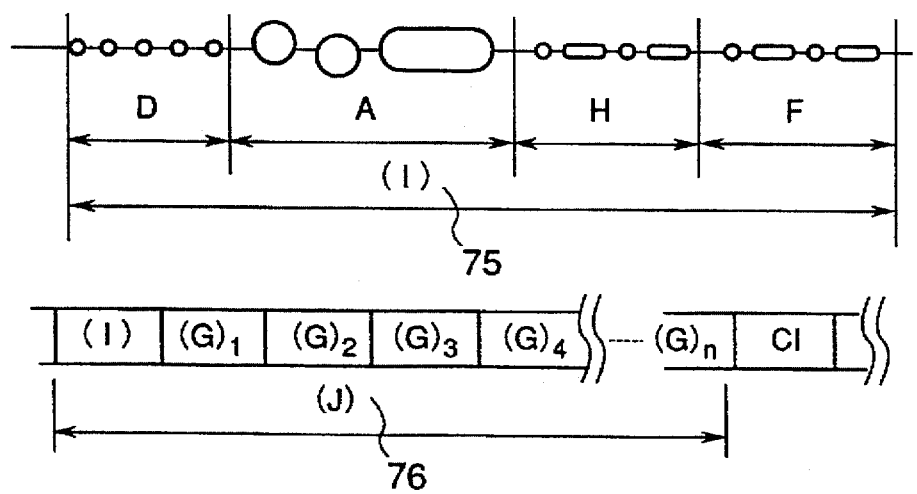

FIG. 23A to FIG. 23C show an example of sector configuration. FIG. 23A shows a preformat section at the head of each sector. It includes a power setting area 70, a wobble pit area 71, and an address area 72, followed by a data area 73. FIG. 23B shows a wobble mark section. Reference numeral 74 shows an arrangement of the areas 70 to 73 within a sector. FIG. 23C shows an assembly of a plurality of such sectors. Reference numeral 75 denotes a pit sequence in the preformat section at the head thereof, and 76 denotes an arrangement of the sectors.

Figure 24A:
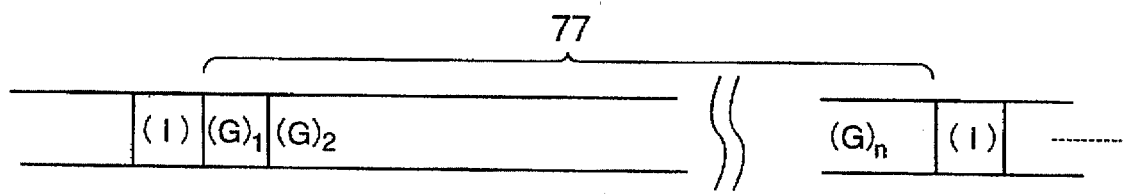
FIG. 24A to FIG. 24C are schematic diagrams showing variations of configurations of an assembly of sectors.
Figure 24B:
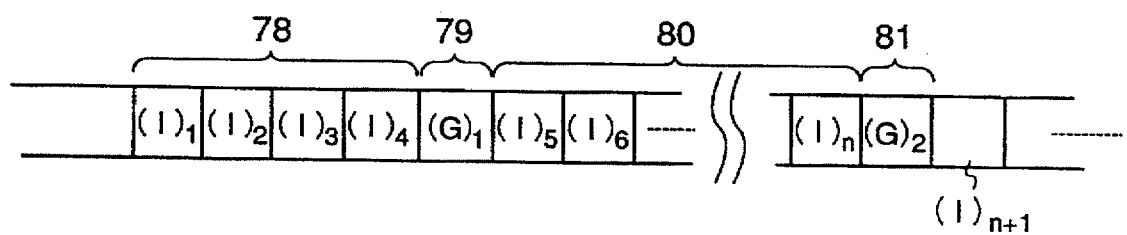
Figure 24C:
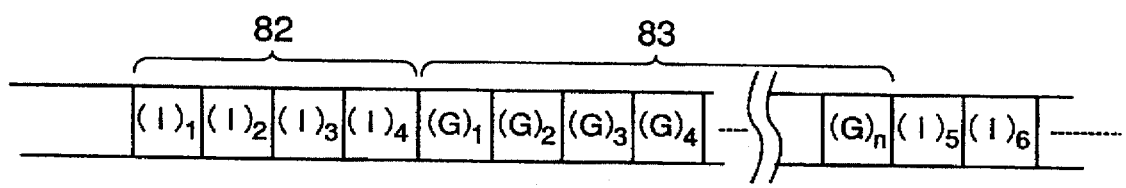

FIG. 24A to FIG. 24C show other examples of assemblies of sectors. In the region where digital motion picture information is recorded, each of the sectors is formed of a field or frame of the image data, and at the head of the field or frame, address information 72 formed of embossed pits having a size substantially equal to the playback beam spot size, and in the region where data other than image data, e.g., computer program data and control data, is recorded, the sub-address is formed by means of phase-change or using write-once technique.

For instance, when it is desired to record digital motion picture data (G)1 to (G)n, and provide index data used for inserting the motion picture data in some other still picture data, or for editing, at the head of the motion picture data, the arrangement shown in FIG. 24A is used.

When the amount of information of the character information, voice information, and computer program data is large, the arrangement shown in FIG. 24B is used.

When the motion picture data, and the computer program data and the like are both present, the arrangement shown in FIG. 24C is used.

The digital image data has a large amount of information, but it is not necessary to provide address information at short intervals, but it is sufficient if one address is provided per one field or frame, except where the field of frame of picture is divided and edited. Moreover, the data rate in each picture is set constant in telecommunication motion picture data compression algorithm, such as the MPEG system, and the H261 system. Accordingly, it is desirable that the image data be recorded in sectors preformatted on the disk. On the other hand, the amount of information of computer data, voice data, and character data is not constant, and the sectors must be set for individual units of information. In such a case, the address should be formed by phase-change. It is desired to form the address adjacent the wobble pits, which are provided at 2000 locations per revolution.

By providing sub-sectors, by dividing a preformatted sector and providing an address for each sub-sector, it is possible to conduct a search to find the computer program data and the 11ke.

Figure 25:
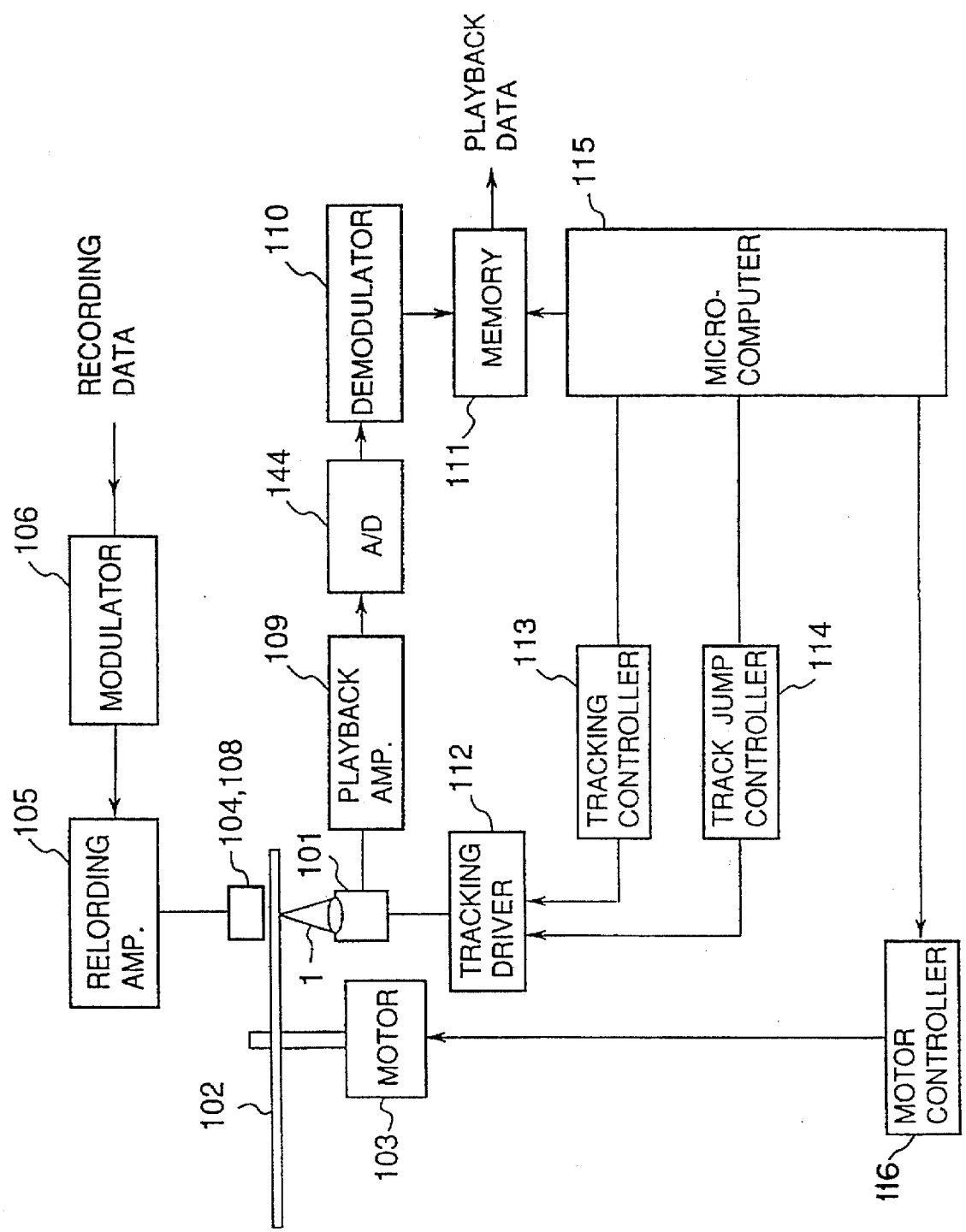
FIG. 25 is a block diagram showing an optical disk drive device of another embodiment of the invention.

FIG. 25 is a block diagram showing an optical disk drive device of another embodiment of the invention. As illustrated, the optical disk drive device of this embodiment comprises an optical head 101 for illuminating, with a laser beam 1 of a certain constant intensity and casting a certain beam spot, and thereby heating a magneto-optical disk 102 at a certain location, called illuminated location, a motor 103 driven by a motor controller 116 for rotating the magneto-optical disk 102 so that each part of the magneto-optical disk 102 passes through the illuminated location, a magnetic filed modulating head 104 modulating a magnetic field applied to the magneto-optical disk 102 at the illuminated location, a modulator 106 converting recording data into recording signal, a recording amplifier 105 driving the magnetic field modulating head 104 in accordance with the recording signal from the modulator 106, a super-resolution playback external magnetic field generating device 108, a playback amplifier 109 for amplifying the signal from the optical head 101, an A/D converter 144 for digitizing the output of the playback amplifier 109, a demodulator 110 for extracting playback data from the digitized playback signal, and a memory 111 for temporarily storing the playback data. The operation of the entire optical disk drive device, including the motor controller 116 and the memory 111, is controlled by a microcomputer 115.

A tracking driver 112, a tracking controller 113, and a track jump controller 114 conducting control for the light spot to jump across tracks responsive to a signal from the microcomputer 115.

The magneto-optical disk 102 has spiral or concentric tracks. In the example shown in FIG. 26A, it has spiral tracks. As illustrated in FIG. 26B, the magneto-optical disk 102 is formed of a substrate 137, a super-resolution layer 138, a magneto-optical recording layer 139 and a protective layer 140.

Figure 27A:
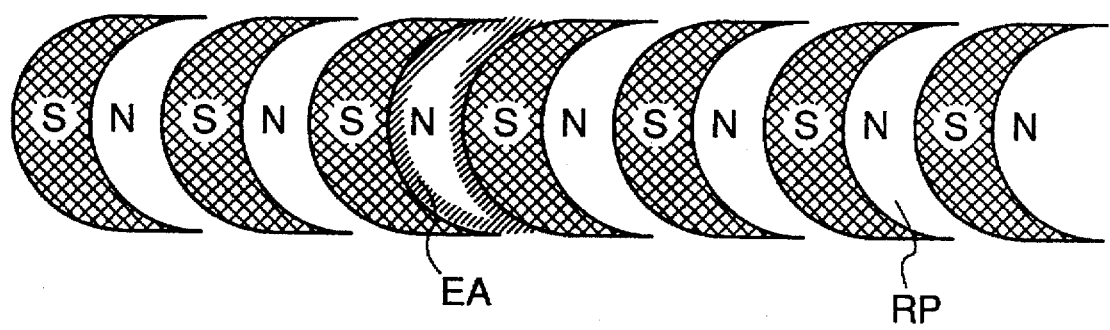
FIG. 27A is a schematic view of recording pits and effective detection area.

During recording, information is written using magnetic field modulation as in the prior art. That is, the magneto-optical disk 102 is rotated in one direction, called forward direction, so that each part of the disk passes through the illuminated location, where the disk is illuminated by the laser beam of the constant intensity, casting a beam spot of a certain diameter. Data to be recorded is converted at the modulator 106 into recording signals, and the recording amplifier 105 amplifies and supplies the recording signals to the magnetic field modulating head 104, which thereby modulates the magnetic field in accordance with the recording signals, while the magneto-optical disk is rotated in the forward direction. Accordingly, a sequence of recording bits RP are formed along the tracks as shown in FIG. 27A. As the recording density is set smaller than the diameter of the laser beam spot, the shape of each recording pit is crescent-shaped.

Figure 27B:
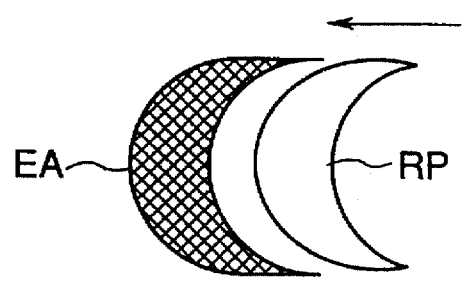
FIG. 27B is a schematic diagram showing the direction toward which the crescent-shaped recording pits and the effective detection area are convex.

During playback, the magneto-optical disk 102 is rotated in the direction (reverse direction) opposite to the above-mentioned forward direction (the direction in which the magneto-optical disk is rotated during recording). By rotating the magneto-optical disk in the reverse direction, the direction toward which the crescent-shaped effective area (due to super-resolution phenomenon) during playback is convex will be identical to the direction toward which the crescent-shaped recording pits are convex as shown in FIG. 27A and FIG. 27B. Accordingly, there will be a moment at which the effective area entirely or almost entirely covers each recording pit, and does not cover adjacent pits at all or hardly covers adjacent pits ("adjacent" in the direction of the tracks), and mixing-in of the information from the adjacent pits can be prevented, and the signal-to-noise ratio can be improved substantially. Thus, the recording pits formed at a high density are reproduced with a high accuracy.

Figure 15A:
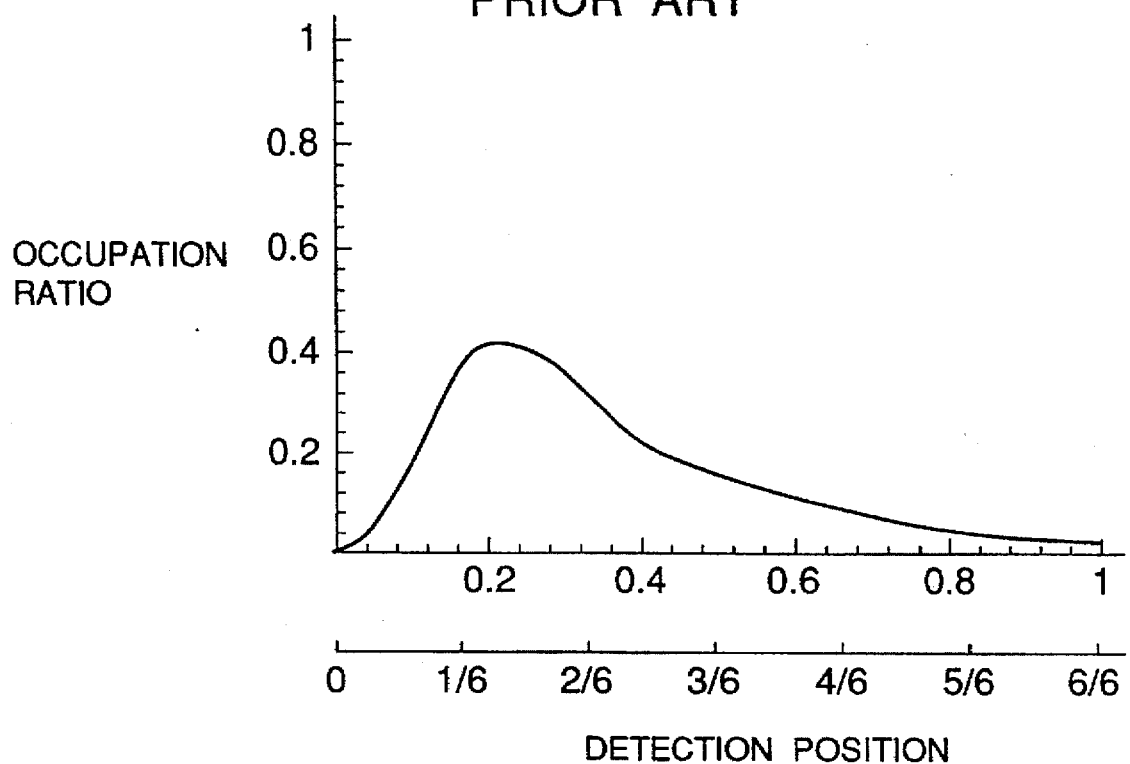
FIG. 15A is a diagram showing a occupation ratio.
Figure 15B:
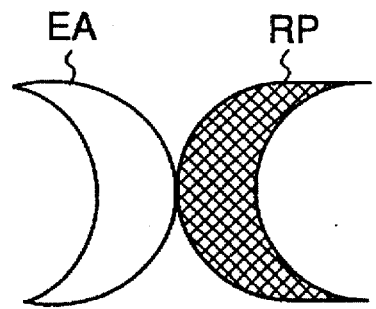
FIG. 15B and FIG. 15C show relative position of a recording pit and an effective detection area.
Figure 15C:
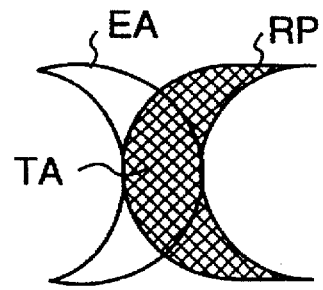

This will be further explained with reference to FIG. 28, which shows the results of calculation of the aperture occupation ratio for the case where the magneto-optical disk is rotated in the same direction as in recording according to the prior art, and for the case where the magneto-optical disk is rotated in the reverse direction according to the present embodiment. The former and latter eases are illustrated by curves (a) and (b) respectively. The curve (a) is identical to the curve in FIG. 15. It is assumed that the recording is so conducted that the pit length is ⅙ the laser beam diameter, and the super-resolution playback is so conducted that the length of the effective area is also ⅙ the laser beam diameter. It will be seen that in the case of the prior art (curve (a)), the aperture occupation ratio is 50% at most, while in the case of the present embodiment (curve (b)), the maximum aperture occupation ratio is 100%, and information from adjacent pits can be minimized.

Playback signals obtained during playback by the prior art method and the method of the present embodiment were measured and compared. It has been found that the playback signal obtained in the present embodiment is about 10 dB higher than the playback signal obtained in the prior art. Moreover, the playback signal obtained in the prior art had distorted waveforms, while the playback signal obtained according to the present embodiment had a purely sinusoidal waveform.

Figure 29:
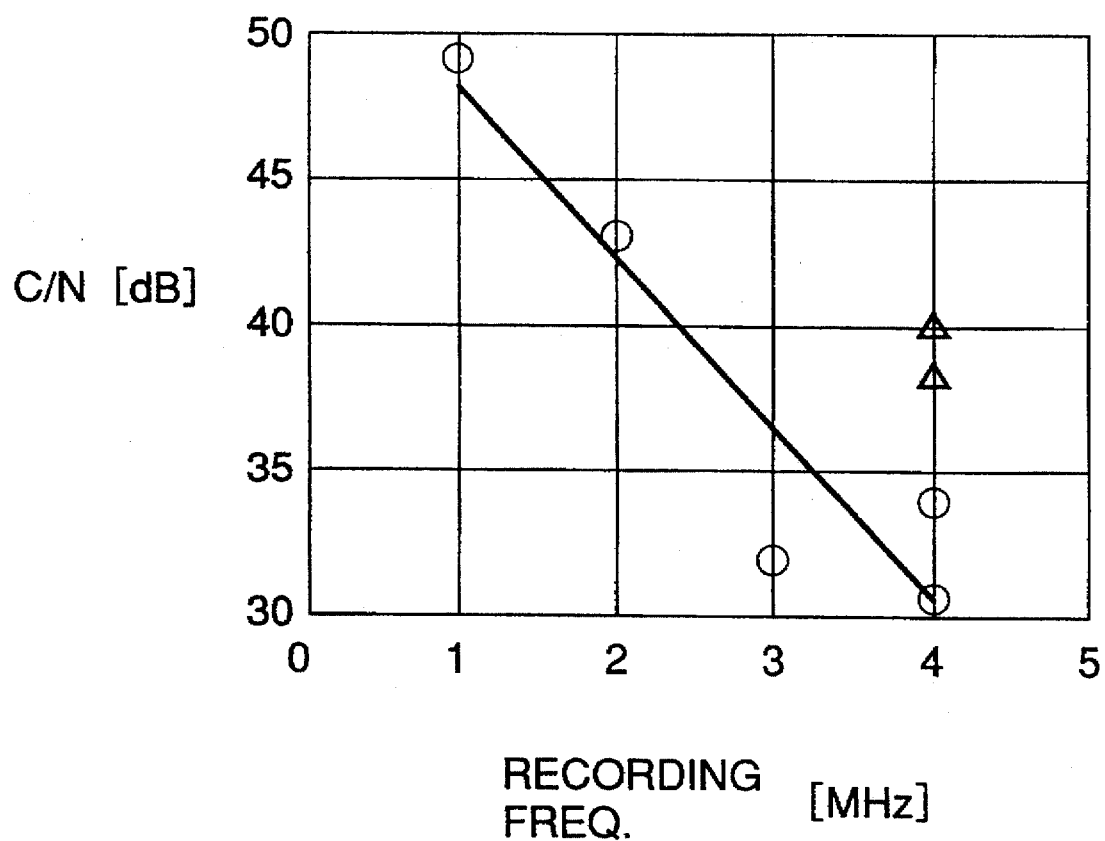
FIG. 29 is a diagram showing C/N ratios obtained if the direction toward which the crescent-shaped recording pits are convex and the directions toward which the effective detection area are convex are identical with each other, and the C/N ratio that is obtained if the direction toward which the crescent-shaped recording pits are convex and the directions toward which the effective detection area are convex are opposite to each other.

C/N ratios during playback, by the prior art method and the method of the present embodiment are shown in FIG. 29, by circles and triangles, respectively. The cutoff recording pit frequency (the frequency above which playback is not possible due to the limitation of the optical spatial frequency) is 4 MHz. In the area near the cutoff frequency, the C/N ratio is higher in the present embodiment (triangles) than in the prior art (circles).

Figure 30:
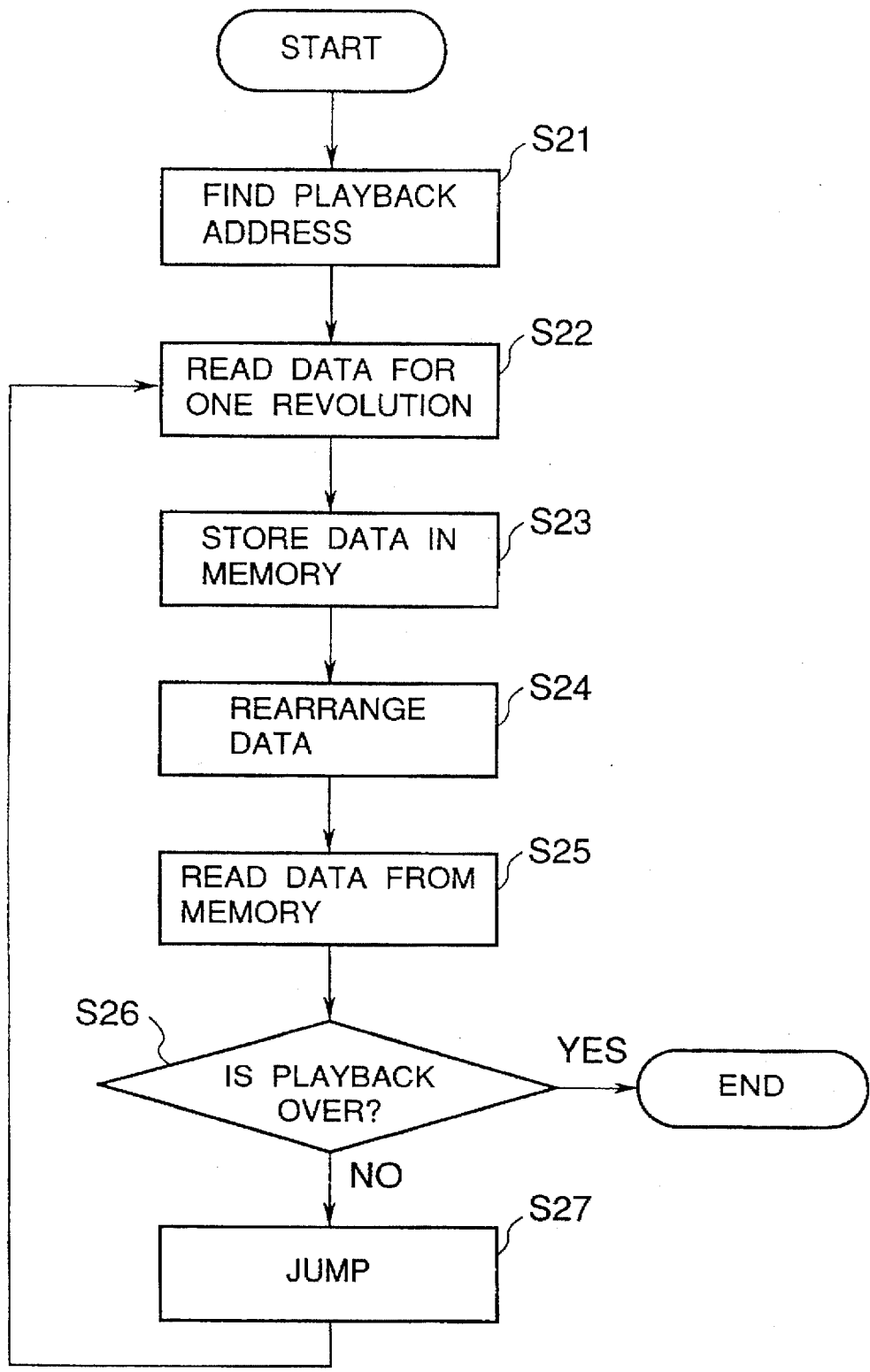
FIG. 30 is a flowchart showing the operation during playback.

The sequence in which the recording pits are reproduced is explained with reference to FIG. 26A, and the operation of the microcomputer 115 for the playback will be explained with reference to FIG. 30.

Figure 26A:
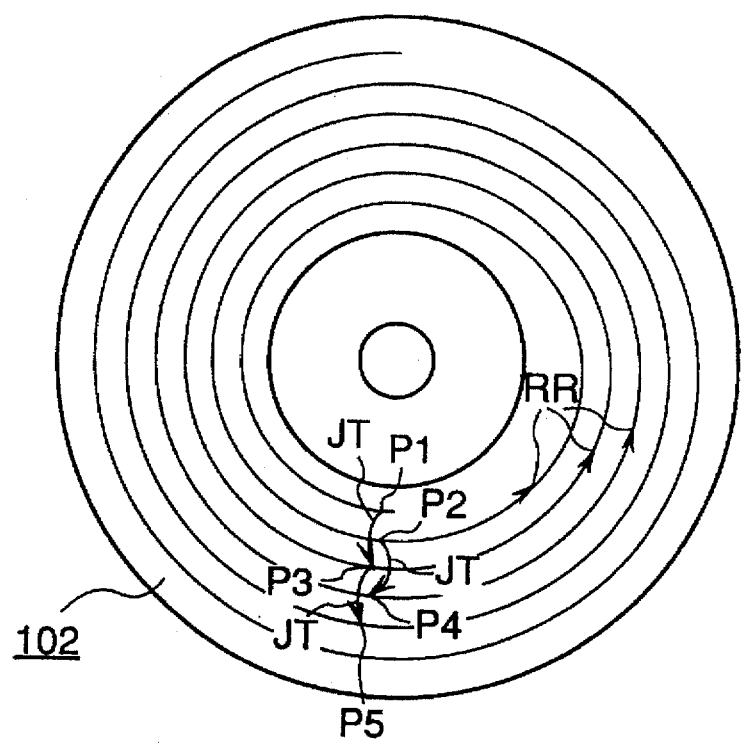
FIG. 26A is a schematic diagram showing spiral tracks.
Figure 26B:
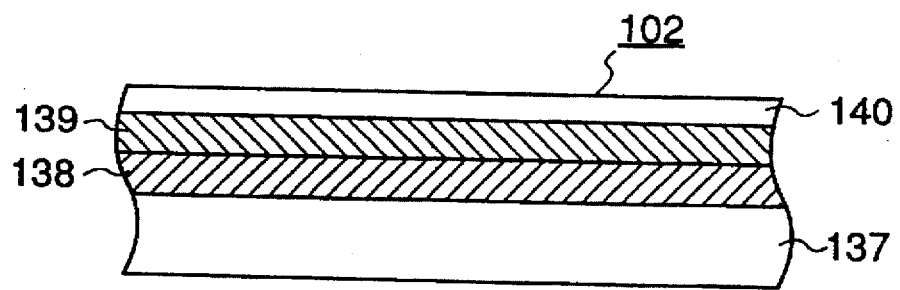
FIG. 26B is a schematic sectional view showing the layer configuration of a magneto-optical disk.

As indicated by arrows RR in FIG. 26A, the optical head 101 is made to scan the tracks in the reverse order, as the disk 102 is rotating in the reverse direction. Each time the disk rotates one revolution, the optical head is made to skip or jump over one track to the second track from the current track (the track having been scanned), as indicated by arrow JT. In the example illustrated, scanning of one revolution starts at point P2 and ends at P1, and then a jump JT is conducted from point P1 to P3. Then, scanning is conducted from P3 to P2, and then a jump is conducted from P2 to P4. Similar scanning and jumping are conducted in the same manner. In this way, information is reproduced from the tracks in turn. However, the order of the bits of information as reproduced during the reverse rotation is reverse to the sequence of bits forming the information originally recorded. It is therefore necessary to reverse the order of the bits of the playback data during playback. This is achieved under control by the microcomputer 115, and using the memory 111, as explained next with reference to FIG. 30.

First, a search is conducted to find the playback address on the disk. That is, the optical head is brought to the address of the disk where the information to be played back is recorded (S21).

The playback signal is obtained from the optical head 101 during reverse rotation of the magneto-optical disk 102, and are passed through the playback amplifier 109 and the demodulator 110, to become the playback data formed of a sequence of bits. Because the rotation is in the reverse direction, the order of the sequence of the bits of the playback data is reverse to the order of the sequence of the bits of the information that is recorded. For this reason, the sequence of the bits of the playback data is reversed during playback in the circuit for processing the playback data. In the example illustrated, the bits of the playback data obtained at the output of the demodulator 110 during one revolution of the magneto-optical disk 102 are read and stored in the memory 111 (S22 and S23), and the bits of the data are rearranged (S24), by for example relocating (altering the memory locations) within the memory 111, and the bits of the data are read from the memory 111 (S25) in the corrected, or restored order.

Judgement is then made whether all the data has been played back (S26). If all the data has not been played back, track jump is conducted (S27). That is, the optical head is made to jump to the second track from the current track.

Instead of scanning the tracks one revolution and then jumping to the second track from the current track, as in the above embodiment, the arrangement may be such that the optical head scans n tracks (n being an integer) for n revolutions, and then jumps over (2n-1) tracks to the 2n-th track from the current track. In this case, the order of the bits of the data obtained during scanning by n revolutions is reversed in the playback circuit using the memory 11 under control by the microcomputer 115.

The arrangement may still alternatively such that the bits of the data are read in the reverse order for a fraction of one revolution, e.g., for one sector or a plurality of sectors, and the head is made to jump, while the bits of the data thus read are reversed by means of a memory.

The optical disk drive device described above is provided with the magnetic field modulating head 104, the recording amplifier 105 and the modulator 106 for recording. But these may not be provided where the device is used for playback only.

The rotation speed during playback may be set a little higher than usual, so that the rate of reading data during playback is a little higher than usual. This is to take account of the time needed for the jump when the data is not read from the disk. With such an arrangement, the data read from the disk may be stored in the memory 111 or some other memory, and are read out at the normal rate. By such an arrangement, signal playback is not interrupted even when the reading from the disk is interrupted.

The rotation speed during playback may be set about twice, or a little higher than twice the usual speed. This is to take account of any failure in tracking after jumping. When such a failure occurs, it is necessary to wait for the disk to turn one revolution, until the beginning of the sequence of data for one revolution of track is brought under the optical head. There is therefore a loss of time for one revolution. If however, the disk is rotated at a double speed, such a loss of time can be absorbed, and the playback can be continued without interruption.

Figure 31:
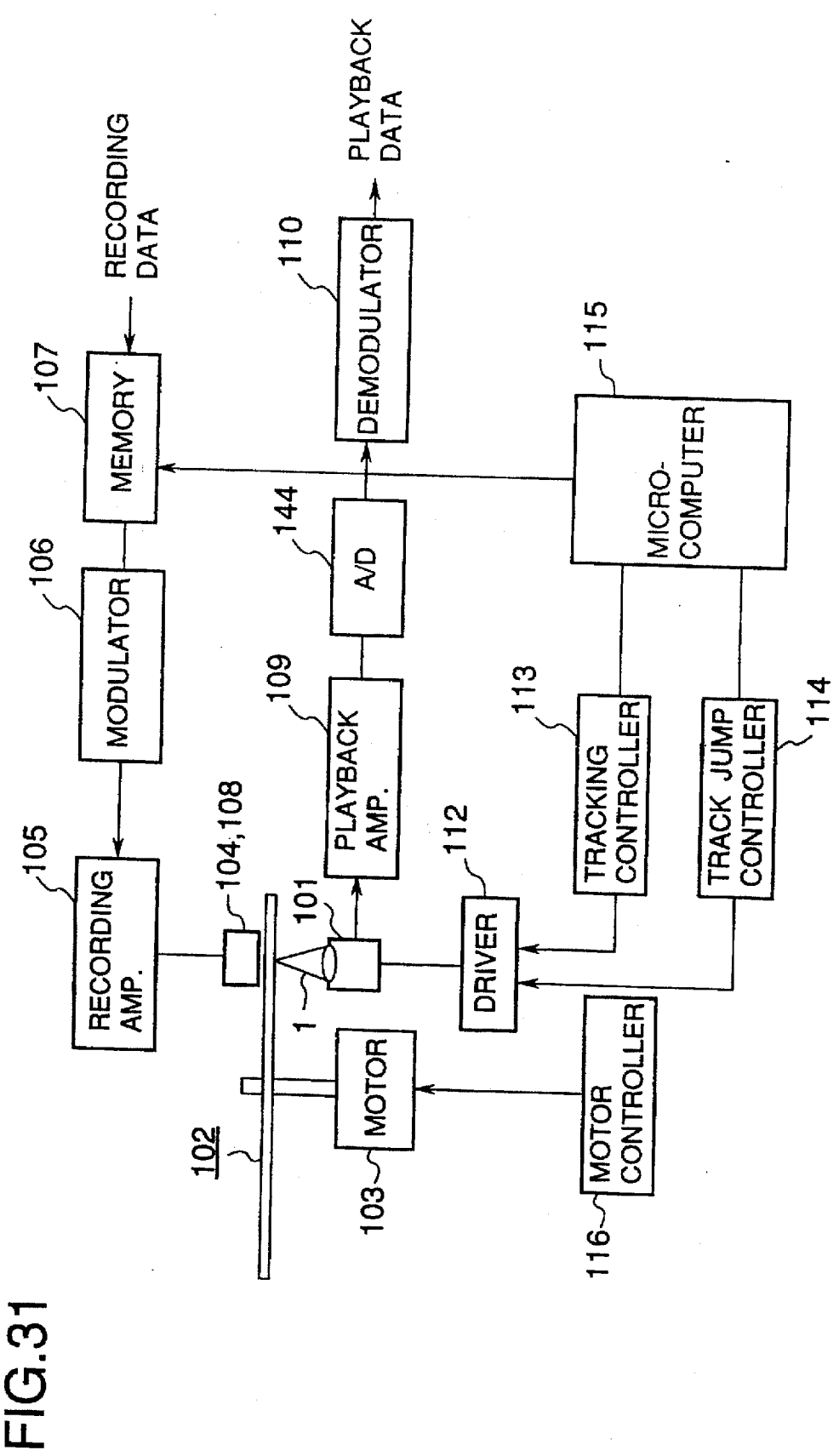
FIG. 31 is a block diagram showing an optical disk drive device of another embodiment.

FIG. 31 shows an optical disk drive device of another embodiment. The reference numerals identical to those in FIG. 25 denote identical or corresponding elements. An additional element is a memory 107 for temporarily storing the recording data, and reversing the order of the bits of the data. The bits of the data whose order has been reversed are supplied to the modulator 106, and then sent to the recording amplifier 105. The motor controller 116 controls the motor 103 to rotate it in the reverse direction (reverse to the direction in which the disk is rotated for recording in ordinary optical disk drive devices). Each time recording for one revolution of track is completed, the magnetic field modulating head 104 is made to jump to the second track from the current track.

During playback, the disk 102 is rotated in the forward direction, by appropriate control over the motor 103 by means of the motor controller 116. The playback signals are amplified by the playback amplifier 109, and then converted into playback data which is directly (without having the order of the bits forming it being reversed) output.

Figure 32:
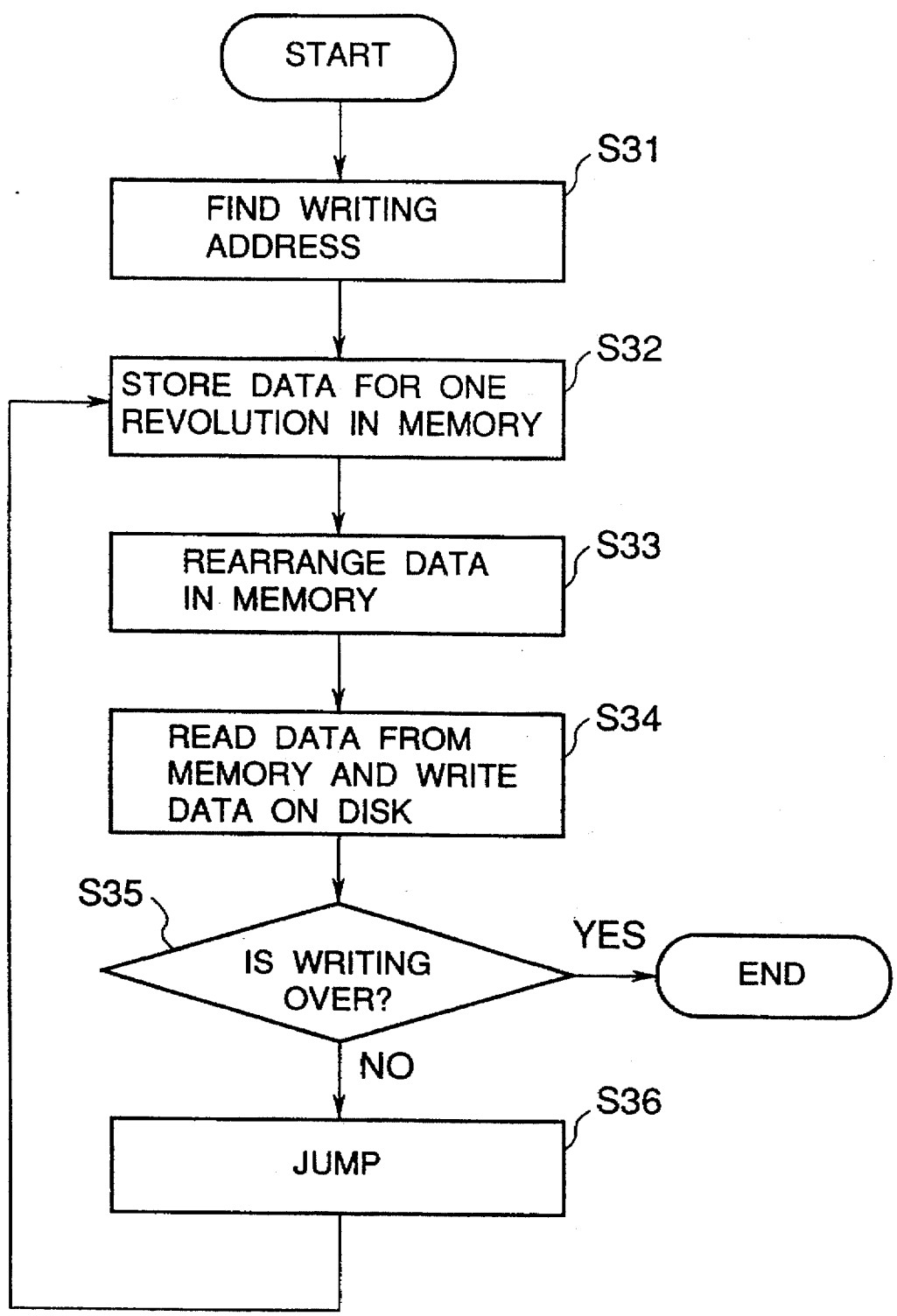
FIG. 32 is a flowchart showing the operation during writing.

The operation of the magnetic field modulating head and the microcomputer are shown in FIG. 32. As illustrated, a search is conducted to find the writing address (S31). Then, the recording data for one revolution of track is stored in the memory (S32). The sequence of the bits of the data is then reversed in the memory (S33). The bits of the data whose order has been reversed are written in the disk along one revolution of track (S34). When writing for one revolution is completed, the head is made to jump to the second track from the current track (S35). Then, similar operations are repeated until all the data has been written (S34).

Modifications described in connection with the embodiment of FIG. 25 can also be applied to the embodiment of FIG. 31.

If a memory having a capacity of recording all the data for one disk is available, the bits of the data may be recorded in the reverse order, continuously throughout the disk, while rotating the disk in the reverse direction. If the disk is of such a type which the user uses it only for playback, and a disk supplier records data before delivering it to the user, all the bits of the data are similarly recorded in the reverse order, continuously throughout the disk, while rotating the disk in the reverse direction.

Figure 33:
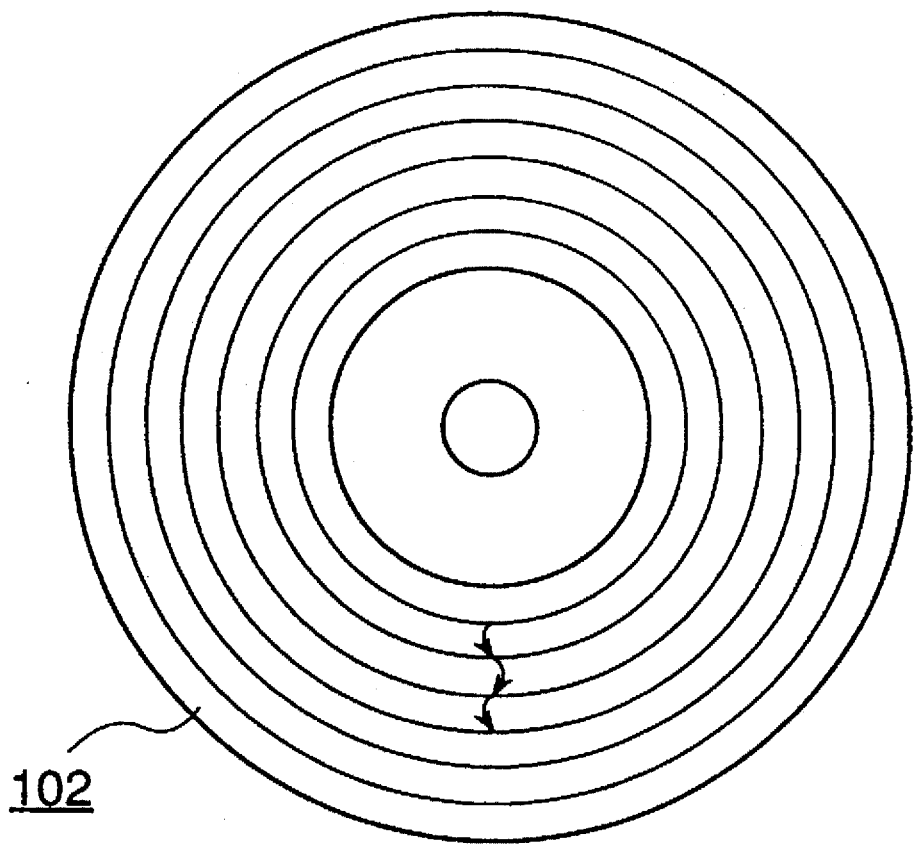
FIG. 33 is a schematic diagram showing concentric tracks.

In the embodiments of FIG. 25 and FIG. 31, the disk has a spiral track. Alternatively, the disk may have concentric tracks, as shown in FIG. 33. In this case, the configuration of the disk drive device can be also as shown in FIG. 25 or FIG. 31, and the operation is as shown in FIG. 30 or FIG. 32, except that the optical head is made to jump to a next track (at the step S27 or S37), as shown in FIG. 333.

It should also be noted that the jumping to another track is conducted without regard to whether the disk is rotated in the normal direction (rather than the reverse direction). That is, where the bits of the data are played in the reverse order, the disk is rotated in the normal direction during recording, and yet the jumping is made from one track to another between recording of one revolution and recording of another revolution. Similarly, where the bits of the data are recorded in the reverse order, and the disk is rotated In the normal direction during playback, and yet the jumping is made from one track to another between playback from one revolution of track and playback from another revolution of track.

Figure 34:
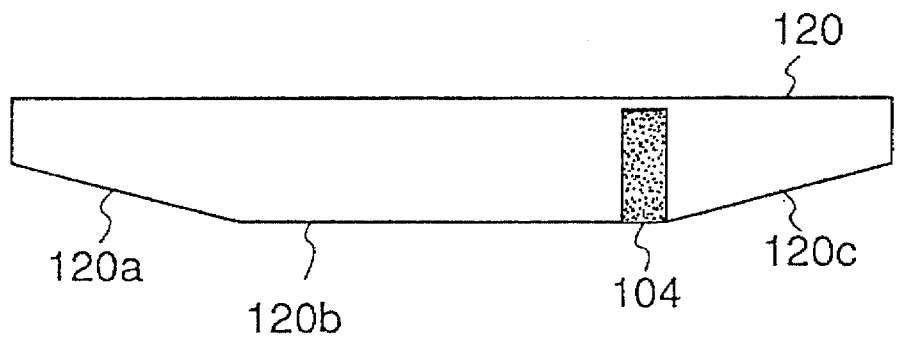
FIG. 34 is a side view showing an example of slider.
Figure 35:
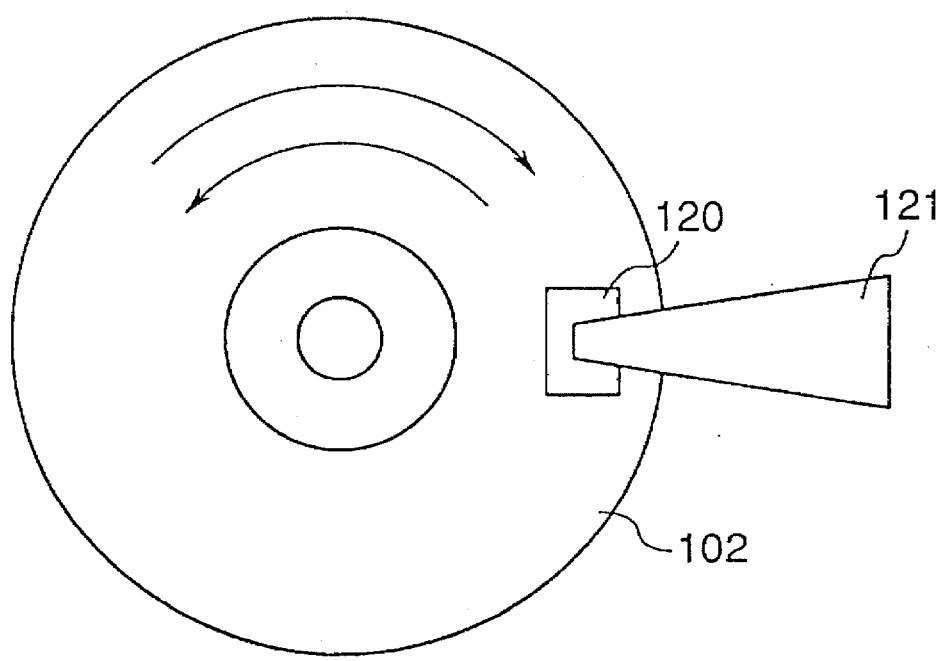
FIG. 35 is a top view showing the slider, a holder, and the disk.

FIG. 34 is a side view showing an example of slider which may be used in the optical disk drive devices described with reference to FIG. 25 to FIG. 33. The illustrated slider 120 has a front tapered portion 120a, a bottom portion 120b and a rear tapered portion 120c, and a magnetic field modmagnetic field 104 attached to emanate a magnetic field from the bottom portion 120b, at a position close to the rear tapered portion 120c. The slider 120 is rotatably supported by an arm 121, which is shown in FIG. 35.

Figure 36A:
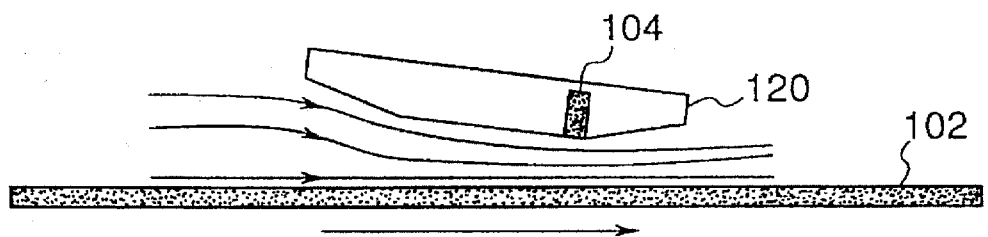
FIG. 36A and FIG. 36B are diagrams showing how the slider of FIG. 34 is made to float during forward and backward scanning.

During recording, the disk 102 is rotated in the forward direction, so that the air stream strikes the front tapered portion 120a. As a result, the front part of the slider 120 is lifted, as shown in FIG. 36A, and the magnetic field modulating head 104 is positioned closest to the disk 102.

Figure 36B:
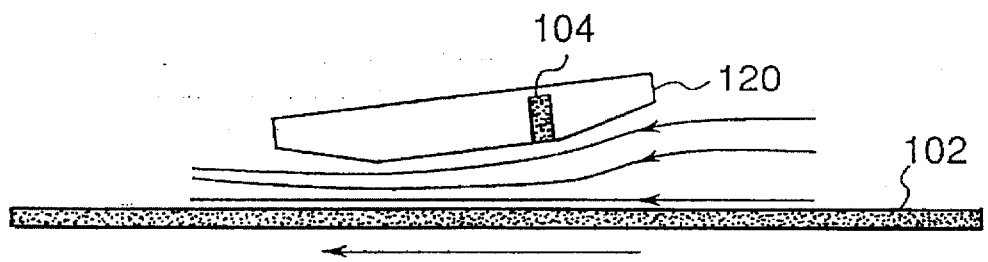

During playback, the disk 102 is rotated in the reverse direction, so that the air stream strikes in the rear tapered portion 120c. As a result, the rear part of the slider 120 is lifted, as shown in FIG. 36B.

In this way, the bottom portion 120b of the slider 120 floats regardless of the direction of rotation of the disk, and the slider 120 is prevented from contacting the disk.

It may be so arranged that the disk has a non-recorded zone in which data is not recorded and in which the slider is positioned when the disk is not rotating, or when the disk is rotating slowly. Alternatively, a holding device may be provided to hold the slider from contacting the disk.

Figure 37:
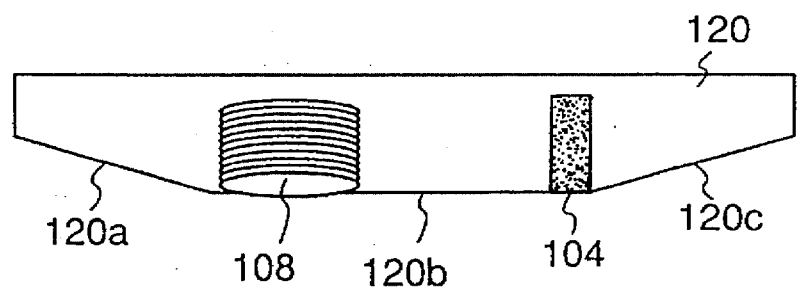
FIG. 37 is a side view showing another example of slider.

FIG. 37 is a side view showing another example of slider 120. The illustrated slider 120 is similar to the slider 120 of FIG. 34, but is additionally provided with a super-resolution playback external magnetic field generator 108, which is provided to emanate a magnetic field from the bottom portion 120b, and positioned close to the front tapered part 120a.

Figure 38A:
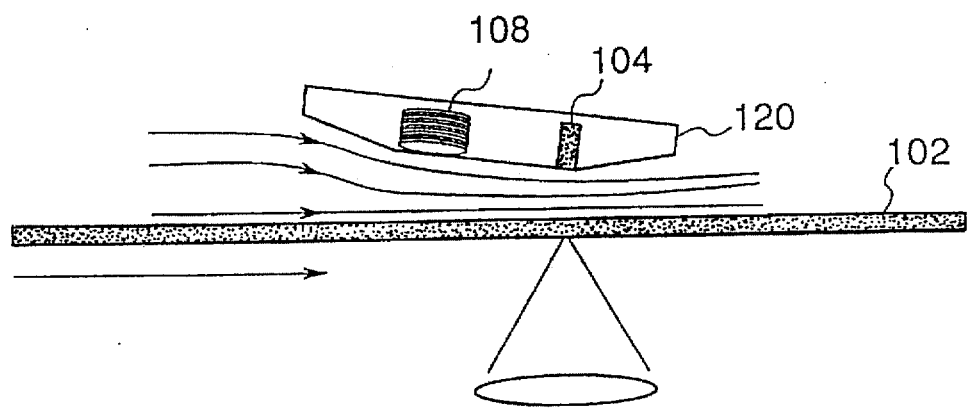
FIG. 38A and FIG. 38B are diagrams showing how the slider of FIG. 37 is made to float during forward and backward scanning.
Figure 38B:
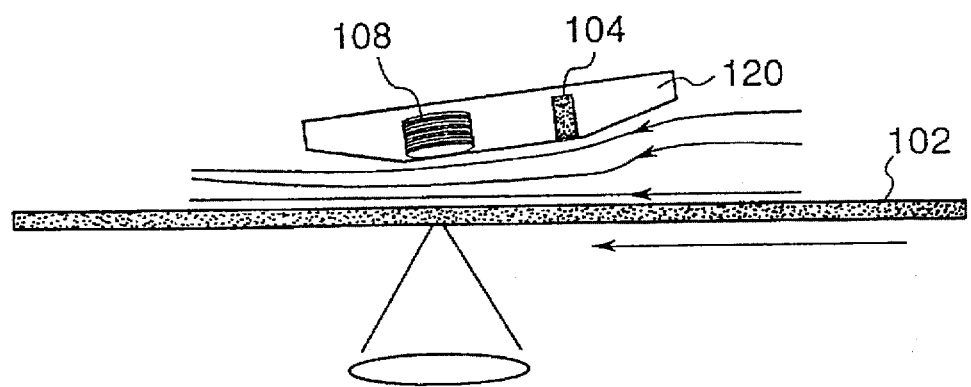

During recording, the disk 102 is rotated in the forward direction, and the front part of the slider 120 is lifted, as shown in FIG. 38A. During playback, the disk 102 is rotated in the reverse direction, and the rear part of the slider 120 is lifted, as shown in FIG. 38B. The super-resolution playback external magnetic field 108 is positioned so that when the rear part of the slider 120 is lifted, it is closest to the disk 102.

The slider 120 can be shifted in the longitudinal direction of the track, so that its longitudinal position during playback is different or shifted from the longitudinal position during recording, and, during playback, the magnetic field is generated by the playback external magnetic field 108 opposite to the part of the disk where the beam spot is formed, and, during recording, the magnetic field is generated by the magnetic field modulating head 104 opposite to the part of the disk where the beam spot is formed. Instead of moving the slider as described above, the optical head 101, provided on the opposite side of the disk, may be moved in the longitudinal direction of the track.

Thus, it is possible for the slider 120 to operate properly regardless of the direction of rotation of the disk 102, and to shift the slider 120 longitudinally of the track to the position of the beam spot for recording and playback.

Figure 39:
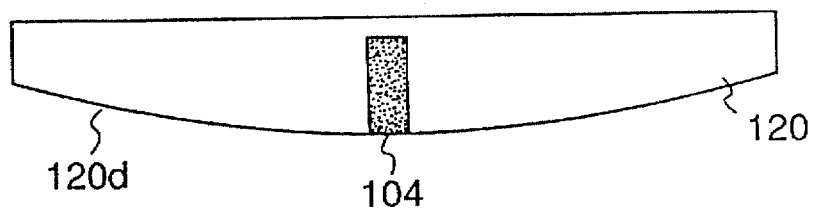
FIG. 39 is a side view showing another example of a slider.

FIG. 39 is a side view showing another example of slider. The illustrated slider 120 has an arcuate bottom 120d, and having a magnetic field modulating head 104 at the center of the bottom 120d.

Figure 40A:
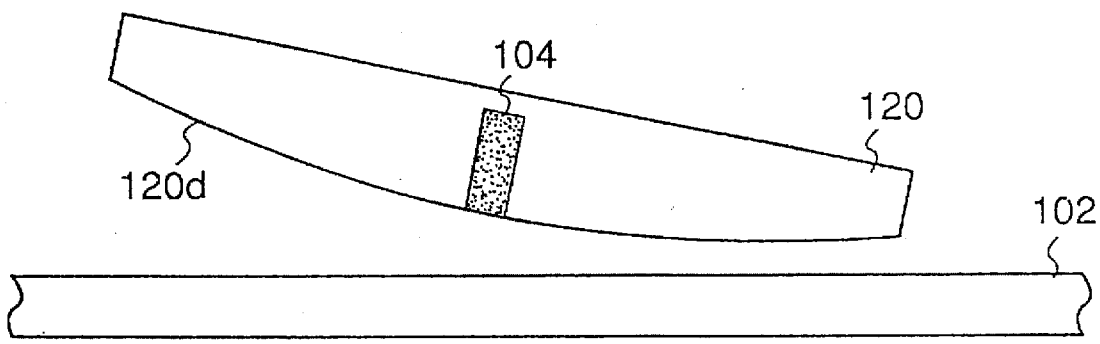
FIG. 40A and FIG. 40B are diagrams showing how the slider of FIG. 39 is made to float during forward and backward scanning.

During recording, the disk 102 is rotated in the forward direction, and the front part (left part as seen in the figure) of the slider 120 is lifted, as shown in FIG. 40A. The magnetic field modulating head 104 is positioned to be close to the disk 102 during recording.

Figure 40B:
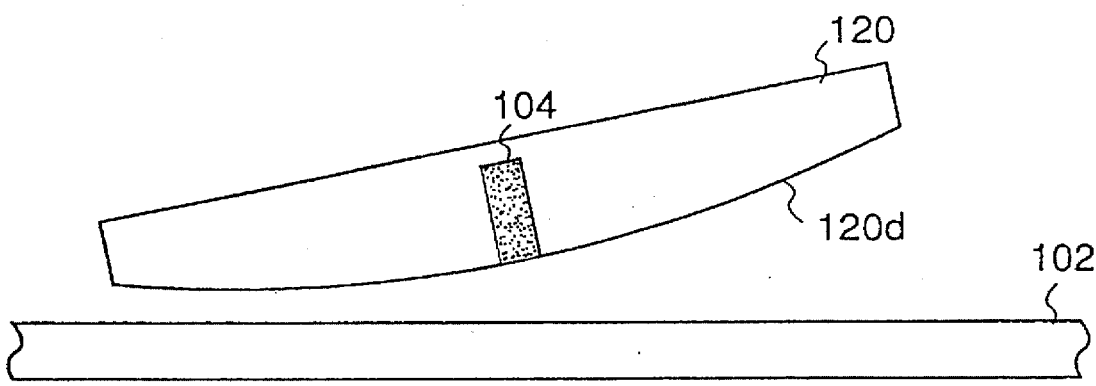

During playback, the disk 102 is rotated in the reverse direction, and the rear part (right part as seen in the figure) of the slider 120 is lifted, as shown in FIG. 40B. The magnetic field modulating head 104 is positioned to be close to the disk 102 during playback as well.

Thus, the slider 120 is prevented from contacting the disk 102 regardless of the direction of the rotation of the disk 102, and the magnetic field modulating head 104 is positioned to be close to the disk 102 regardless of the direction of the rotation of the disk 102.

Figure 41:
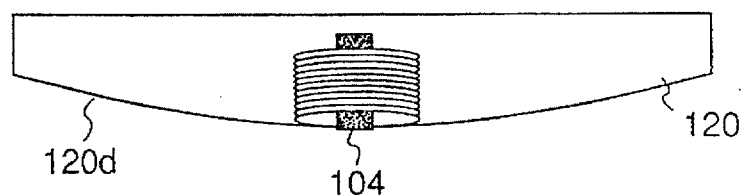
FIG. 41 is a side view showing another example of a slider.

FIG. 41 is a side view showing another example of slider. The illustrated slider 120 is similar to the embodiment of FIG. 39, but is additionally provided with a super-resolution playback external magnetic field generator 108 also positioned at the center of the bottom portion 120d of the slider 120. Specifically, the coil forming the super-resolution playback external magnetic field generator 108 is wound around the magnetic field modulating head 104, so that the super-resolution playback external magnetic field generator 108 creates the magnetic field at the same position as the magnetic field created by the magnetic field modulating head 104.

During recording, the disk 102 is rotated in the forward direction, and the front part (the left side in the figure) is lifted. The center of the bottom 120d is close to the disk 102, and the magnetic field modulating head 104 is therefore close to the disk 102, and hence capable of producing the external magnetic field necessary for the recording.

During playback, the disk is rotated in the reverse direction, and the rear part (the right side in the figure) is lifted. Again, the center of the bottom 120d is close to the disk 102, and the super-resolution playback magnetic field generator 108 is therefore close to the disk 102, and hence provides the external magnetic field necessary for the super-resolution playback.

Figure 42:
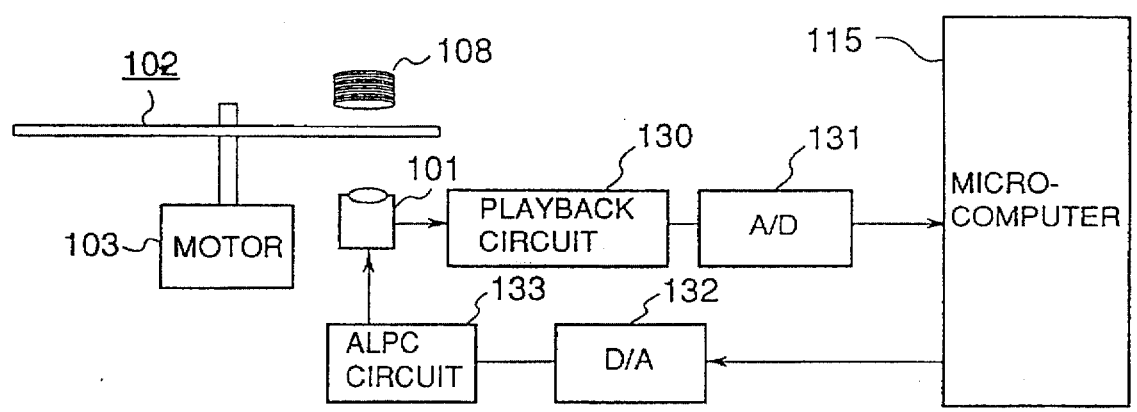
FIG. 42 is a block diagram showing a magneto-optical disk drive device of another embodiment of the invention.

FIG. 42 is a block diagram showing a magneto-optical disk drive device of another embodiment of the invention. The reference numerals identical to those in FIG. 25 to FIG. 33 denote identical or corresponding elements. The playback signal from the optical head 101 is passed through a playback circuit 130 and an A/D converter 131 and read by the microcomputer 115. The playback laser power target value is output from the microcomputer 115, and passed through a D/A converter 132 and an automatic laser power control (ALPC) circuit 133, and transmitted to the optical head 101.

Figure 43:
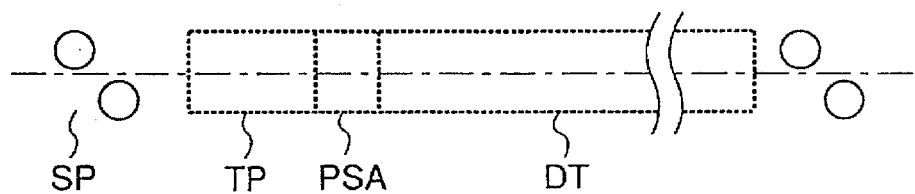
FIG. 43 is a schematic diagram showing a preformatted area according to another embodiment of the invention.

FIG. 43 shows the format of each sector on the disk 102. It includes sample pits SP used for control over the optical head 101, a test playback region TP, a preamble/sync/address region PSA and a data region DT.

The test playback region TP may be formed of a sequence of pits of a minimum size as shown in and described in connection with FIG. 26A.

During playback, the playback signal is passed through the playback circuit 130 and the A/D converter 131, and read by the microcomputer 115 each time the test playback region TP is scanned. The level of the playback signal is thus detected by the microcomputer 115, which issues a command to increase or decrease the level of the laser power responsive to the detected level of the playback signal. This command is passed through the D/A converter 132 and supplied to the ALPC circuit 133. The laser power is accordingly increased or decreased, e.g., by 0.1 mW, under control of the ALPC circuit 33.

Whether the command issued from the microcomputer 115 is one for increase or one for decrease depends on the level of the playback signal just detected as compared with the level of the playback signal from the preceding test playback region TP, and whether the laser power had been increased or decreased after the detection of the preceding test playback region and the detection of the present test playback region. For instance, assume that the level of the playback signal was detected at the time of the detection of the preceding test playback region TP, and the detected playback signal level is stored in the microcomputer 115, and the laser power has been increased by for example 0.1 mW. The level of the playback signal is again detected from the next (present) test playback region and recorded. If the level of the playback signal is found to have been increased, the command issued next from the microcomputer will be to increase the laser power again, by 0.1 mW. If the level of the playback signal is found to have been decreased, the command issued next from the microcomputer will be to decrease the laser power by 0.1 mW. Assume now that the laser power has been decreased by for example 0.1 mW, and if the level of the playback signal is found to have been increased, the command issued next from the microcomputer will be to decrease the laser power again, by 0.1 mW. If the level of the playback signal is found to have been decreased, the command issued next from the microcomputer will be to increase the laser power by 0.1 mW. By repeating such actions, the laser power is optimized.

Figure 44:
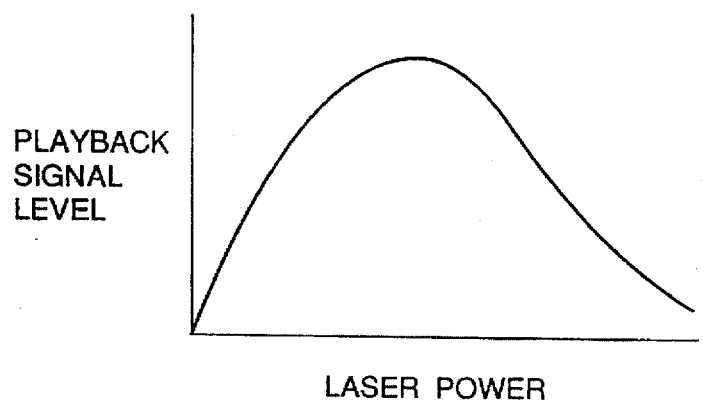
FIG. 44 is a diagram showing the playback signal level with respect to the laser power.

The reason why the above process can bring about the optimization of the laser power is that the playback signal level is related with the laser power as shown in FIG. 44. That is, the playback signal level-to-the laser power characteristic is represented by a curve having a single peak, and monotonously increases on one side of the peak and monotonously decreases on the other side of the peak.

The operation of the microcomputer 115 for the above-described adjustment of the laser power will next be described with reference to FIG. 45.

During playback, the microcomputer 115 initially set a control flag N to "1" (S41). When the test playback region TP is scanned (S42), judgement is made as to whether the control flag N is "1" or "0" (S43). When it is "0", the laser power is decreased by a predetermined amount, e.g., 0.1 mW (S44). When it is "1", the laser power is increased by a predetermined amount, e.g., 0.1 mW (S45). Then, the level of the playback signal is detected (S46), and judgement is made whether the playback signal level has been increased or decreased (S47). If it is found to have been increased, the next step is the step S42. If it is found to have been decreased, the state of the control flag N is reversed (S48). That is, if it has been "1", it is reversed to "0". If it has been "0" it is reversed to "1". The step S48 is followed by the step S42.

If, at the step S42, it is found that the test playback region is not being scanned, then judgment is made whether the playback is over (S49). If the playback is not over, the step S42 follows. If the playback is over, the process is terminated.

Figure 46:
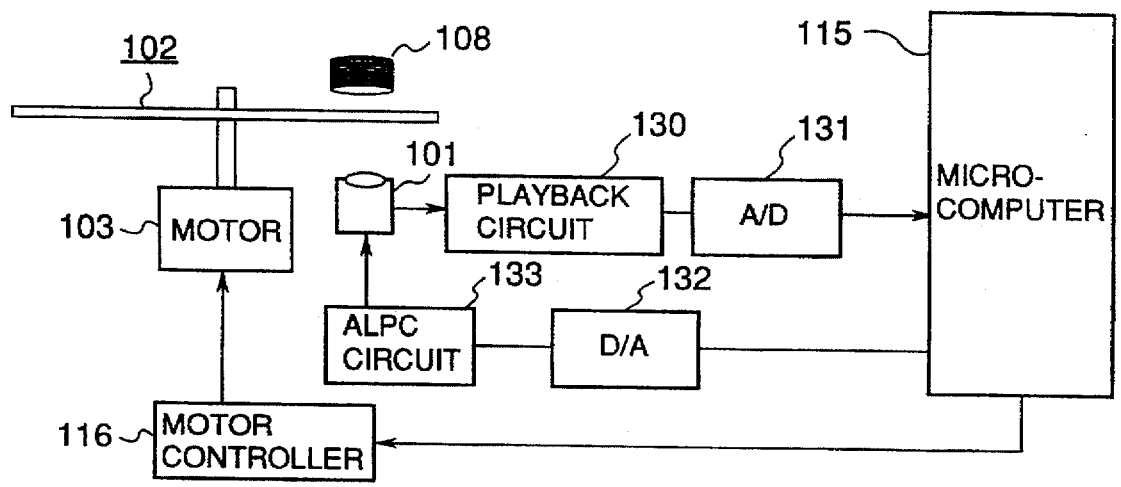
FIG. 46 is a block diagram showing a magneto-optical disk drive device of another embodiment of the invention.

FIG. 46 shows another embodiment of a magneto-optical disk drive device. The reference numerals identical to those in FIG. 42 denote identical or corresponding elements. The microcomputer 115 of this embodiment additionally provides a linear speed command value, and a motor controller 116 is responsive to this command value for controlling the motor 103.

During playback, the playback signal is passed through the playback circuit 130 and the A/D converter 131, and read by the microcomputer 115 each time the test playback region TP is scanned. The level of the playback signal is thus detected by the microcomputer 115, which issues a command to increase or decrease the linear speed. This command is supplied to the motor controller 116. The motor speed, and hence the linear speed, are accordingly increased or decreased, e.g., by 0.1%, under control of the motor controller 116.

Whether the command issued from the microcomputer 115 is one for increase or one for decrease depends on the level of the playback signal just detected as compared with the level of the playback signal from the preceding test playback region TP, and whether the linear speed had been increased or decreased after the detection of the preceding test playback region and the detection of the present test playback region. For instance, assume that the level of the playback signal was detected at the time of the detection of the preceding test playback region TP, and the detected playback signal level is stored in the microcomputer 115, and the linear speed has been increased by for example 0.1%.

The level of the playback signal is again detected from the next (present) test playback region and recorded. If the level of the playback signal is found to have been increased, the command issued next from the microcomputer will be to increase the linear speed again, by 0.1%. If the level of the playback signal is found to have been decreased, the command issued next from the microcomputer will be to decrease the linear speed by 0.1%. Assume now that the linear speed has been decreased by for example 0.1%, and if the level of the playback signal is found to have been increased, the command issued next from the microcomputer will be to decrease the linear speed again, by 0.1%. If the level of the playback signal is found to have been decreased, the command issued next from the microcomputer will be to increase the linear speed by 0.1%. By repeating such actions, the linear speed is optimized.

Figure 47:
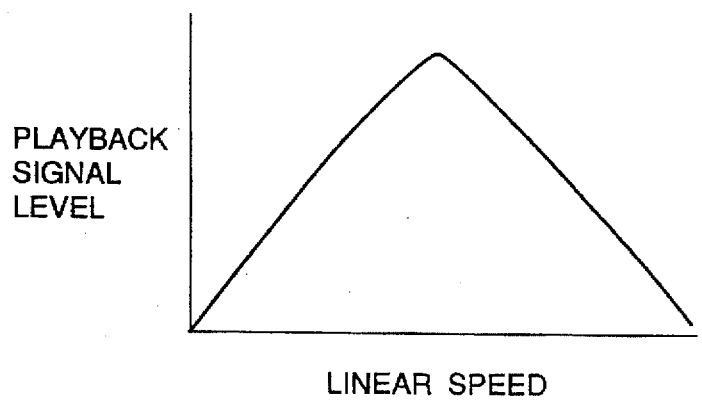
FIG. 47 is a diagram showing the playback signal level with respect to the linear scanning speed.

The reason why the above process can bring about the optimization of the linear speed is that the playback signal level is related with linear speed power as shown in FIG. 47. That is, the playback signal level-to-the linear speed characteristic is represented by a curve having a single peak, and monotonously increases on one side of the peak and monotonously decreases on the other side of the peak.

Figure 45:
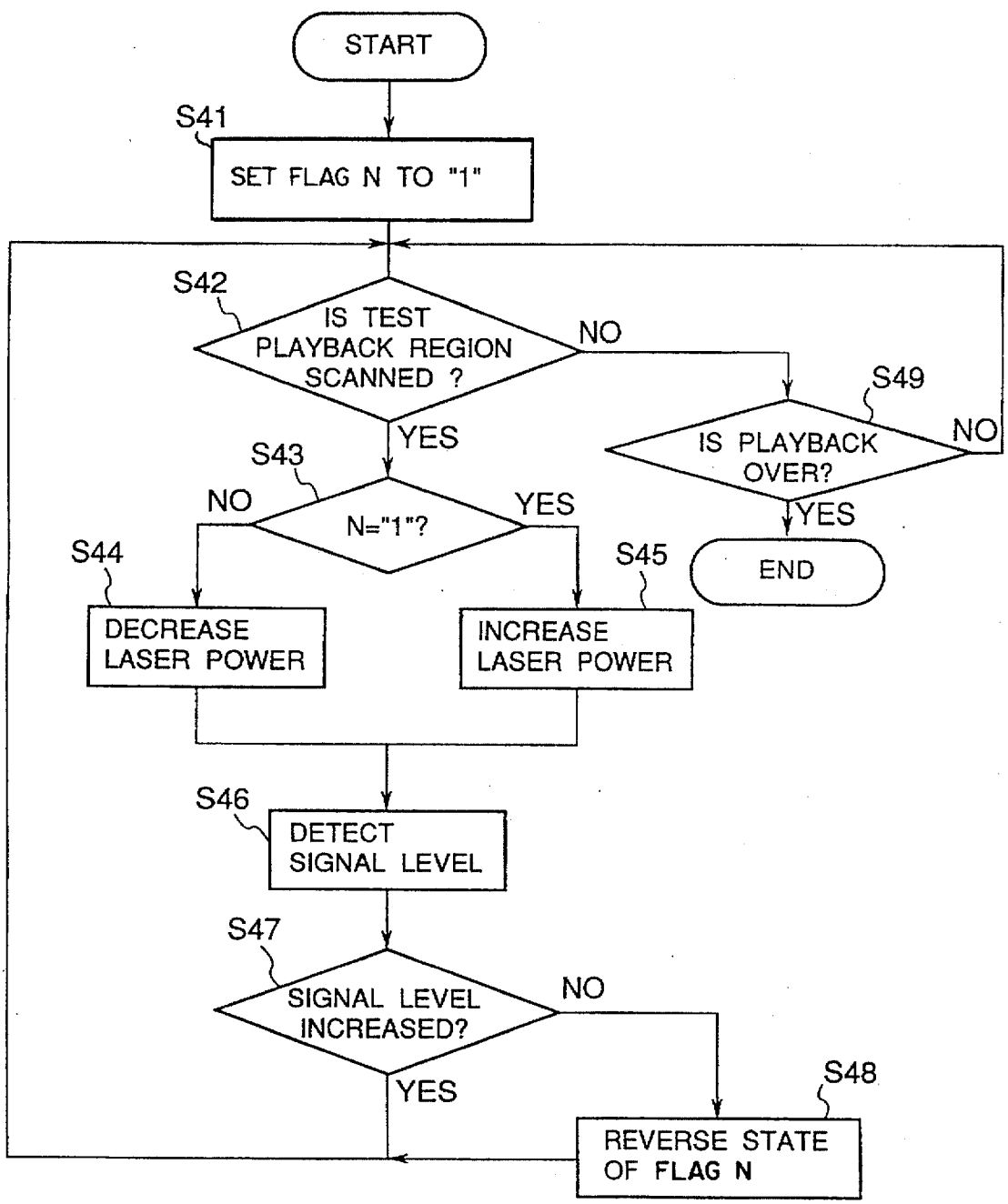
FIG. 45 is flowchart showing the operation of the device of FIG. 42.

The operation of the microcomputer 115 for the above-described adjustment of the linear speed is similar to that shown in FIG. 45. The difference is that instead of decreasing the laser power by 0.1 mW at the step S44, the motor speed and hence the linear speed are decreased by 0.1%, and instead of increasing the laser power by 0.1 mW at the step S45, the motor speed and hence the linear speed is increased by 0.1%.

Figure 48:
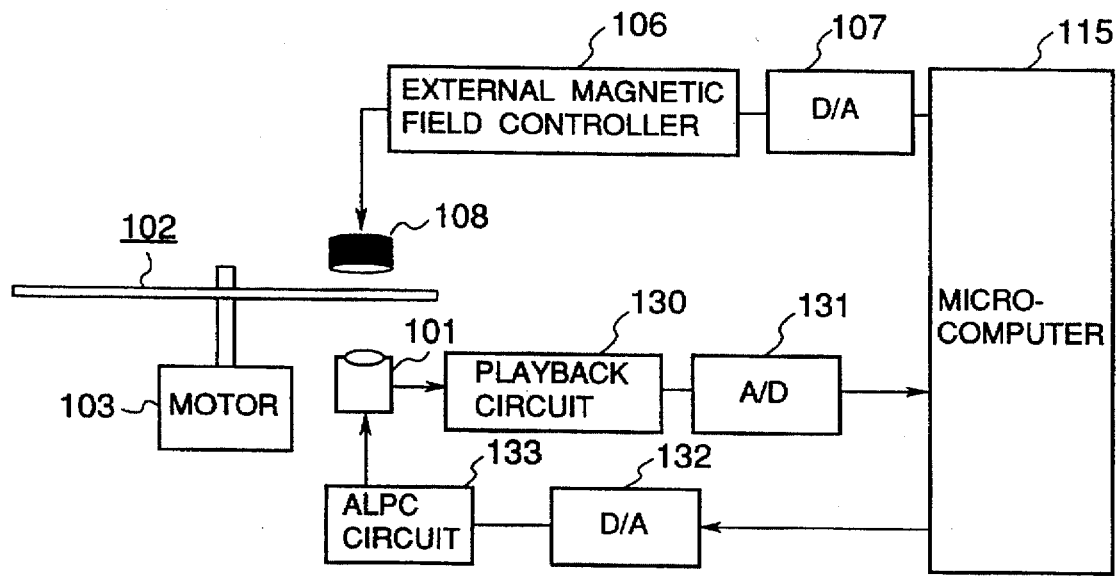
FIG. 48 is a block diagram showing a magneto-optical disk drive device of another embodiment of the invention.

FIG. 48 shows a magneto-optical disk drive device of another embodiment. The reference numerals identical to those in FIG. 42 denote identical or corresponding elements. The microcomputer 115 of this embodiment additionally provides a current command value, which is supplied through an additional D/A converter 135 to an external magnetic field controller 136. The external magnetic field controller 136 is responsive to the current command value for controlling the exciting current fed to the super-resolution playback external magnetic field generator 108.

During playback, the playback signal is passed through the playback circuit 130 and the A/D converter 131, and read by the microcomputer 115 each time the test playback region TP is scanned. The level of the playback signal is thus detected by the microcomputer 115, which issues a command to increase or decrease the exciting current. This command is supplied to the external magnetic field controller 136. The exciting is accordingly increased or decreased, e.g., by 0.1 A, under control of the external magnetic field controller 136.

Whether the command issued from the microcomputer 115 is one for increase or one for decrease depends on the level of the playback signal just detected as compared with the level of the playback signal from the preceding test playback region TP, and whether the exciting current had been increased or decreased after the detection of the preceding test playback region and the detection of the present test playback region. For instance, assume that the level of the playback signal was detected at the time of the detection of the preceding test playback region TP, and the detected playback signal level is stored in the microcomputer 115, and the exciting current has been increased by for example 0.1 A. The level of the playback signal is again detected from the next (present) test playback region and recorded. If the level of the playback signal is found to have been increased, the command issued next from the microcomputer will be to increase the exciting current again, by 0.1 A. If the level of the playback signal is found to have been decreased, the command issued next from the microcomputer will be to decrease the exciting current by 0.1 A. Assume now that the exciting current has been decreased by for example 0.1 A, and if the level of the playback signal is found to have been increased, the command issued next from the microcomputer will be to decrease the exciting current again, by 0.1 A. If the level of the playback signal is found to have been decreased, the command issued next from the microcomputer will be to increase the exciting current by 0.1 A. By repeating such actions, the exciting current is optimized.

Figure 49:
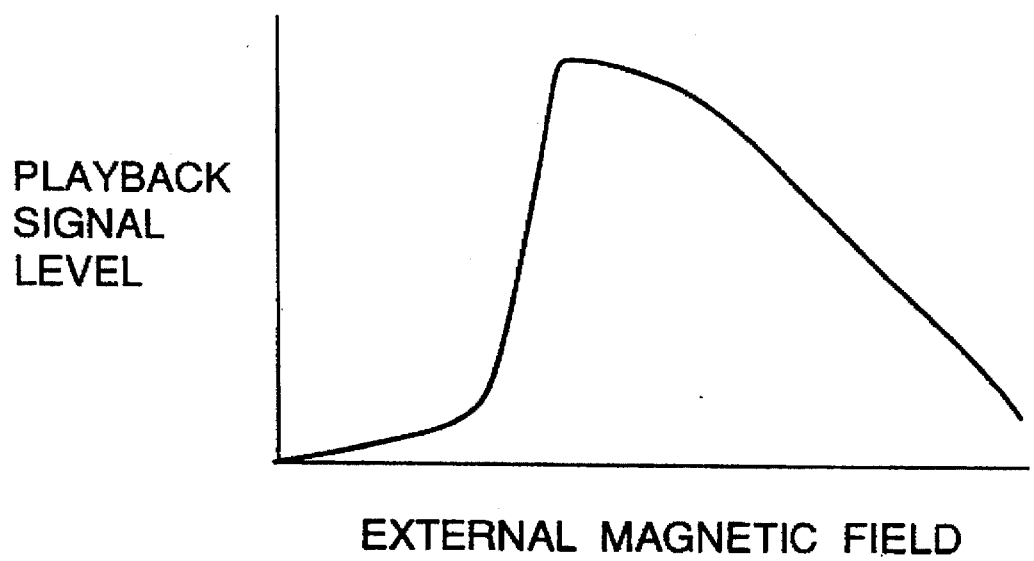
FIG. 49 is a diagram showing the playback signal level with respect to the super-resolution external magnetic field.

The reason why the above process can bring about the optimization of the exciting current is that the playback signal level is related with the exciting current as shown in FIG. 49. That is, the playback signal level-to-the exciting current characteristic is represented by a curve having a single peak, and monotonously increases on one side of the peak and monotonously decreases on the other side of the peak.

The operation of the microcomputer 115 for the above-described adjustment of the exciting current is similar to that shown in FIG. 45. The difference is that instead of decreasing the laser power by 0.1 mW at the step S44, the exciting current is decreased by 0.1 A, and instead of increasing the laser power by 0.1 mW at the step S45, the exciting current is increased by 0.1 A.

An optical disk drive device may be configured to conduct two or more of the adjustment of the laser power, the adjustment of the linear speed and the adjustment of the super-resolution external magnetic field. In such a case, the adjustments are conducted one after another. For instance, where adjustments of the three variables are all conducted, the adjustment of the linear speed and then the adjustment of the super-resolution external magnetic field according to the detected playback signal may be conducted in turn when the playback of data from a disk is commenced, while the adjustment of the laser power according to the detected playback signal can be conducted as long as the playback is continued.

The pits formed in the test playback region TP may be embossed pits. They may alternatively be written by the magneto-optical recording, phase-change, or the 11ke. In such a case, the test playback region may be used also for test writing.

Figure 50:
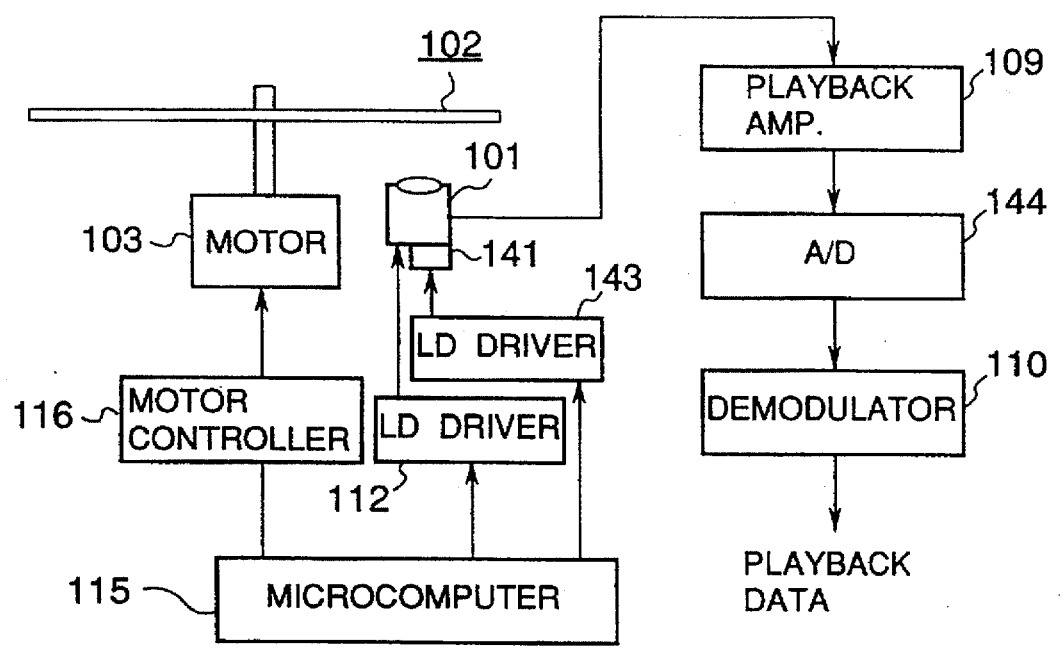
FIG. 50 is a block diagram showing an optical disk drive device of another embodiment.

FIG. 50 shows an optical disk drive device of another embodiment. Reference numerals identical to those shown in FIG. FIG. 25 to FIG. 33 denote identical or corresponding elements. Additionally provided or illustrated are a preheating head 141 for forming a beam spot on the optical disk 102 adjacent to the beam spot formed by the optical head 1, an LD driver 112 for driving the optical head 101, and another LD driver 143 for driving the preheating head 141. The disk 102 is of the front aperture detection type.

Figure 51:
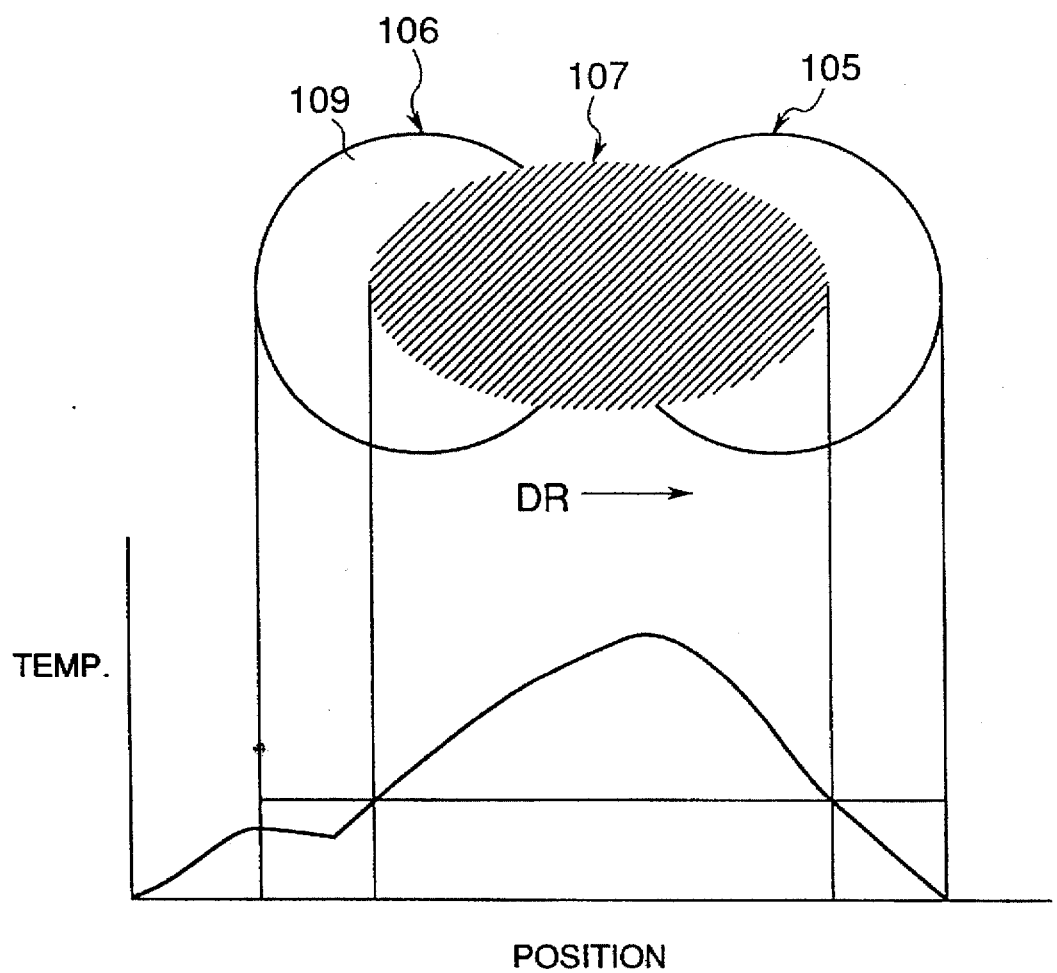
FIG. 51 is a schematic diagram showing a manner of modifying the effective detection area using a preheating light spot.

FIG. 51 shows the playback beam spot 106, the preheating beam spot 105, the masking area 107, and the resultant effective detection area 109. The configuration illustrated in FIG. 51 is formed by having a preheating beam powerful enough to form the masking area 107, a little shifted backward from the preheating beam spot 105, while the power of the playback laser beam insufficient to form a mask area.

The operation of this embodiment will next be described with reference to the drawings.

It is assumed that recording pits formed on the magneto-optical disk 102 are crescent-shaped as shown in FIG. 27A. Information recorded on the magneto-optical disk 102 is played back by a device having a preheating head 141.

During playback, the preheating head 141 preheats the disk 102 in advance of the optical head 101. That is, preheated light spot is formed in front of or upstream of the playback light spot. As shown in FIG. 51, the disk 102 is preheated by the preheating head 141, and part of the super-resolution layer 138 (FIG. 26B) where the temperature exceeds a certain threshold serves as a mask, and information cannot detected from part of the recorded layer 139 covered by that part of the super-resolution layer 138 whose temperature is above the threshold.

As the disk 102 rotates, the part of the super-resolution layer 138 whose temperature has been heated above the threshold is cooled by heat dissipation or the like, and resumes a state in which information can be detected from the corresponding part of the recording layer 139. The playback beam spot behind the preheating light spot is formed in such an area where the super-resolution layer 138 resumes its transparency. The shape of the area which is covered by the playback light spot and the area where the super-resolution layer 138 resumes its transparency is crescent-shaped and convex forward (as is better shown in FIG. 27A and FIG. 27B). This substantially coincides with the shape of the recording pits. It will be seen that the direction toward which the crescent-shaped area where the playback signal is detected is opposite to the direction toward which the crescent-shaped area is convex if the preheating were not made, as is better shown in FIG. 12A and FIG. 12B.

Since the shape of the area where playback signal is detected substantially coincides with the shape of the recording pits, it is possible to obtain signals which is detected solely from each recording pit, and which is free from noises from adjacent recording pits.

Figure 28:
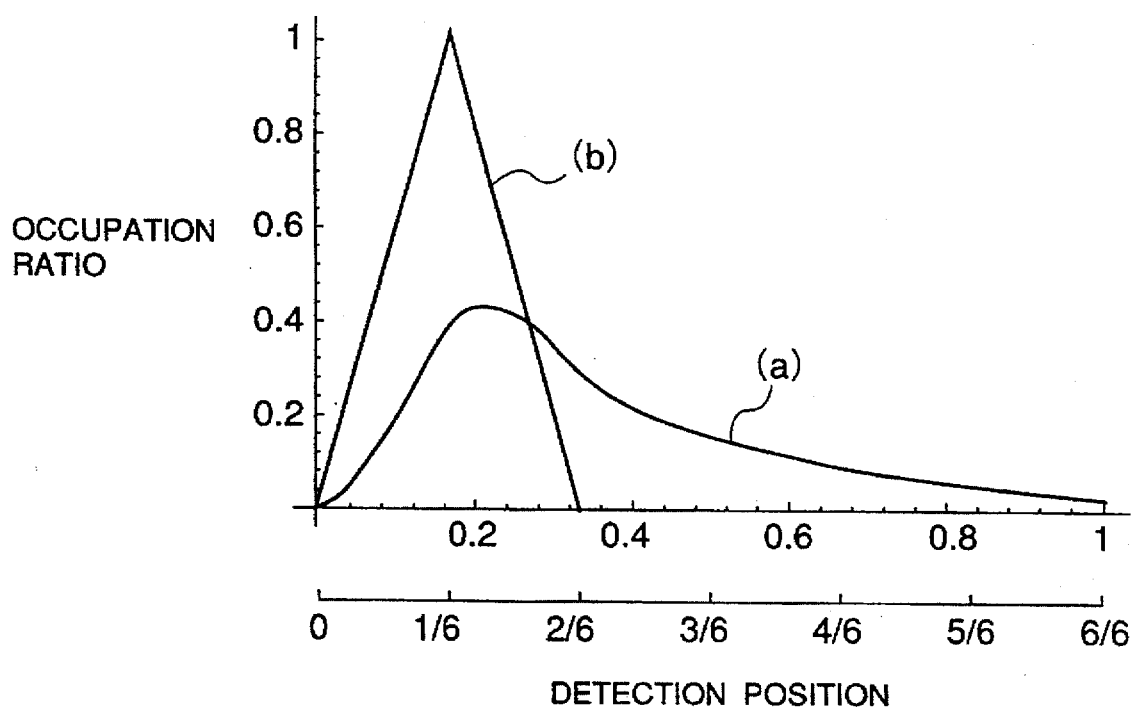
FIG. 28 is a diagram showing the occupation ratio that is obtained if the direction toward which the crescent-shaped recording pits are convex and the directions toward which the effective detection area are convex are identical with each other.

It is conjectured that the result of calculation of the aperture occupation ratio for the case where the preheating is effected will be similar to that for the case where the magneto-optical disk is rotated in the reverse direction according to the embodiment of FIG. 25 to FIG. 33, that is, as shown in FIG. 28 by curve (b). It is again assumed that the recording is so conducted that the pit length is ⅙ the laser beam diameter, and the shape of the effective detection area is made to coincide the shape of the recording pits. It will be seen that in the case of the prior art (curve (a)), the aperture occupation ratio is 50% at most, while in the case of the present embodiment (curve (b)), the maximum aperture occupation ratio is 100%, and information from adjacent pits can be minimized.

It is also conjectured that the playback signal obtained by the method of this embodiment will be similar to that of the embodiment of FIG. 25 to FIG. 33.

Another embodiment will next be described with reference to FIG. 52A, which shows the playback light spot 106, the preheating light spot 105, the mask areas 107 and 108, and the resultant effective detection area 109. The illustrated mask area 108 effective detection area 109 is formed by having the playback laser beam so powerful as to form the masking area 108, a little shifted backward from the playback light spot 106. The resultant effective detection area 109 is dumbbell-shaped.

Figure 52A:
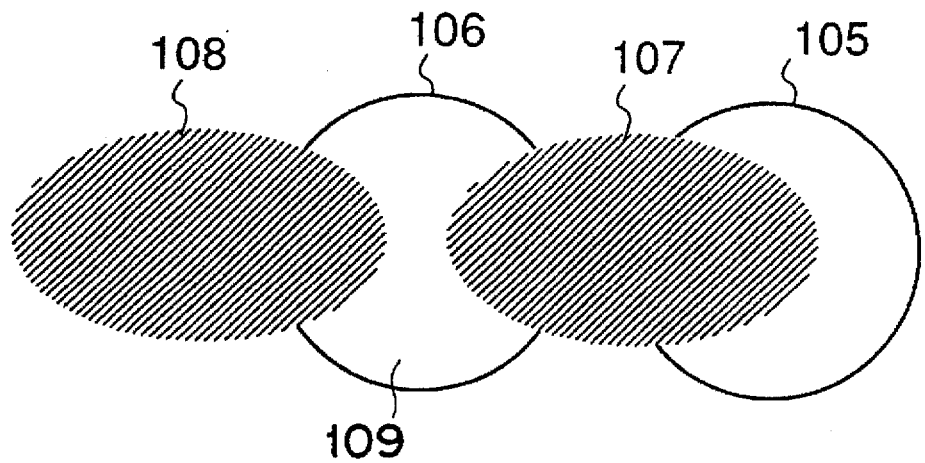
FIG. 52A, FIG. 52B, FIG. 53A to FIG. 53C are schematic diagrams showing manners of modifying the effective detection area using one or two preheating light spots.
Figure 52B:
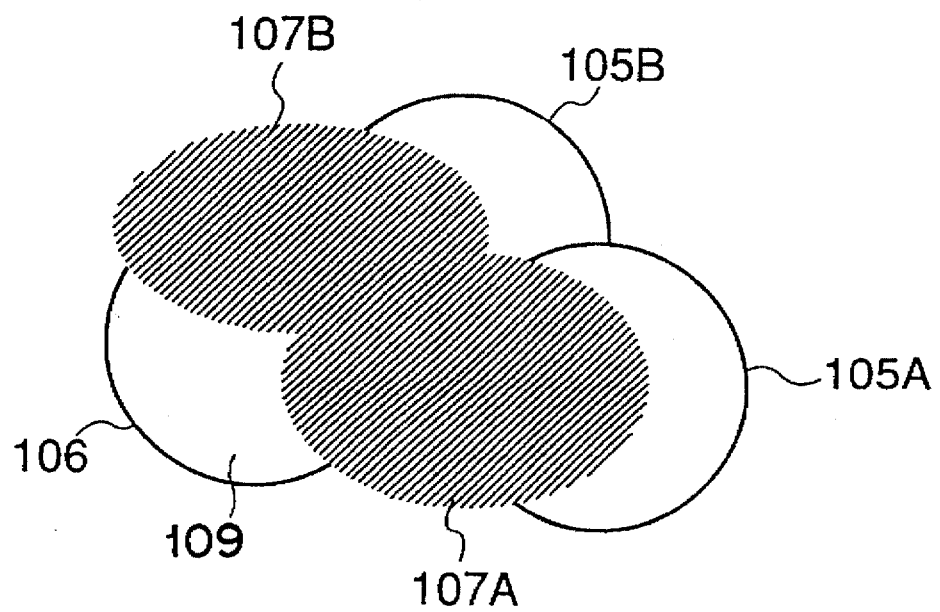

In another embodiment shown in FIG. 52B, the power of the playback beam forming the light spot 106 is insufficient to form a mask area, while two preheating light spots 105A and 105B are formed, which are powerful enough to form attendant mask areas 107A and 107B. The two preheating light spots are shifted in the lateral direction of the track, and also shifted in the longitudinal direction of the track. As a result, the dimension of the effective detection area 109 in the lateral direction of the track is also shortened. This may be desirable where the interval of the tracks is shortened to increase the recording density of the disk.

In place of the front aperture detection type super-resolution layer, rear aperture detection super-resolution layer may be used. In such a case, the configuration of the playback light spot, the preheating light spot, the high-temperature area or areas, and the resultant effective detection area or areas will be as shown in FIG. 53A to FIG. 53C.

Figure 53A:
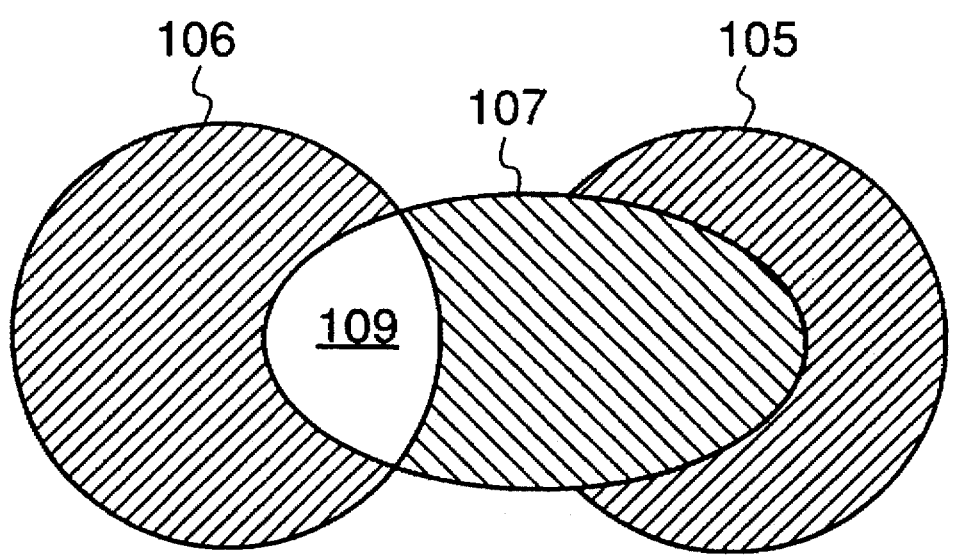

In the example illustrated in FIG. 53A, the effective detection area 109 is formed only at a part which is within the area 106 heated above a certain threshold temperature, by virtue of the preheating light spot 105, and also within the playback light spot 106. The effective detection area is spool-shaped, as illustrated in FIG. 53A.

Figure 53B:
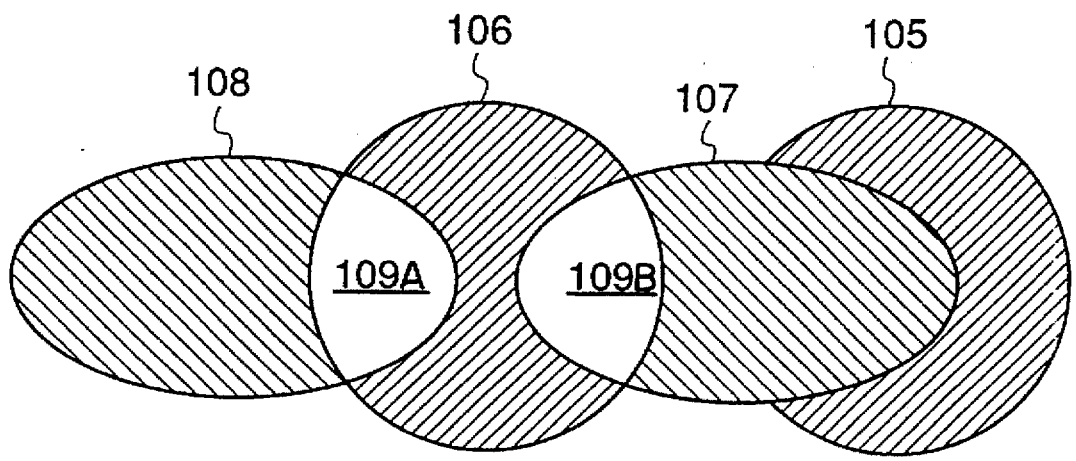

In the example of FIG. 53B, the playback laser beam is also powerful to form a transparent area 108, being shifted backward relative to the playback light spot 106, and yet partially overlapping with the playback light spot 106. As a result, two spool-shaped effect and detection areas 109A and 109B are formed. That is, the effective detection areas are formed not only at a part which is within the area 106 heated above a certain threshold temperature, by virtue of the preheating light spot 105, and also within the playback light spot 106. and also at a part which is within the area 108 heated above a certain threshold temperature by virtue of the playback light beam 106 and also within the playback light spot 106.

Figure 53C:
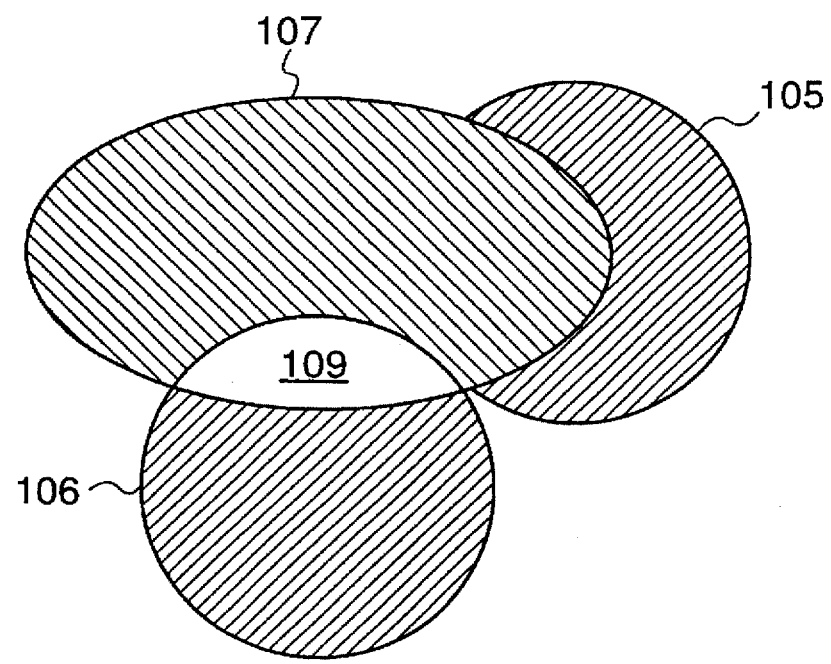

In the example shown in FIG. 53C, the preheating light spot 105 is shifted laterally of the track, from the playback light spot 106, and also shifted from the playback light spot 106 also in the longitudinal direction of the track. As a result, the effective detection area 109 is formed at a lateral end (an extremity in the lateral direction of the track) of the playback light spot 106, and is spool-shaped, extending in the longitudinal direction of the track.

As has been exemplified, the shape of the effective detection area can be controlled by changing the number and shape of the preheating light spots, and the power of the preheating laser beam, and the power of the playback laser beam.

Figure 54:
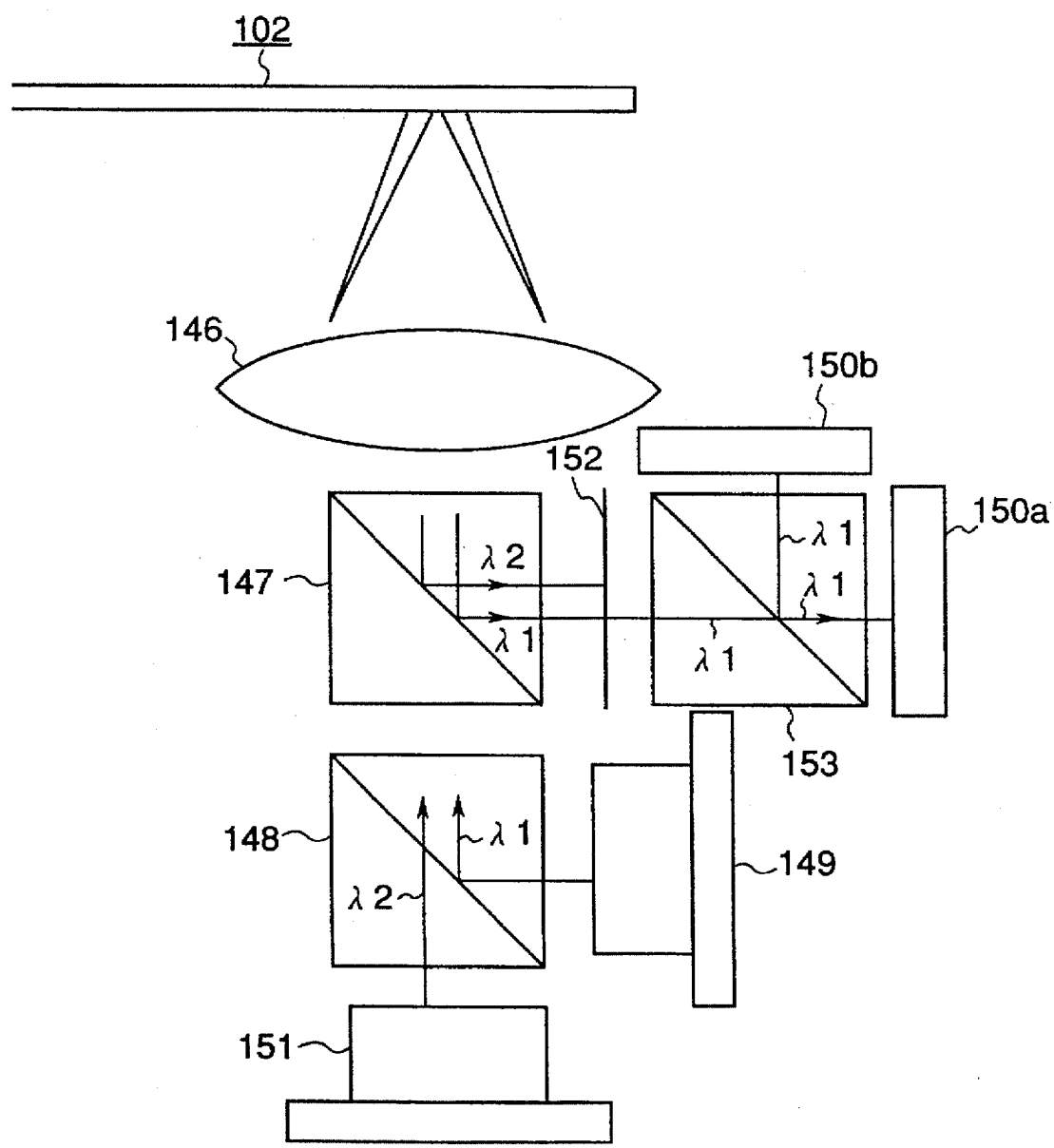
FIG. 54 is a schematic diagram showing an example of configuration for producing a playback light spot and a preheating light spot.

FIG. 54 shows a specific example of configuration for producing the playback light spot 106 and the preheating light spot 105 shown in FIG. 51, FIG. 52A and FIG. 52B, and FIG. 53A to FIG. 53C, and detecting the reflected light from the respective light spots. As illustrated, it comprises an objective lens 146, a polarizer 147, a dichroic mirror 148, a laser diode 149, photo-detectors 150a and 150b, a preheating laser diode 151, a wavelength filter 152 and another polarizer 153.

The laser diode 149 and the preheating laser diode 151 emit light of different wavelengths. In the example, the wavelength $\lambda 1$ of the light emitted from the laser diode 149 is shorter than the wavelength $\lambda 2$ of the light emitted from the preheating laser diode 151. The light beam of the wavelength $\lambda 1$ emitted from the laser diode 146 is reflected at the dichroic mirror 148, and the light beam of the wavelength $\lambda 2$ emitted from the preheating laser diode 151 is transmitted through the dichroic mirror 148, so that they are synthesized (wavelength-multiplexed) in such a manner that their optical axes substantially coincide with each other but are shifted a little from each other. The synthesized light beams are passed through the polarizer 147, and converged by the objective lens 146 onto the recording surface of the disk 102. The playback light spot formed from the laser beam of the wavelength $\lambda 1$ and the preheating light spot formed from the laser beam of the wavelength $\lambda 2$ are shifted a little in the longitudinal direction of the track, with the latter being in advance of the former. Accordingly, the mask region or a transparent region formed by the preheating light spot modifies the effective detection area.

If the super-resolution layer is of the front aperture detection type, the effective detection region will be as illustrated in FIG. 51 or FIG. 52A.

If the super-resolution layer is of the rear aperture detection type, the effective detection area will be as illustrated in FIG. 53A or FIG. 53B.

The light components of the wavelengths $\lambda 1$ and $\lambda 2$ reflected from the disk are both passed through the objective lens 146, and are then partially reflected at the polarizer 148. The light component of the wavelengths $\lambda 2$ is however blocked by the wavelength filter 152, while the light component of the wavelengths $\lambda 1$ is passed through the wavelength filter 152, and then split by the polarizer 153 into two beams, which are respectively directed to and received by photo-detectors 150a and 150b. The light component of the wavelength λ1 and having a first polarization direction is passed through the polarizer 153 and falls on the photo-detector 150a, while the light component of the wavelength λ1 and having a second polarization direction orthogonal to the first polarization direction is reflected by the polarizer 153 and falls on the photo-detector 150b. The light components received by the respective photo-detectors 150a and 150b are converted into electrical signals, and used for producing playback signals, in a well known manner. By using two laser beams of different wavelengths for the playback and for the preheating, the reflected playback light beam only can be extracted, being separated from the reflected preheating light beam.

Figure 55:
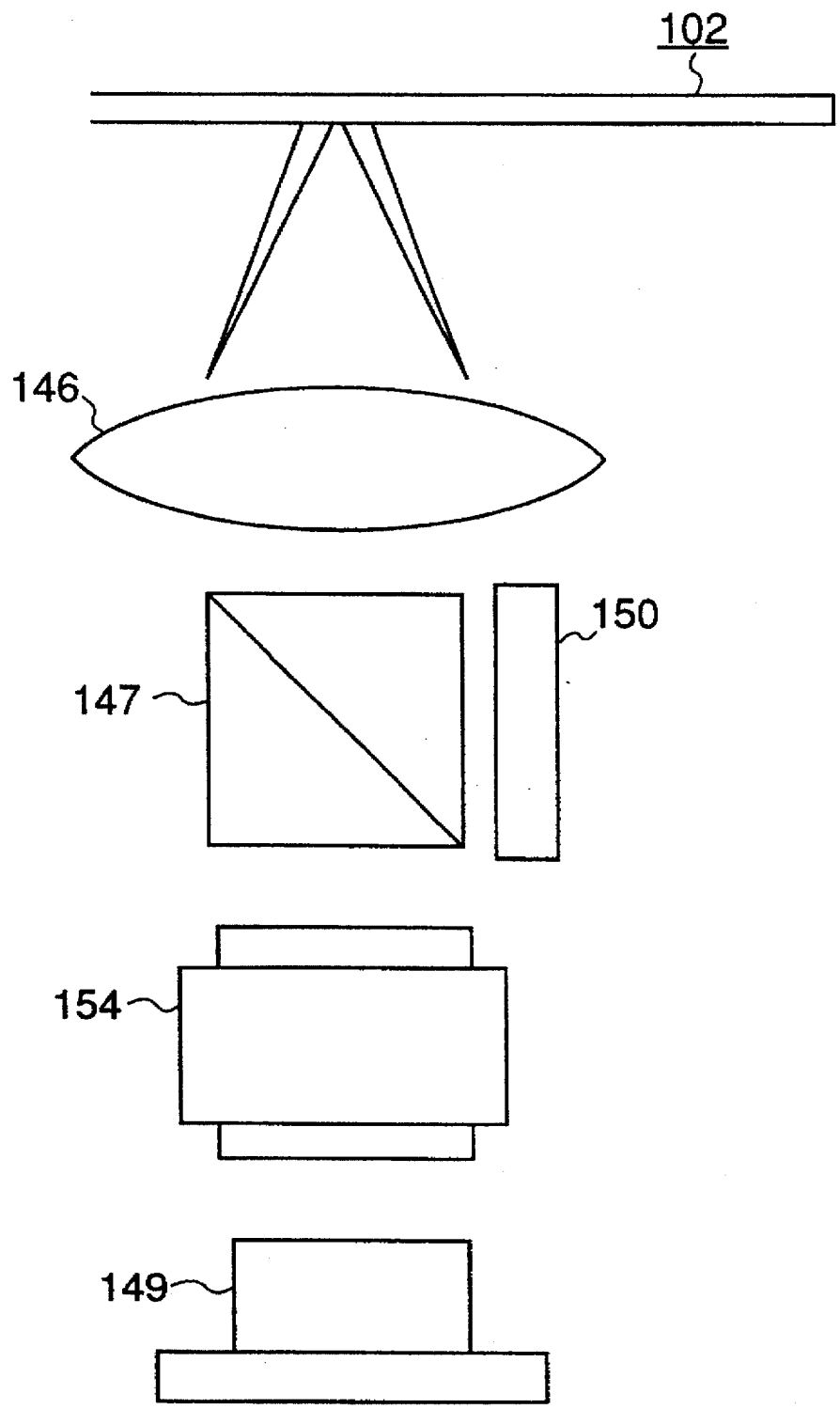
FIG. 55 is a schematic diagram showing another example of configuration for producing two light spots.

FIG. 55 shows another example of configuration for producing two light spots. Reference numerals identical to those in FIG. 54 denote identical or corresponding elements. An element not shown in FIG. 54, but shown in FIG. 55 is an electro-optical (EO) element 154. Also, in place of the two photo-detectors 150a and 150b, a single photo-detector 150 is provided.

Figure 56:
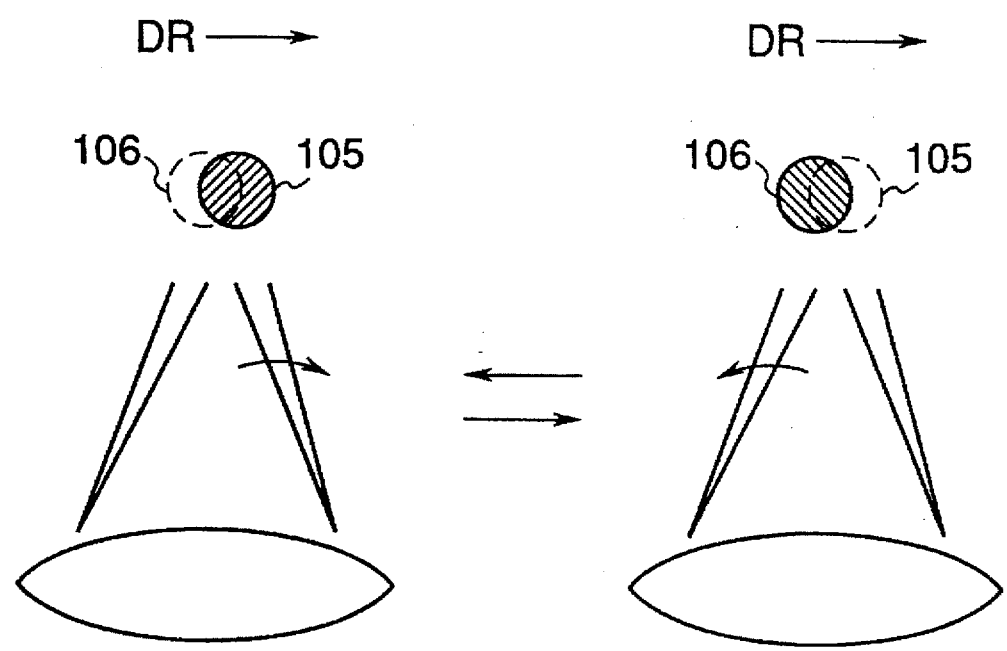
FIG. 56 is a schematic diagram showing the swing of the laser beam.

The light beam emitted from the laser diode 149 is passed through the EO element 154 and the polarizer 147, and converged by the objective lens 146 onto the recording surface of the disk 102. The EO element 154 deflects the light beam according to the voltage applied to it, and the direction of the deflection can be reversed if the voltage applied to it is made negative. When the voltage is intermittently applied to the EO element 154, the position where the light beam is focused on the disk 102 is made to swing, as shown in FIG. 56. That is, two light spots, which can be used for the playback light spot and the preheating light spot can be formed. Since the disk 102 is kept rotated it is necessary to superimpose a voltage component to the on-off voltage applied to swing between the playback light spot position and the preheating light spot position.

Figure 57:
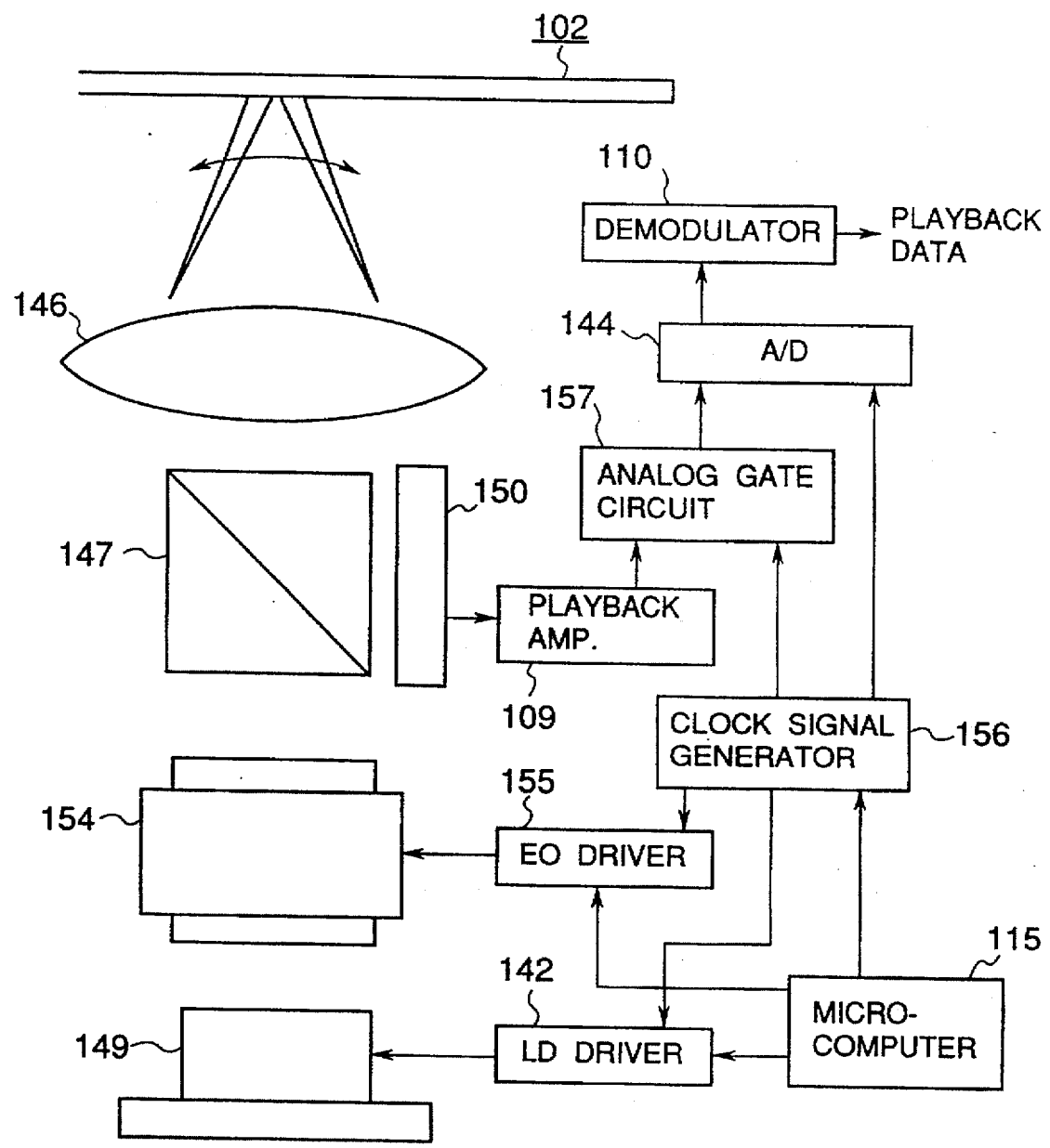
FIG. 57 is a schematic diagram showing another example of configuration for producing two light spots, and processing the reflected light from the two light spots.

FIG. 57 shows how the signals obtained using the arrangement of FIG. 55 and FIG. 56 can be processed. Reference numerals identical to those in FIG. 55 and other drawings previously referred to denote identical or corresponding elements. Additionally provided or illustrated are an EO driver 155, a clock signal generator 156, and an analog gate circuit 157.

Figure 58:
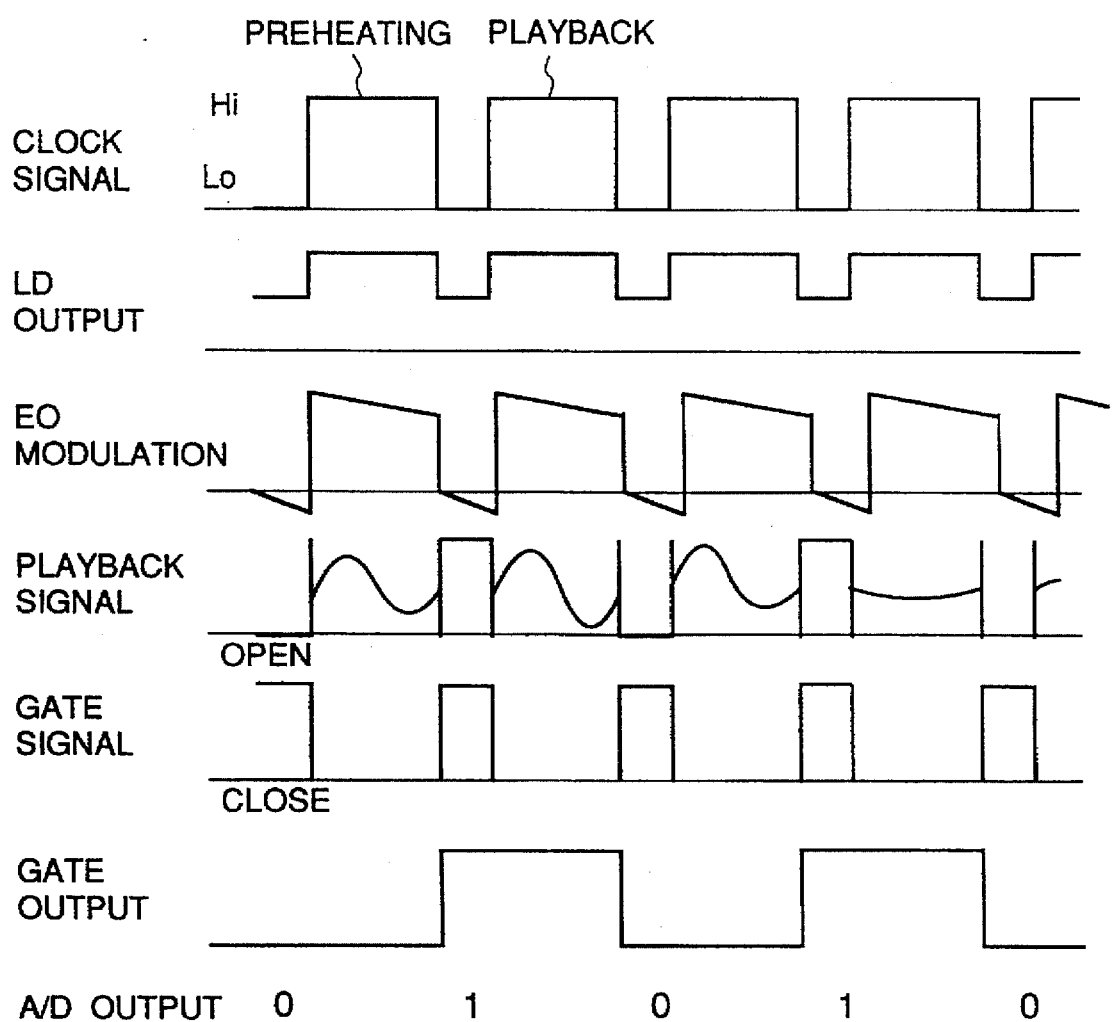
FIG. 58 is a time chart showing the operation of removing the playback signal due to reflection from the preheating light spot, to extract the playback signal due to reflection from the playback light spot.

The playback signal obtained from the photo-detector 50 of FIG. 58 may contain information from adjacent pits during preheating (when the light beam is swung to the position of the preheating light spot). The analog gate circuit 157 is provided to remove the signals during preheating, and to extract the playback signal only during the periods when the light beam is at the position playback light spot.

The operation of the EO element 154 to swing the beam and the analog gate circuit 157 to remove the unwanted signals from adjacent pits is further described with reference to FIG. 58. First, under the control of the microcomputer 115, the clock signal generator 156 generates a clock signal, which is high during preheating intervals and low during playback intervals. The clock signal is applied the LD driver 142, the EO driver 155 and the analog gate circuit 157. Responsive to the clock signal, the EO driver 155 produces a voltage to be applied to the EO element 154, which is a sum of the on-off component to swing the beam between the playback light spot position and the preheating light spot position, and the voltage component to shift the beam to follow the rotation of the disk. The latter voltage component may be continuously decreasing at a constant rate.

During the preheating intervals when the clock signal is high, and responsive to the clock signal being high, the LD driver 142 sets the output of the laser diode 149 to be the higher level suitable for the preheating, and the EO driver 155 applies a sum of the high-voltage component to swing the beam to the preheating light spot position, and the continuously decreasing voltage component to follow the rotation of the disk, and the sum is applied to the EO element 154. The analog gate circuit 157 blocks passage of the incoming signal. Thus, the preheating is effected, but the signals due to reflection from the preheating light spots are removed. The preheating light spot is formed at a position in advance of the playback light spot.

During the playback intervals when the clock signal is low, and responsive to the clock signal being low, the LD driver 142 sets the output of the laser diode 149 to be the lower level suitable for the playback, and the EO driver 155 applies a sum of the low-voltage component to swing the beam to the playback light spot position, and the continuously decreasing voltage component to follow the rotation of the disk, and the sum is applied to the EO element 154. The analog gate circuit 157 permits passage of the incoming signal. The playback signals from the playback light spots are therefore extracted.

In this way, by extracting the playback signals only when the clock signal is Low (the gate signal is High), the playback signals from the playback light spots, free from the signals from the preheating light spots, are obtained.

The invention being thus described, it will be obvious that the same may be varied in many ways. Such variations are not to be regraded as a departure from the spirit and scope of the invention, and all such modifications as would be obvious to one skilled in the art are intended to be included within the scope of the following claims.

What is claimed is:

1. A method of reproducing information from an optical disk, in which information is recorded in the form of recording pits along a track on the disk, comprising the steps of:

scanning the disk with a laser beam forming a light spot on the disk, at least some of the recording pits being smaller in size than said light spot, the laser beam heating the disk so that an effective detection area is formed at only part of the light spot;

providing along said track, a test playback region including a sequence of pits of minimum size for controlling the power of the laser beam;

producing playback signals in accordance with a reflected light from said test playback region; and controlling a power of the laser beam so as to maximize a level of the playback signals produced from the reflected light from the sequence of pits of minimum size in said test playback region.

2. The method according to claim 1, wherein said disk has a first medium layer in which information is recorded, and a second medium layer which is formed on the first medium layer and whose transmittance changes depending on its temperature; and a part of said second medium layer heated by said laser beam has a substantially different transmittance from the rest of the second medium layer, said heated part being formed partially within said light spot, so that said effected detection area is a substantially transparent part of said second medium layer formed either within said heated part or outside of said heated part, and said laser beam is incident through said substantially transparent part of said second medium layer on said first medium layer.

3. The method according to claim 1, wherein said test playback region is formed for each sector, and said step of controlling the power of said laser beam comprises:

finding an optimum value of a power of the laser beam which maximizes the level of the playback signals produced in accordance with the reflected light beam from said test playback region; and maintaining the power of said laser beam at said optimum value while scanning said each sector of the disk.

4. The method according to claim 1, wherein
said disk is of a magneto-optical disk;
said recording pits are crescent-shaped;
the direction of the rotation during the playback is opposite to direction of rotation during recording.

5. The method according to claim 1, said controlling a power of the laser beam step including the substeps of:
setting the power of the laser beam to an initial laser power value,
producing a playback signal in accordance with the reflected light from said test playback region,
storing the playback signal produced in said producing step,
increasing the power of the laser beam by a predetermined amount,
repeating said producing step, said storing step and said increasing step until the laser beam no longer produces a playback signal from said test playback region, and
selecting the power of the laser beam from said setting step or said increasing step which produced the maximum corresponding playback signal stored in said storing step.

6. The method according to claim 1, said controlling a power of the laser beam step including the substeps of:
setting the power of the laser beam to an initial laser power value;
scanning said test playback region with the laser beam;
setting a flag to a first value;
increasing the power of the laser beam by a predetermined amount if the flag is set to the first value;
decreasing the power of the laser beam by the predetermined amount if the flag is set to a second value;
producing a playback signal in accordance with the reflected light from said test playback region;
setting the flag to the first value if a magnitude of the playback signal has increased with respect to a previous iteration;
setting the flag to the second value if the magnitude of the playback signal has decreased with respect to the previous iteration; and
recursively performing said increasing step, said decreasing step, said producing step and said setting steps while scanning said test playback region with the laser beam.

7. A method of playing back information from a magneto-optical disk, in which information is recorded in the form of substantially crescent-shaped recording pits along a track on the disk, comprising the steps of:
scanning the disk with a laser beam forming a light spot on the disk, at least some of the substantially crescent-shaped recording pits being smaller in size than said light spot, the laser beam heating the disk so that a substantially crescent-shaped effective detection area is formed at only part of the light spot;
providing along said track, a test playback region including a sequence of pits of minimum size for controlling the power of the laser beam;

producing playback signals in accordance with a reflected light from the disk while rotating the disk in a first direction of rotation;
recording signals onto the magneto-optical disk with the laser beam while rotating the magneto-optical disk in a second direction of rotation; and
controlling a power of the laser beam so as to maximize a level of the playback signals produced from the reflected light from the sequence of pits of minimum size in said test playback region;
wherein
the first direction of rotation during playback is opposite to the second direction of rotation during recording so that a direction toward which the substantially crescent-shaped effective detection area is convex is identical to the direction toward which the substantially crescent-shaped recording pits is convex.

8. The method according to claim 7, wherein said test playback region is formed for each sector, and said step of controlling the power of said laser beam comprises:
finding an optimum value of a power of the laser beam which maximizes the level of the playback signals produced in accordance with the reflected light beam from said test playback region; and
maintaining the power of said laser beam at said optimum value while scanning said each sector of the disk.

9. The method according to claim 7, said controlling a power of the laser beam step including the substeps of:
setting the power of the laser beam to an initial laser power value,
producing a playback signal in accordance with the reflected light from said test playback region,
storing the playback signal produced in said producing step,
increasing the power of the laser beam by a predetermined amount,
repeating said producing step, said storing step and said increasing step until the laser beam no longer produces a playback signal from said test playback region, and
selecting the power of the laser beam from said setting step or said increasing step which produced the maximum corresponding playback signal stored in said storing step.

10. The method according to claim 7, said controlling a power of the laser beam step including the substeps of:
setting the power of the laser beam to an initial laser power value;
scanning said test playback region with the laser beam;
setting a flag to a first value;
increasing the power of the laser beam by a predetermined amount if the flag is set to the first value;
decreasing the power of the laser beam by the predetermined amount if the flag is set to a second value;
producing a playback signal in accordance with the reflected light from said test playback region;
setting the flag to the first value if a magnitude of the playback signal has increased with respect to a previous iteration;
setting the flag to the second value if the magnitude of the playback signal has decreased with respect to the previous iteration; and
recursively performing said increasing step, said decreasing step, said producing step and said setting steps while scanning said test playback region with the laser beam.

11. An apparatus for reproducing information from an optical disk, in which information is recorded in the form of recording pits along a track on the disk, comprising:

scanning means for scanning the disk with a laser beam forming a light spot on the disk, at least some of the recording pits being smaller in size than said light spot, the laser beam heating the disk so that an effective detection area is formed at only part of the light spot;

means for providing a test playback region along the track including a sequence of pits of minimum size for controlling the power of the laser beam;

playback means for producing playback signals in accordance with a reflected light from said test playback region; and controlling means for controlling a power of the laser beam so as to maximize a level of the playback signals produced from the reflected light from the sequence of pits of minimum size in said test playback region.

12. The apparatus of claim 11, wherein said disk has a first medium layer in which information is recorded, and a second medium layer which is formed on the first medium layer and whose transmittance changes depending on its temperature; and a part of said second medium layer heated by said laser beam has a substantially different transmittance from the rest of the second medium layer, said heated part being formed partially within said light spot, so that said effective detection area is a substantially transparent part of said second medium layer formed either within said heated part or outside of said heated part, and said laser beam is incident through said substantially transparent part of said second medium layer on said first medium layer.

13. The apparatus of claim 11, said providing means provides a minimum pit sequence area for each sector, and said controlling means controls the power of said laser beam for each sector by finding an optimum value of a power of the laser beam which maximizes the level of the playback signals produced in accordance with the reflected light beam from said minimum pit sequence area and maintaining the power of said laser beam at said optimum value while scanning each sector of the disk.

14. The apparatus of claim 11, wherein said disk is a magneto-optical disk;

said recording pits are crescent-shaped;

a direction of rotation during playback is opposite to a direction of rotation during recording.

15. The apparatus according to claim 11, said controlling means including:

setting means for setting the power of the laser beam to an initial laser power value, playback means for producing a playback signal in accordance with the reflected light from said test playback region, storing means for storing the playback signal produced in said producing step, laser power increasing means for increasing the power of the laser beam by a predetermined amount, repeating means for repeating the operation of said playback means, said storing means and said laser power increasing means until said playback means is no longer able to produce a playback signal from said test playback region, and laser power selecting means for selecting the power of the laser beam output from said setting means or said laser power increasing means which produced the maximum corresponding playback signal stored in said storing means.

16. The apparatus according to claim 11, said controlling means including:

laser power setting means for setting the power of the laser beam to an initial laser power value;

scanning means for scanning said test playback region with the laser beam;

first flag setting means for setting a flag to a first value;

laser power increasing means for increasing the power of the laser beam by a predetermined amount if the flag is set to the first value;

laser power decreasing means for decreasing the power of the laser beam by the predetermined amount if the flag is set to a second value;

playback means for producing a playback signal in accordance with the reflected light from said test playback region;

second flag setting means for setting the flag to the first value if a magnitude of the playback signal has increased with respect to a previous operation;

third flag setting means for setting the flag to the second value if the magnitude of the playback signal has decreased with respect to a previous operation; and recursion means for recursively performing the operation of said laser power increasing means, said laser power decreasing means, said playback means and said second and third flag setting means while scanning said test playback region with the laser beam.

17. An apparatus for playing back information from a magneto-optical disk, in which information is recorded in the form of substantially crescent-shaped recording pits along a track on the disk, comprising:

scanning means for scanning the disk with a laser beam to form a light spot on the disk, at least some of the substantially crescent-shaped recording pits being smaller in size than said light spot, the laser beam heating the disk so that a substantially crescent-shaped effective detection area is formed at only part of the light spot;

means for providing a test playback region along the track including a sequence of pits of minimum size for controlling the power of the laser beam;

playback means for producing playback signals in accordance with a reflected light from the disk while rotating the disk in a first direction of rotation;

recording means for recording signals onto the magneto-optical disk with the laser beam while rotating the magneto-optical disk in a second direction of rotation; and controlling means for controlling a power of the laser beam so as to maximize a level of the playback signals produced from the reflected light from the sequence of pits of minimum size in said test playback region;

wherein the first direction of rotation during playback is opposite to the second direction of rotation during recording so that a direction toward which the substantially crescent-shaped effective detection area is convex is identical to the direction toward which the substantially crescent-shaped recording pits is convex.

18. The apparatus according to claim 17, said means for providing a test playback region forms the test playback region for each sector and said controlling means optimizes the power of the laser beam for each sector so as to maximize a level of the playback signals produced from the reflected light from the sequence of pits of minimum size in said test playback region formed in each sector;

said controlling means controls the power of the laser beam to maintain the power of the laser beam at the optimized level for each sector.

19. The apparatus according to claim 17, said controlling means including:

setting means for setting the power of the laser beam to an initial laser power value, playback means for producing a playback signal in accordance with the reflected light from said test playback region, storing means for storing the playback signal produced in said producing step, laser power increasing means for increasing the power of the laser beam by a predetermined amount, repeating means for repeating the operation of said playback means, said storing means and said laser power increasing means until said playback means is no longer able to produce a playback signal from said test playback region, and laser power selecting means for selecting the power of the laser beam output from said setting means or said laser power increasing means which produced the maximum corresponding playback signal stored in said storing means.

20. The apparatus according to claim 17, said controlling means including:

laser power setting means for setting the power of the laser beam to an initial laser power value;

scanning means for scanning said test playback region with the laser beam;

first flag setting means for setting a flag to a first value;

laser power increasing means for increasing the power of the laser beam by a predetermined amount if the flag is set to the first value;

laser power decreasing means for decreasing the power of the laser beam by the predetermined amount if the flag is set to a second value;

playback means for producing a playback signal in accordance with the reflected light from said test playback region;

second flag setting means for setting the flag to the first value if a magnitude of the playback signal has increased with respect to a previous operation;

third flag setting means for setting the flag to the second value if the magnitude of the playback signal has decreased with respect to a previous operation; and recursion means for recursively performing the operation of said laser power increasing means, said laser power decreasing means, said playback means and said second and third flag setting means while scanning said test playback region with the laser beam.

* * * * *